(12) United States Patent
Shinn et al.

(10) Patent No.: US 10,929,759 B2
(45) Date of Patent: *Feb. 23, 2021

(54) INTELLIGENT ROBOT SOFTWARE PLATFORM

(71) Applicant: AIBrain Corporation, Seoul (KR)

(72) Inventors: Hong Shik Shinn, Seoul (KR); Yeongju Kim, Seoul (KR); Sungmin Lee, Seoul (KR)

(73) Assignee: AIBrain Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/103,402

(22) Filed: Aug. 14, 2018

(65) Prior Publication Data

US 2019/0080252 A1 Mar. 14, 2019

Related U.S. Application Data

(63) Continuation-in-part of application No. 15/946,646, filed on Apr. 5, 2018.

(Continued)

(51) Int. Cl.
| | |
|---|---|
| *G06N 5/04* | (2006.01) |
| *G06N 20/00* | (2019.01) |
| *G06F 8/30* | (2018.01) |
| *G06F 16/901* | (2019.01) |
| *G06K 9/62* | (2006.01) |
| *G06F 9/4401* | (2018.01) |
| *G06F 8/10* | (2018.01) |

(52) U.S. Cl.
CPC ............. *G06N 5/04* (2013.01); *G06F 8/10* (2013.01); *G06F 8/30* (2013.01); *G06F 9/4413* (2013.01); *G06F 16/9024* (2019.01); *G06K 9/6267* (2013.01); *G06N 20/00* (2019.01)

(58) Field of Classification Search
CPC . G06N 20/00; G06N 5/02; G06N 5/04; G06F 16/9024; G06F 8/30
See application file for complete search history.

(56) References Cited

U.S. PATENT DOCUMENTS

| | | | |
|---|---|---|---|
| 4,638,445 | A | 1/1987 | Mattaboni |
| 4,815,005 | A | 3/1989 | Oyanagi |

(Continued)

OTHER PUBLICATIONS

Kambhampati et al, "Multiresolution Path Planning for Mobile Robots," IEEE Journal on Robotics and Automation, vol. 2 Issue 3, Pages 135-145. (Year: 1986).*

(Continued)

*Primary Examiner* — Daniel C Washburn
*Assistant Examiner* — Oluwadamilola M Ogunbiyi
(74) *Attorney, Agent, or Firm* — Van Pelt, Yi & James LLP

(57) ABSTRACT

A specification of programmatic instructions is received. The specification uses instances of functional components connected together using specified links and includes the programmatic instructions for controlling a motorized base device. A simulation and debugging environment for the specification is provided and a distributable version based on the specification is generated. The distributable version is provided to a remote wireless device that executes the distributable version of the specification including by providing commands to the motorized base device based on the distributable version of the specification.

18 Claims, 36 Drawing Sheets

Related U.S. Application Data

(60) Provisional application No. 62/482,631, filed on Apr. 6, 2017, provisional application No. 62/545,924, filed on Aug. 15, 2017.

(56) References Cited

U.S. PATENT DOCUMENTS

| | | | |
|---|---|---|---|
| 5,581,664 A | 12/1996 | Allen | |
| 5,761,717 A | 6/1998 | Vishlitzky | |
| 5,875,331 A * | 2/1999 | Lindsey | G06F 8/10 |
| | | | 717/108 |
| 6,542,242 B1 | 4/2003 | Yost | |
| 6,859,931 B1 | 2/2005 | Cheyer et al. | |
| 7,386,449 B2 | 6/2008 | Sun | |
| 7,426,500 B2 | 9/2008 | Dragojlovic | |
| 7,545,965 B2 | 6/2009 | Suzuki | |
| 7,925,605 B1 | 4/2011 | Rubin | |
| 8,073,804 B1 | 12/2011 | Rubin | |
| 8,365,138 B2 * | 1/2013 | Iborra | G06F 8/35 |
| | | | 717/104 |
| 8,392,921 B2 | 3/2013 | Song | |
| 8,495,002 B2 * | 7/2013 | Nelken | G06F 16/20 |
| | | | 706/62 |
| 8,924,011 B2 | 12/2014 | Park | |
| 9,239,382 B2 | 1/2016 | Paglieroni | |
| 9,261,978 B2 | 2/2016 | Liberty | |
| 9,373,086 B1 | 6/2016 | Allen | |
| 9,380,017 B2 | 6/2016 | Gelfenbeyn | |
| 9,424,523 B2 | 8/2016 | Koll | |
| 9,471,668 B1 | 10/2016 | Alupului | |
| 9,555,326 B2 | 1/2017 | Scott | |
| 9,564,149 B2 | 2/2017 | Gelfenbeyn | |
| 9,568,909 B2 * | 2/2017 | Lawson | G05B 19/4185 |
| 9,569,425 B2 | 2/2017 | Jackson | |
| 9,659,052 B1 | 5/2017 | Glennon | |
| 9,747,901 B1 | 8/2017 | Gentry | |
| 9,792,434 B1 | 10/2017 | Li | |
| 9,801,517 B2 | 10/2017 | High | |
| 10,068,031 B2 | 9/2018 | Moore | |
| 10,297,253 B2 | 5/2019 | Walker, II | |
| 10,318,907 B1 | 6/2019 | Bergstrom | |
| 10,341,304 B1 | 7/2019 | Boutros | |
| 10,395,173 B1 | 8/2019 | Heidenreich | |
| 10,410,328 B1 | 9/2019 | Liu | |
| 10,418,032 B1 | 9/2019 | Mohajer | |
| 10,453,117 B1 | 10/2019 | Reavely | |
| 10,514,776 B2 | 12/2019 | Liberty | |
| 10,613,527 B2 | 4/2020 | D'Andrea | |
| 2003/0130827 A1 | 7/2003 | Bentzien | |
| 2004/0013295 A1 | 1/2004 | Sabe | |
| 2004/0044657 A1 | 3/2004 | Lee | |
| 2004/0182614 A1 | 9/2004 | Wakui | |
| 2004/0193322 A1 | 9/2004 | Pirjanian | |
| 2004/0228456 A1 | 11/2004 | Glynn | |
| 2005/0005266 A1 | 1/2005 | Datig | |
| 2005/0028133 A1 * | 2/2005 | Ananth | G06F 30/20 |
| | | | 717/105 |
| 2005/0058066 A1 * | 3/2005 | Sung | H04L 12/2805 |
| | | | 370/229 |
| 2005/0096790 A1 | 5/2005 | Tamura | |
| 2005/0165508 A1 | 7/2005 | Kanda | |
| 2005/0256882 A1 * | 11/2005 | Able | G06F 16/95 |
| 2005/0262130 A1 * | 11/2005 | Mohan | G06F 40/226 |
| 2006/0041722 A1 | 2/2006 | Hakura | |
| 2006/0072738 A1 | 4/2006 | Louis | |
| 2006/0080382 A1 * | 4/2006 | Dutta | H04L 12/2803 |
| | | | 709/203 |
| 2006/0150119 A1 | 7/2006 | Chesnais | |
| 2006/0195407 A1 | 8/2006 | Athelogou | |
| 2007/0070069 A1 | 3/2007 | Samarasekera | |
| 2007/0192910 A1 | 8/2007 | Vu | |
| 2007/0200920 A1 * | 8/2007 | Walker | H04N 7/148 |
| | | | 348/14.08 |
| 2008/0015418 A1 | 1/2008 | Jarrell | |
| 2008/0133052 A1 | 6/2008 | Jones | |
| 2008/0177683 A1 | 7/2008 | No | |
| 2008/0222077 A1 | 9/2008 | Duan | |
| 2008/0243305 A1 | 10/2008 | Lee | |
| 2009/0019058 A1 * | 1/2009 | Jung | H04L 12/2809 |
| 2009/0148034 A1 | 6/2009 | Higaki | |
| 2009/0175545 A1 | 7/2009 | Cancedda | |
| 2009/0192968 A1 | 7/2009 | Tunstall-Pedoe | |
| 2010/0013153 A1 | 1/2010 | Yourlo | |
| 2010/0036802 A1 | 2/2010 | Tsuruta | |
| 2010/0082513 A1 * | 4/2010 | Liu | H04L 63/1458 |
| | | | 706/46 |
| 2010/0211340 A1 | 8/2010 | Lowenthal | |
| 2010/0222957 A1 | 9/2010 | Ohta | |
| 2011/0010013 A1 | 1/2011 | Ruan | |
| 2011/0054689 A1 | 3/2011 | Nielsen | |
| 2011/0090787 A1 * | 4/2011 | Smith | H04L 41/0659 |
| | | | 370/225 |
| 2011/0106436 A1 | 5/2011 | Bill | |
| 2011/0224828 A1 | 9/2011 | Breznak | |
| 2011/0288684 A1 * | 11/2011 | Farlow | B25J 11/009 |
| | | | 700/264 |
| 2011/0307435 A1 | 12/2011 | Overell | |
| 2012/0010900 A1 | 1/2012 | Kaniadakis | |
| 2012/0016678 A1 | 1/2012 | Gruber | |
| 2012/0095619 A1 * | 4/2012 | Pack | G05D 1/0038 |
| | | | 701/2 |
| 2012/0117005 A1 | 5/2012 | Spivack | |
| 2012/0130270 A1 | 5/2012 | Imamura | |
| 2012/0233152 A1 | 9/2012 | Vanderwende | |
| 2012/0238366 A1 | 9/2012 | Tedder | |
| 2013/0103195 A1 * | 4/2013 | Anhalt | B25J 9/163 |
| | | | 700/248 |
| 2013/0110764 A1 | 5/2013 | Wilf | |
| 2013/0138425 A1 | 5/2013 | Luke | |
| 2013/0246430 A1 | 9/2013 | Szucs | |
| 2013/0253977 A1 | 9/2013 | Vibhor | |
| 2013/0289984 A1 | 10/2013 | Hakkani-Tur | |
| 2013/0337916 A1 | 12/2013 | Saretto | |
| 2014/0070947 A1 * | 3/2014 | Ionson | G06F 17/00 |
| | | | 340/541 |
| 2014/0075004 A1 | 3/2014 | Van Dusen | |
| 2014/0100012 A1 | 4/2014 | Miller | |
| 2014/0108303 A1 | 4/2014 | Cheyer | |
| 2014/0132767 A1 | 5/2014 | Sonnabend | |
| 2014/0164533 A1 | 6/2014 | Lynch | |
| 2014/0223408 A1 * | 8/2014 | Wunderlich, Jr. | G06F 8/36 |
| | | | 717/101 |
| 2014/0279807 A1 | 9/2014 | Dimitrijevic | |
| 2014/0279971 A1 * | 9/2014 | Bobick | G06N 5/022 |
| | | | 707/693 |
| 2014/0280210 A1 | 9/2014 | Ritchie | |
| 2014/0298358 A1 | 10/2014 | Tian | |
| 2014/0316570 A1 | 10/2014 | Sun | |
| 2015/0025708 A1 | 1/2015 | Anderson | |
| 2015/0032254 A1 | 1/2015 | Ishiguro | |
| 2015/0046181 A1 * | 2/2015 | Adjaoute | G06F 19/328 |
| | | | 705/2 |
| 2015/0066520 A1 | 3/2015 | Leon | |
| 2015/0066836 A1 | 3/2015 | Midmore | |
| 2015/0089515 A1 * | 3/2015 | Bondada | G06F 9/4411 |
| | | | 719/327 |
| 2015/0106308 A1 * | 4/2015 | Harrison | G06N 5/043 |
| | | | 706/12 |
| 2015/0142704 A1 | 5/2015 | London | |
| 2015/0168954 A1 | 6/2015 | Hickerson | |
| 2015/0193186 A1 * | 7/2015 | Lee | H04N 21/21805 |
| | | | 345/1.1 |
| 2015/0197007 A1 * | 7/2015 | Pack | G05D 1/0016 |
| | | | 701/2 |
| 2015/0248525 A1 | 9/2015 | Ury | |
| 2015/0269139 A1 | 9/2015 | McAteer | |
| 2015/0279348 A1 | 10/2015 | Cao | |
| 2015/0285644 A1 * | 10/2015 | Pfaff | G05D 1/0217 |
| | | | 701/25 |
| 2015/0290795 A1 | 10/2015 | Oleynik | |
| 2015/0310446 A1 | 10/2015 | Tuchman | |
| 2015/0326832 A1 | 11/2015 | Zhang | |

(56) References Cited

U.S. PATENT DOCUMENTS

| | | | |
|---|---|---|---|
| 2015/0356144 A1* | 12/2015 | Chawla | G06F 16/287 707/741 |
| 2015/0378984 A1 | 12/2015 | Ateya | |
| 2016/0004826 A1 | 1/2016 | Van Arkel | |
| 2016/0062882 A1 | 3/2016 | Bonwick | |
| 2016/0068267 A1 | 3/2016 | Liu | |
| 2016/0103653 A1* | 4/2016 | Jang | H03G 3/3005 381/107 |
| 2016/0110422 A1 | 4/2016 | Roytman | |
| 2016/0117593 A1 | 4/2016 | London | |
| 2016/0132789 A1 | 5/2016 | Flinn | |
| 2016/0167226 A1 | 6/2016 | Schnittman | |
| 2016/0170742 A1* | 6/2016 | Pallath | G06F 8/36 717/120 |
| 2016/0188595 A1 | 6/2016 | Chen | |
| 2016/0189035 A1 | 6/2016 | Shakeri | |
| 2016/0255969 A1 | 9/2016 | High | |
| 2016/0261771 A1 | 9/2016 | Fujii | |
| 2016/0271795 A1 | 9/2016 | Vicenti | |
| 2016/0303738 A1* | 10/2016 | Laurent | B25J 9/163 |
| 2016/0350685 A1 | 12/2016 | Helbing | |
| 2016/0350930 A1 | 12/2016 | Lin | |
| 2016/0378752 A1 | 12/2016 | Anderson | |
| 2016/0379092 A1 | 12/2016 | Kutliroff | |
| 2016/0379106 A1 | 12/2016 | Qi | |
| 2016/0379120 A1 | 12/2016 | Merdivan | |
| 2016/0379121 A1 | 12/2016 | Ge | |
| 2017/0004199 A1 | 1/2017 | Häusler | |
| 2017/0010830 A1 | 1/2017 | Ishikawa | |
| 2017/0017838 A1 | 1/2017 | Biswas | |
| 2017/0024392 A1 | 1/2017 | Shah | |
| 2017/0038846 A1 | 2/2017 | Minnen | |
| 2017/0052905 A1 | 2/2017 | Lin | |
| 2017/0061302 A1* | 3/2017 | Subasi | G06N 5/046 |
| 2017/0078224 A1 | 3/2017 | Chander | |
| 2017/0099200 A1 | 4/2017 | Ellenbogen | |
| 2017/0109355 A1* | 4/2017 | Li | G06N 7/005 |
| 2017/0116187 A1 | 4/2017 | Erickson | |
| 2017/0250930 A1 | 8/2017 | Ben-Itzhak | |
| 2017/0255884 A1 | 9/2017 | Visvanathan | |
| 2017/0277619 A1* | 9/2017 | Liu | G06F 11/366 |
| 2017/0278110 A1 | 9/2017 | Ezry | |
| 2017/0293610 A1 | 10/2017 | Tran | |
| 2017/0297588 A1 | 10/2017 | Doshi | |
| 2017/0307391 A1 | 10/2017 | Mason | |
| 2017/0308521 A1 | 10/2017 | Bruno | |
| 2017/0311863 A1 | 11/2017 | Matsunaga | |
| 2017/0318919 A1 | 11/2017 | Gharabegian | |
| 2017/0323285 A1 | 11/2017 | Xing | |
| 2017/0323356 A1 | 11/2017 | Gharabegian | |
| 2017/0330106 A1* | 11/2017 | Lindsley | G06N 5/02 |
| 2017/0337620 A1* | 11/2017 | Yu | G06Q 30/0643 |
| 2017/0364747 A1 | 12/2017 | Ekambaram | |
| 2018/0043532 A1 | 2/2018 | Lection | |
| 2018/0052876 A1 | 2/2018 | Liu | |
| 2018/0052913 A1 | 2/2018 | Gaskill | |
| 2018/0053114 A1 | 2/2018 | Adjaoute | |
| 2018/0054507 A1 | 2/2018 | Bentitou | |
| 2018/0068031 A1* | 3/2018 | Hewavitharana | G06F 16/9535 |
| 2018/0075403 A1 | 3/2018 | Mascorro Medina | |
| 2018/0082230 A1 | 3/2018 | Rosenberg | |
| 2018/0092559 A1 | 4/2018 | Wybo | |
| 2018/0099846 A1 | 4/2018 | High | |
| 2018/0107917 A1 | 4/2018 | Hewavitharana | |
| 2018/0108443 A1* | 4/2018 | Li | G16H 50/70 |
| 2018/0114111 A1 | 4/2018 | Gill | |
| 2018/0121098 A1 | 5/2018 | Gill | |
| 2018/0127211 A1 | 5/2018 | Jarvis | |
| 2018/0127212 A1 | 5/2018 | Jarvis | |
| 2018/0136615 A1 | 5/2018 | Kim | |
| 2018/0137155 A1* | 5/2018 | Majumdar | G06N 10/00 |
| 2018/0143634 A1 | 5/2018 | Ott | |
| 2018/0143978 A1 | 5/2018 | Chang | |
| 2018/0144208 A1 | 5/2018 | Lu | |
| 2018/0144248 A1 | 5/2018 | Lu | |
| 2018/0144257 A1* | 5/2018 | Ankisettipalli | G06N 5/022 |
| 2018/0150740 A1 | 5/2018 | Wang | |
| 2018/0157902 A1 | 6/2018 | Tu | |
| 2018/0165518 A1 | 6/2018 | Assaf | |
| 2018/0165625 A1 | 6/2018 | Modi | |
| 2018/0169865 A1 | 6/2018 | Kou | |
| 2018/0173459 A1 | 6/2018 | Katarki | |
| 2018/0189269 A1* | 7/2018 | Quirk | G06F 17/2775 |
| 2018/0190377 A1 | 7/2018 | Schneemann | |
| 2018/0197275 A1 | 7/2018 | Price | |
| 2018/0218266 A1* | 8/2018 | Halim | G06N 5/04 |
| 2018/0218472 A1 | 8/2018 | Riabov | |
| 2018/0225281 A1 | 8/2018 | Song | |
| 2018/0233141 A1 | 8/2018 | Solomon | |
| 2018/0256989 A1 | 9/2018 | Adekunle | |
| 2018/0267540 A1 | 9/2018 | Sonoura | |
| 2018/0268699 A1 | 9/2018 | Ohsawa | |
| 2018/0275677 A1 | 9/2018 | Hamada | |
| 2018/0275913 A1 | 9/2018 | Mitkar | |
| 2018/0281191 A1 | 10/2018 | Sinyavskiy | |
| 2018/0284735 A1 | 10/2018 | Cella | |
| 2018/0285359 A1 | 10/2018 | Bostick | |
| 2018/0285595 A1 | 10/2018 | Jessen | |
| 2018/0292827 A1 | 10/2018 | Artes | |
| 2018/0314603 A1 | 11/2018 | Gibbons, Jr. | |
| 2018/0314689 A1* | 11/2018 | Wang | G06F 17/2785 |
| 2018/0336271 A1 | 11/2018 | Chandrasekaran | |
| 2018/0349485 A1 | 12/2018 | Carlisle | |
| 2019/0035083 A1 | 1/2019 | Lin | |
| 2019/0053856 A1 | 2/2019 | Weber | |
| 2019/0154439 A1* | 5/2019 | Binder | G01S 15/08 |
| 2019/0179329 A1 | 6/2019 | Keivan | |
| 2019/0193273 A1* | 6/2019 | Favis | G06F 9/451 |
| 2019/0220774 A1 | 7/2019 | Terry | |
| 2019/0255703 A1* | 8/2019 | Izhikevich | B25J 9/161 |
| 2019/0273619 A1 | 9/2019 | Campagna | |
| 2019/0278796 A1 | 9/2019 | Lellis | |
| 2019/0286996 A1 | 9/2019 | Tian | |
| 2019/0290209 A1 | 9/2019 | Fu | |
| 2019/0347120 A1 | 11/2019 | Kottomtharayil | |
| 2019/0351558 A1 | 11/2019 | Park | |
| 2019/0361457 A1 | 11/2019 | Johnson | |
| 2019/0370096 A1 | 12/2019 | Grewal | |
| 2019/0378019 A1 | 12/2019 | Scheutz | |
| 2020/0035110 A1 | 1/2020 | Priest | |
| 2020/0061839 A1 | 2/2020 | Deyle | |
| 2020/0117187 A1 | 4/2020 | Kothari | |
| 2020/0152084 A1 | 5/2020 | Kumar | |
| 2020/0215698 A1 | 7/2020 | Bogolea | |

OTHER PUBLICATIONS

Agichtein et al., Learning Search Engine Specific Query Transformations for Question Answering, 10th International World Wide Web Conference, World Academy of Science, Engineering and Technology, 2001, pp. 169-178.

Kangavari et al., Information Retrieval: Improving Question Answering Systems by Query Reformulation and Answer Validation, World Academy of Science, Engineering and Technology, 2008, pp. 303-310, Issue 48.

Kamel et al., "A graph based knowledge retrieval system." 1990 IEEE International Conference on Systems, Man, and Cybernetics Conference Proceedings. IEEE, 1990. (Year: 1990).

\* cited by examiner

```
1. Initialize state
2. Repeat - Overall works
        1) Get new external events
        2) Sequence for determining plan
                * Repeat to select most proper module
                        1/Select the highest priority module
                        2/Execute Planner or selected module
                                (if planner works)
                                >> Generate Domain & Problem
                                >> Set a goal
                                >> Run planner to get a plan
                                (If other module works)
                                >> Execute each module's work
                                >> Set a plan for module
                        3/Investigate if plan is proper
                * Repeat end (if plan is proper)
        3) Execute plan with executor
        4) Generate natural language
        5) Output generated response
3. End Repeat - Overall works
```

FIG. 18

```
public class ServiceTextToSpeechImpl extends ServiceTextToSpeech {

@Override
    protected void SpeakImpl( SpeakInput input, SpeakOutput output ) {
        if(!isSpeak){
            mTts.speak(input.sentence);
        }
    }
}

/* ---------------- */ public class ServiceVisionImpl extends ServiceVision {

@Override
    protected void StartBallDetectionImpl( StartBallDetectionInput input,
                                           StartBallDetectionOutput output) {
        mVision.startBallDetection(mBallDetectListener);
    }
}
```

FIG. 27

```xml
<plan>
  <definition>
    <description></description>
    <inputs/>
    <locals>
      <variable type="string" name="color">""</variable>
    </locals>
    <outputs/>
  </definition>
  <nodes>
    <start />
    <end />
    <upnp_action>
      <target>TestComp/Vision/StartBallDetection</target>
    </upnp_action>
    <upnp_variable>
      <target>TestComp/Vision/Color</target>
      <output>color</output>
    </upnp_variable>
    <if>
      <condition>
        <input>"red".equals(color)</input>
      </condition>
      <condition>
        <input>"blue".equals(color)</input>
      </condition>
    </if>
    <upnp_action>
      <target>TestComp/TextToSpeech/Speak</target>
      <input>"red ball"</input>
    </upnp_action>
    <upnp_action>
      <target>TestComp/TextToSpeech/Speak</target>
      <input>"blue ball"</input>
    </upnp_action>
  </nodes>
  <transitions>
    <transition source="0" target="2"/>
    <transition source="3" target="4"/>
    <transition source="4:0" target="5"/>
    <transition source="4:1" target="6"/>
    <transition source="5" target="1"/>
    <transition source="6" target="1"/>
  </transitions>
  <comments/>
</plan>
```

FIG. 29

INTELLIGENT ROBOT SOFTWARE PLATFORM

CROSS REFERENCE TO OTHER APPLICATIONS

This application is a continuation-in-part of co-pending U.S. patent application Ser. No. 15/946,646 entitled ADAPTIVE, INTERACTIVE, AND COGNITIVE REASONER OF AN AUTONOMOUS ROBOTIC SYSTEM filed Apr. 5, 2018, which claims priority to U.S. Provisional Patent Application No. 62/482,631 entitled ADAPTIVE, INTERACTIVE, AND COGNITIVE REASONER OF AN AUTONOMOUS ROBOTIC SYSTEM filed Apr. 6, 2017, both of which are incorporated herein by reference for all purposes. This application claims priority to U.S. Provisional Patent Application No. 62/545,924 entitled INTELLIGENT ROBOT SOFTWARE PLATFORM filed Aug. 15, 2017 which is incorporated herein by reference for all purposes.

BACKGROUND OF THE INVENTION

Traditional robotic systems such as a voice artificial intelligence (AI) robot agent are capable of responding to generic queries. These queries, however, are often limited in their scope and result in a response that does not adapt to the user's historical context. For example, a user often desires to query information that the user has previously shared with the AI agent and to interact with the agent across multiple back-and-forth exchanges. An autonomous robotic system that can participate in an interactive conversation that spans multiple queries and responses and also includes responses that are adapted to the context of previous conversations is complex and difficult to develop. Creating and testing an autonomous robotic system requires the ability to integrate both diverse robotic hardware and complex robot software logic. Therefore, there exists a need for an intelligent robot software platform that simplifies the development of autonomous robotic systems for robot developers with minimal impact to their ability to create artificial intelligence (AI) robots capable of creatively solving complex problems.

BRIEF DESCRIPTION OF THE DRAWINGS

Various embodiments of the invention are disclosed in the following detailed description and the accompanying drawings.

FIG. 18 is a pseudo-code description illustrating an embodiment of a process for solving an artificial intelligence problem using adaptive, interactive, and cognitive reasoning.

FIG. 27 is an example of a Java language implementation of a universal plug and play (UPnP) component service.

FIG. 29 is an example of a robot plan markup language (RPML) file created using the intelligent robot software platform.

DETAILED DESCRIPTION

Figure 1:
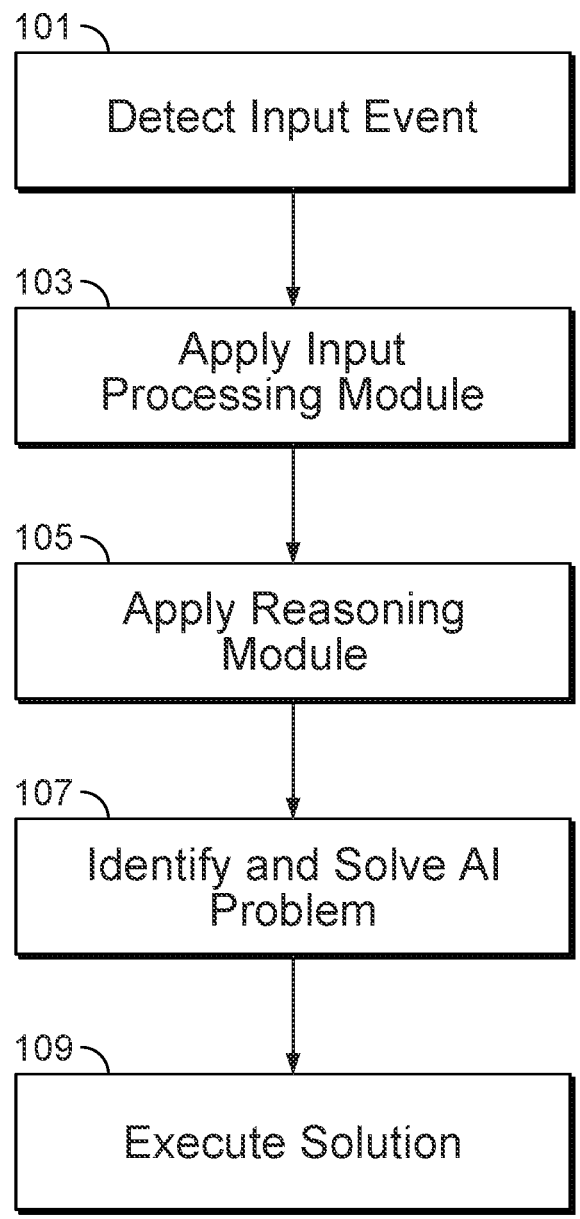
FIG. 1 is a flow diagram illustrating an embodiment of a process for responding to an input event using an adaptive, interactive, and cognitive reasoner.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An intelligent robot software platform for the development and testing of autonomous robot systems is disclosed. The creation of artificial intelligence (AI) robots capable of solving complex problems requires a robot software platform capable of integrating a diverse collection of robot hardware including different robot sensors and exposing the hardware to robot software logic in a manner that allows robot developers to efficiently create robot logic. Using an intelligent robot software platform, a general robot developer can utilize new hardware functionality without little to no configuration of the new hardware. New robot hardware and robot hardware functionality are automatically made accessible by components that represent low-level robot hardware by automatically discovering the hardware. General users are able to create a robot plan by visually programming robot logic using drag-and-drop techniques. More advanced users are able to access the low-level interfaces to robot hardware and to develop higher-level reusable components that provide a layer of abstraction to the hardware. The created robot plans are deployable and reusable by using a structured data format for storing the robot logic. The plans can be executed in a runtime environment of the intelligent robot software platform for both testing and deployment to actual robot hardware. The runtime serves as both a simulation environment when performing testing/development and as a robot deployment environment. In some embodiments, the robot environment runs on a smartphone device which accesses robot hardware via network connectivity. For example, a smartphone device can serve as the main processor for the robot logic and a motorized robot base with sensors can function as the robot hardware. Users can actively monitor the performance of the robot software and perform error checking. By providing layers of abstraction for different robot developers, a runtime environment, and visual programming for robot plans, among other benefits, the use of an intelligent robot software platform improves the speed and efficiency of robot.

In some embodiments, an artificial intelligence (AI)-based autonomous robot using an adaptive, interactive, and cognitive reasoner is developed using the disclosed intelligent robot software platform. Robotic hardware can be accessed via a robot logic that executes in an intelligent robot software platform runtime running on a smartphone device. In some embodiments, the robotic hardware includes a robotic motorized base that can be utilized by the robot logic. In some embodiments, the robotic hardware includes the sensors of a smartphone device. For example, the robotic hardware can include an accelerometer, location-based sensors such a global positioning system sensors, microphone(s), and camera(s), among other sensors of a smartphone. In various embodiments, the robotic hardware includes remote hardware accessed via a network protocol. In some embodiments, the smartphone device is mounted in a motorized robotic base and the robot logic controls the motorized base in response to input from sensors of the smartphone device and/or sensors attached to the motorized base. In some embodiments, a motorized base may include wheels, legs, arms, and/or other components for performing robot motion. In various embodiments, the robot logic can also control network devices accessible via the network of the smartphone device, for example, over a cellular or WiFi connection. In some embodiments, different robotic hardware and software logic are wrapped as higher-level components for easily creating a robot plan using a visual programming language.

In some embodiments, a specification of programmatic instructions including programmatic instruction for controlling a motorized base device is received. For example, a specification of programmatic instructions corresponding to logic to be performed by a robot is created by a robot developer using a plan builder tool of an intelligent robot software platform. The programmed instructions include commands for controlling a motorized base device of the robot. The motorized base device may include wheels, arms, legs, camera, speakers, etc. that are controllable using the programmatic instructions and discoverable via the intelligent robot software platform. In some embodiments, the specification is specified using instances of functional components connected together using specified links. For example, components representing different logic and/or hardware functionality are connected using a visual programming language. As another example, a developer uses drag-and-drop techniques to connect components of a motorized based to control movement of the robot; a camera component to recognize faces; a microphone and speech-to-text components to detect speech and to convert the speech into text; logic component using an adaptive, interactive, and cognitive reasoner to comprehend the text speech and generate a text response; and a speaker and text-to-speech component to vocally respond to the detected speech. In some embodiments, a simulation and debugging environment for the specification is provided and a distributable version based on the specification is generated. For example, an intelligent robot software platform provides a runtime and debugging environment for executing and debugging a distributable version of the generated specification. In some embodiments, the distributed version is stored as a structured text file using a markup language and may be distributed to remote wireless devices and also reused for future plans. In some embodiments, the distributable version is provided to a remote wireless device, wherein the remote wireless device executes the distributable version of the specification including by providing commands to the motorized base device based on the distributable version of the specification. For example, the distributed version of the robot plan is deployed to a remote wireless device, such as a smartphone device, that executes the robot plan. In some embodiments, the remote wireless device executes the distributed version using a runtime environment. The distributed version includes commands to the motorized base device such as commands for moving forward, moving backwards, turning, positioning a retractable arm, playing sounds, vision detection, etc. that correspond to the programmatic instructions and functionality components of the specification.

An autonomous robotic system for responding to conversational voice input using an adaptive, interactive, and cognitive reasoner is disclosed. For example, a voice artificial intelligence (AI) robot agent is capable of storing previous conservations with a user and using the stored knowledge in responses to new queries. In addition, a conversation between a user and an autonomous robotic system can include multiple back-and-forth exchanges where the responses of the autonomous robotic system rely on the context of what the user speaks. The user's voice input is processed using speech recognition and natural language understanding. The processed input is then compared to a knowledge store, such as a memory graph, that stores historical knowledge shared by the user with the agent. Using the retrieved supporting knowledge and the user's input, an AI planning problem is constructed. The AI problem is solved using an AI planner such as an automated planner and/or by referencing previous solutions to similar problems. The resulting solution is executed using natural language generation to provide the user with a voice response. The result is a conversation between a user and an AI agent that spans multiple back-and-forth exchanges and where the content of the conversation includes responses that rely on past conversations. The responses generated by the AI agent are much more interactive and adaptive to the user's responses than possible with traditional voice AI response techniques.

In some embodiments, a natural language artificial intelligence (AI) problem is solved. For example, a user asks a voice AI agent a query and the voice AI agent solves the natural language AI problem and provides a vocal response. Initially, a natural language input is received. For example, a user speaks a query to a robotic system such as a voice AI agent. The natural language input is processed to classify components of the natural language input. For example, the voice is processed into a structured format that identifies a subject, object, and predicate. In some embodiments, one or more lemma are identified as well as a performative classification, a sender of the input, and a receiver of the input. A starting node of an artificial intelligence memory graph data structure is selected to begin a search for one or more supporting knowledge data nodes associated with the classified components, wherein the artificial intelligence memory graph comprises one or more data nodes. For example, an artificial intelligence memory graph is made up of one or more nodes including root nodes that are each associated with a different user that has interacted with the robotic system. The speaker of the natural language input is identified and the user root node associated with the speaker is selected as a starting node. Starting at the starting node, the artificial intelligence memory graph data structure is searched using a lexical database to identify the one or more supporting knowledge data nodes. For example, the starting nodes may serve as a starting node to begin a search for data nodes relevant to the classified components. In some embodiments, one or more nodes based on previous input are identified as supporting knowledge and are associated with the example query. In some embodiments, a lexical database is used to identify words and/or nodes that are related to the input. In some embodiments, a lexical database is utilized for co-referencing. An artificial intelligence problem is identified. For example, a query is identified as an AI problem that is different from a declaration. In one scenario, a user may ask "What is my name?" and in the other scenario a user makes the assertion "My name is Alice." In various embodiments, the identified AI problem is generated using the processed natural language input and identified supporting knowledge data nodes. The artificial intelligence problem is solved using the one or more identified supporting knowledge nodes of the artificial intelligence memory graph data structure. For example, using the identified nodes as supporting knowledge, an AI planning problem is created and solved. In some embodiments, the AI problem is an AI planning problem solved using an AI planner.

In some embodiments, the classified components of the natural language input are recorded in one or more nodes of an artificial intelligence memory graph data structure. As an example, certain words or variations of words of an input sentence are classified into word components and recorded as nodes in a memory graph data structure for processing and retrieval at a later date. The nodes may identify the part of speech of the word and its relation to the sentence as well as previously received input. In some embodiments, the solution to the identified artificial intelligence problem is also stored in the artificial intelligence memory graph data structure.

Cognitive Science and other related fields have brought us closer to the understanding of the human mind and brain and how they work. True AI has the very purpose of mapping the human knowledge and how it is acquired, processed, and used into artificial intelligent agents. The adaptive interactive cognitive reasoning engine (AICoRE) is an agent reasoner that is meant to be the encapsulation of the components of the human mind in any agent with a robot body. The integration of the human knowledge traits from language, memory, visual perception, thinking and reasoning to decision making and social cognition can be shown in a practical implementation of the general conversational agent.

In some embodiments, an intelligent robot software platform allows users without in-depth knowledge to build and create software for robots. For example, general users can develop robot software by assembling one or more nodes via a drag and drop interface without the knowledge of the target robot's hardware or networking properties. In some embodiments, the intelligent robot software platform is a robot software platform based on a robot plan markup language (RPML). In some embodiments, the intelligent robot software platform utilizes universal plug and play (UPnP) middleware to allow users to program distributed devices in multiple locations from a single computer with fewer steps.

In various embodiments, the adaptive interactive cognitive reasoning engine (AICoRE) is a cognitive reasoning engine that unifies problem solving and learning. It may fully automate the reasoning process from end to end. In some embodiments, the AICoRE is an incremental holistic human-like reasoner, covering the full spectrum of reasoning from sensing, reasoning, discovering, planning, learning and remembering until responding and performing.

In order to have such a significant improvement over the general conversation agent (GCA), the depth and breadth of the research that was undertaken includes fields like audio-visual sensory techniques, natural language understanding (NLU), reasoning, planning, natural language generation (NLG), case based reasoning (CBR), inter-agent communication (iAC) and memory graph (MG). In some embodiments, these modules constitute the AICoRE, and are closely related to each other.

In some embodiment, the NLU module tries to find triples from a sentence using a natural language processing tool and co-reference modules. In some embodiments, the NLU module parses sentences based on constituency first, and then adds more information such as the subject, verb, and object of the sentence. It not only parses the grammatical structure of the sentence, but also analyzes the performative and language of the sentence. In addition, the co-reference module checks not only objects in sentences, but also the relationships between the speaker and the object.

In some embodiments, the output of NLU is transferred into a reasoner module to retrieve information that will help the next module, the planner, generate a response fit for general conversation. Using a supporting knowledge retriever sub-function, the reasoner gathers a list of resources from the memory graph corresponding to knowledge that are related to the given input, and ranks these resources in order of importance. After that, an open-ended conversation generator sub-module determines possible response types that will serve as templates for generating more various natural responses.

In some embodiments, using the output of the reasoner module, the problem generator generates an artificial intelligence problem and the planner solves the problem. For example, in some embodiments, the problem generator generates a PDDL domain/problem description, and the planner module solves the PDDL problem specified by the description. In various embodiments, the planner module is capable of dealing with both physical and cognitive (speech) actions, and also dealing with real world problems while interacting with multiple agents and humans. Unlike traditional conversation agents, the disclosure autonomous robotic system can use the planner module itself to get solutions.

In various embodiments, the generated solution is used in a NLG module for generating answers in a natural language format. For example, a NLG module is utilized to generate natural language from a machine-based representation such as a knowledge base or a logical form.

In some embodiments, all of the generated data is saved in memory. The AICoRE can manage and use the saved data efficiently, for example, by using its memory structure. In various embodiments, the CBR is the process of solving new problems based on the solutions of similar past problems. The CBR compares the current case against previous ones based on a description of the problem, such as a PDDL problem description, and the action plan made by the planner module. In the event the CBR module determines a previously solved problem is similar to the current one, a previous case may be reused.

In various embodiments, inter-agent communication (iAC) is utilized for communication between different agents. The iAC may include two modules, an iACManager and an iACServer. The iACManager module represents the client side of the iAC. The iACManager module generates ACLMessages and sends the messages via an inter-agent communication platform. In some embodiments, the ACLMessages are based on the FIPA-ACL standard. In some embodiments, the inter-agent communication platform is the JADE Platform. In some embodiments, the iACServer module runs on the same inter-agent communication platform as the iACManager and can send and receive ACLMessages. In various embodiments, messages are sent based on whether the appropriate receiver exists.

An example process of the AICoRE is as follows: the chosen event, represented in natural language format, gets put into the natural language understanding module of the AICoRE. Next, the planner module of the AICoRE uses a set of internal rules to set the most proper goal and plan to get the best solution for the given event. The AICoRE relies on rules of the planner module as well as rules from other modules within the system. In some embodiments, an iterative sequence is required within the main repeat sequence in order to account for all the various rules. Examples of rules not from the planner module include rules from the reasoner module that are used to map data to the event, based on various characteristics of the event. Once a plan is set for executing a solution for a given event, the AICoRE executes the plan with an executor module. Using the steps generated by the execution of the plan, the AICoRE can generate responses in a natural language form that satisfies the actions required to accomplish the goal set by the input event.

In some embodiments, an intelligent robot software platform is a robot software platform based on a markup language such as a robot plan markup language (RPML). Using RPML, users can program and develop high-level robot software using a drag and drop interface. In some embodiments, RPML is a structured file such as an extensible markup language (XML) file that defines the contents of a robot plan. In various embodiments, all methods and events of the intelligent robot software platform can be presented as a node including a robot language such as RPML. For example, users can reuse legacy RPML files as a node. Moreover, in various embodiments, the intelligent robot software platform includes a collection of robot programming tools. For example, a plan builder tool may be included for creating and editing a robot plan and a component builder tool may be included for creating universal plug and play (UPnP) components. In some embodiments, one or more programming tools, such as a plan builder tool and/or a component builder tool, are created as a plug-in for a GUI development environment such as the Eclipse development environment. In some embodiments, the plan builder tool is used to create a robot plan using a visual programming language (VPL). In some embodiments, a component builder tool is used to create UPnP components for use by the intelligent robot software platform. In various embodiments, the different tools may utilize code generation such as the automatic generation of template code when specifying a component.

In some embodiments, a node is a fundamental building block for creating robot software using an intelligent robot software platform. Nodes may be categorized by types. Example node types include: start, end, sync, assign, print, pause, script, universal plug and play (UPnP) event, UPnP action, and group nodes, among others. In some embodiments, an event node and an action node are used that are not specifically tied to a UPnP interface, for example, another appropriate protocol may be used for the event and action nodes. In various embodiments, the different node types are utilized for different functions. For example, a start node represents a starting point of a plan. An end node represents a finish point of the plan. For example, end nodes may be used in the event of a conditional branch and it may be necessary under certain conditions to designate the end of a branch. A sync node may be used when another node needs to be synchronized, for example, as the result of multiple branches. An assign node may be used to assign a value to a variable declared in a plan. A print node may be used for printing, for example, for printing text to a console. A pause node may be used to stop a plan. For example, a pause node may be used to pause the plan for a duration such as a certain number of milliseconds. A script node may be used to execute a script, such as a BeanShell or other type of script. An event node or UPnP event node may be used to notify events related to components such as UPnP components. An action node or UPnP action node may be used to execute the methods in a component such as a UPnP Component. A group node represents a plan file. For example, a plan can be reused as a group node.

In some embodiments, various abstraction layers are utilized to simplify software development. For example, a hardware application programming interface (API) can be created for controlling the wheel of the robot or for detecting an obstacle by using an ultrasonic sensor. Advanced users can create a universal plug and play (UPnP) component by wrapping the hardware API into a component. General users can create robot software by using a plan editor and a markup language such as robot plan markup language (RPML). Because general users do not need to have hardware level knowledge, the intelligent robot software platform has a very low barrier of entry. Users can concentrate on the algorithms of the robot and creative programming rather than investing time in low-level hardware related development. Another advantage is that a hardware developer can improve a robot's stability since users are restricted in their ability to access the low-level functionality of the hardware.

In various embodiments, a robot plan is created using a plan editor. Using the plan editor, users can develop the plan via a drag-and-drop interface. In some embodiments, the plan editor immediately recognizes components and no steps are required to register or detect available components. For example, the intelligent robot software platform may utilize a universal plug and play (UPnP) middleware or similar technique to enable devices plugged into a network accessible by the software platform. Devices plugged into the network are automatically aware of each other. Users are able to program distributed devices located in multiple different locations from a single computer without additional setup.

An example process for developing robot software using the intelligent robot software platform includes the steps: hardware developers make and provide a hardware application programming interface (API), advanced users make and provide a corresponding universal plug and play (UPnP) component, and general users develop a robot plan in robot markup plan language (RPML). Users then deploy the RPML files to a runtime engine of the intelligent robot software platform. The intelligent robot software platform runtime parses the RPML and executes one or more different APIs associated with one or more different components.

FIG. 1 is a flow diagram illustrating an embodiment of a process for responding to an input event using an adaptive, interactive, and cognitive reasoner. In the example shown, the process of FIG. 1 may be used by an autonomous robotic system to create and execute a voice response to a received query, such as a voice query. As another example, the result of FIG. 1 may be movement performed by an autonomous robotic system in response to a movement command. In various embodiments, the process of FIG. 1 may be implemented on a computer programmed system including a mobile device. In some embodiments, portions of the process of FIG. 1 are performed across one or more computer programmed systems including remote servers such as cloud computing servers. In some embodiments, the process of FIG. 1 is implemented by an autonomous robotic system in response to an input event.

At 101, an input event is detected. In various embodiments, the input event is a triggering event that initiates the processing of FIG. 1. In some embodiments, the input detected is voice input from a human user such as a spoken sentence. In some embodiments, the input detected includes not only voice input but also visual input. In various embodiments, the input detected may be voice input, visual input (e.g., gestures, the presentation of a face, an object moving, etc.), and network communication, among others. In some embodiments, the input detected is received from an autonomous agent and/or autonomous robot.

At 103, an input processing module is applied to the input detected at 101. In various embodiments, an autonomous robotic system includes one or more input processing modules. In various embodiments, a conversation module is used to process voice input. In some embodiments, visual input such as a gesture is processed by a vision module, remote communication is processed using a remote communication module, movement instructions are processed by a plan & move module, etc. In the example shown, the appropriate input processing module is determined and applied. For example, a conversation module is selected and applied when the input detected at 101 is determined to be a voice sentence that initiates or continues a conversation.

At 105, a reasoning module is applied. For example, an autonomous robotic system includes a reasoning module that identifies and retrieves supporting knowledge related to the input event detected at 101. In some embodiments, the knowledge is retrieved from a knowledge store such as a memory graph data structure that captures and organizes data previously learned including data from sources such as conversations, actions, and/or observations, etc. In some embodiments, a reasoning module determines which data of the knowledge store is supporting knowledge in part by utilizing a lexical database. For example, a remote lexical database may be utilized for co-referencing to identify data as relevant to the received input. In various embodiments, a reasoning module may access remote data stores for supporting knowledge in addition to the knowledge store of the system. In various embodiments, the knowledge store may be local and/or remote to the system. In some embodiments, the knowledge store may be partitioned by the entity that generates, creates, and/or receives the knowledge. For example, a knowledge store may contain a separate partition of the data associated with each different user that interacts with the system. In some embodiments, the knowledge store may contain a separate partition of data for the autonomous system. In various embodiments, the knowledge store may be located on a server system and/or in the cloud. In some embodiments, the knowledge store is maintained on the local system and/or device and may be encrypted to limit access to only processes local the knowledge store. In various embodiments, the knowledge store may reside in one or more locations. In some embodiments, the reasoning modules updates the knowledge store based on the input event.

At 107, an artificial intelligence (AI) problem is identified and solved. In some embodiments, the supporting knowledge retrieved at 105 is used to identify and construct an AI planning problem. In various embodiments, the AI planning problem is solved using an AI planner. In some embodiments, once solved, the solution is saved for potential reuse if the same problem is encountered again. In some embodiments, previously solved problems are analyzed to determine the appropriate solution for the current problem. For example, previous solved problems may be matched using a case based reasoning module and the solution re-used for a subsequently generated AI planning problem. In various embodiments, case based reasoning improves the performance of the system compared to a solution that relies solely on an AI planner. In various embodiments, the solution is used to create a response to the input received at 101.

At 109, a solution is executed. For example, in response to a voice input at 101, the solution solved at 107 is executed by generating a voice response that is played to the user. In various embodiments, a voice response is generated using natural language generation. In some embodiments, the executed solution and/or output are added to the knowledge store of the system. As another example, in response to input that is a movement request, an autonomous robotic system will move based on its understanding of the received movement instruction. For example, an autonomous robot may determine to move to a certain location, at a certain speed, using a certain movement pattern (walking, running, crawling, 4-wheel drive, 2-wheel drive, slithering, etc.). In various embodiments, the execution of the solution is performed by an executor module. In some embodiments, the executor module relies on one or more different sub-modules depending on type of input event detected at 101. For example, in the case of a movement request input event, the executor module executes a solution that physically moves the autonomous robotic system and may engage different mechanical control systems including those configured to manipulate motor and steering functionality.

Figure 2:
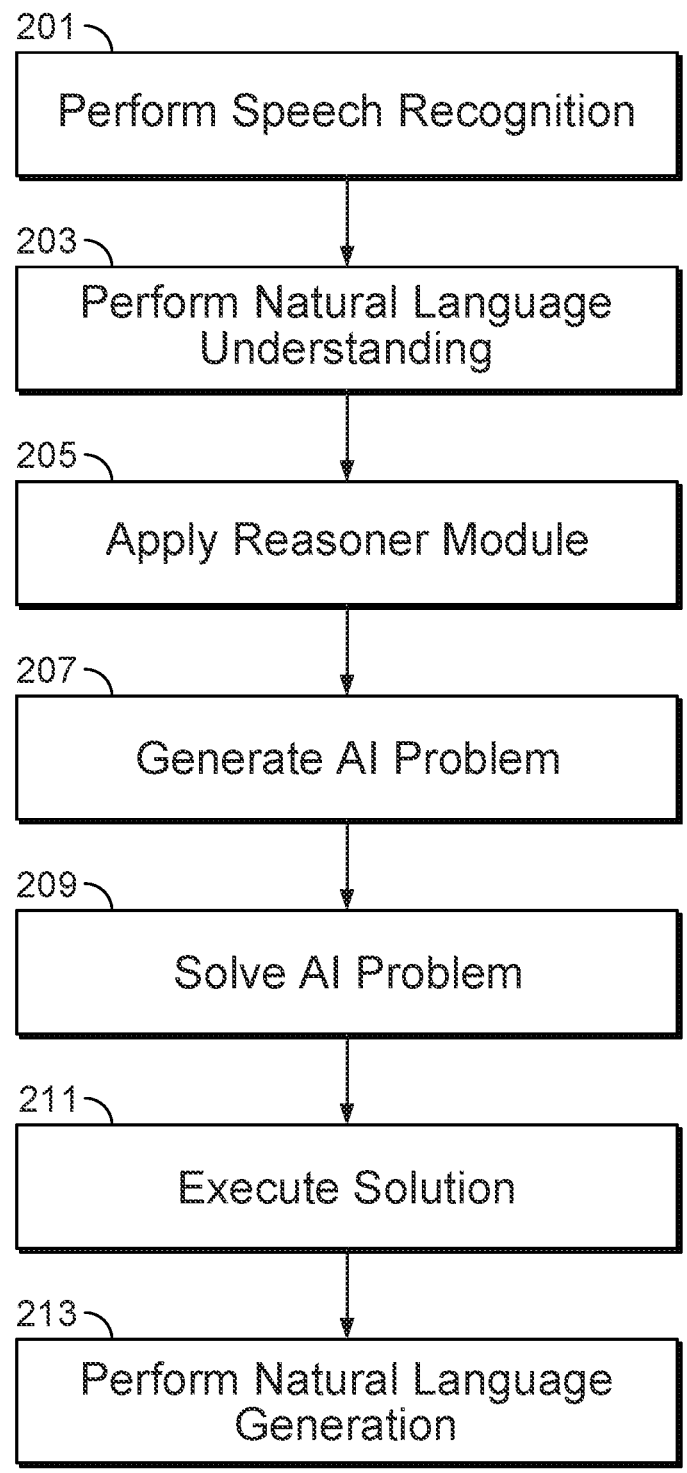
FIG. 2 is a flow diagram illustrating an embodiment of a process for responding to voice input using an adaptive, interactive, and cognitive reasoner with a voice response.

FIG. 2 is a flow diagram illustrating an embodiment of a process for responding to voice input using an adaptive, interactive, and cognitive reasoner with a voice response. In the example shown, the process of FIG. 2 may be used by an autonomous robotic system to create and execute a voice response to a received voice query. For example, a voice artificial intelligence (AI) agent can generate a response to the voice query "What fruit do I like?" that answers the fruit the user previously told the agent that she or he likes. In some embodiments, the process of FIG. 2 is performed using the process of FIG. 1.

At 201, speech recognition is performed. In various embodiments, speech recognition is performed on detected voice input. For example, an input event associated with a spoken sentence is detected as a sound and recognized as human speech. In some embodiments, the speech recognition identifies the beginning and end of a voice input. In some embodiments, the step of 201 is performed as part of the step of 101 and/or 103 of FIG. 1.

At 203, natural language understanding is performed. For example, a natural language understanding process is performed by a natural language understanding module on the speech recognized at 201 to derive meaning from the received human or natural language input. In some embodiments, the natural language understanding functionality is performed by a conversation input processing module. In some embodiments, the step of 203 is performed at 103 of FIG. 1 in response to applying a conversation input processing module to detected voice input.

In some embodiments, the natural language understanding module attempts to identify triples from a sentence. For example, a sentence recognized as speech at 201 is parsed and triples are extracted. In some embodiments, triples are extracted using a parse tree. In some embodiments, reified triples are extracted from the sentence. In some embodiments, the system uses labeled-links to find appropriate modifiers from an element. In various embodiments, reification is utilized to further annotate the recognized sentence.

In some embodiments, the natural language understanding processing includes adding missing punctuation to improve the accuracy of the syntactic parsing. For example, a first set of words of the sentence and corresponding parts of speech tags are analyzed and punctuation may be added. In some embodiments, co-referencing is performed to identify referents prior to creating a parse tree. In some embodiments, the initial parse tree is corrected using a set of pre-defined rules. In various embodiments, the sentence's performative classification is determined and may be utilized to determine the appropriate response. Examples of performative classifications include inform, query-ref, query-if, and request types and may be used to denote the type of communicative act. In various embodiments, fewer or more performatives types may be supported. In some embodiments, the performatives are based on the Foundation for Intelligent Physical Agents-Agent Communication Language (FIPA-ACL) specification. For example, a query-if performative denotes a query (e.g., "Do you like apples?" and "Am I a student?") that expects a true or false response. A query-ref performative denotes a query (e.g., "What fruit do I like?" and "How is the weather today?") that expects a response using an object answer. A request performative is a request directed to the autonomous robotic system. Examples include: "Move forward" and "Turn the light on."

In various embodiments, the natural language understanding process parses the received sentence based on constituency and then added additional information such as the identified subject, verb, and/or object. The module identifies the grammatical structure of the sentence and determines the sentence's performative classification and language.

At 205, a reasoner module is applied. In various embodiments, the reasoner module is implemented using an adaptive, interactive, and cognitive reasoner. For example, an adaptive, interactive, and cognitive reasoner is applied to the voice input processed at 201 and 203. In some embodiments, the reasoner provides data for creating an artificial intelligence (AI) planning problem. For example, the reasoner may retrieve data used to generate an AI problem based on the relevance of stored data to the input to the reasoner. In some embodiments, the data is retrieved from a memory graph data structure that stores episodic memory relevant to each user the robotic system interacts with. In some embodiments, the step of 205 is performed at 105 of FIG. 1.

At 207, an artificial intelligence (AI) problem is generated. In some embodiments, the problem is generated by an AI problem generator using the information provided by applying a reasoner module at 205. In some embodiments, the planning problem is described using an artificial intelligence planning language such as the language described by the Planning Domain Definition Language (PDDL) specification and/or a multi-agent extension of PDDL. In some embodiments, the specifications are Multi-Agent PDDL (MA-PDDL) descriptions that include a domain description and a problem description. In various embodiments, the problem generation includes converting the extracted triple at 203 to an artificial intelligence planning language. The generated problem includes a description of the current status and/or state of the system and one or more goals to achieve. In some embodiments, the step of 207 is performed as part of 107 of FIG. 1.

In some embodiments, the generated artificial intelligence (AI) problem uses a predefined problem domain and includes one or more actions appropriate for the domain. In various embodiments, the actions are defined based on the performative of the input sentence. For example, in some embodiments, the performative classifications include inform, query-ref, query-if, and request to denote the type of communicative act. In various embodiments, fewer or more performative types may be supported. In some embodiments, the performatives are based on the Foundation for Intelligent Physical Agents-Agent Communication Language (FIPA-ACL) specification.

At 209, an artificial intelligence (AI) problem is solved. In various embodiments, the solution is solved using an AI planner. In some embodiments, the AI planner utilizes a machine learning model such as a deep convolutional neural network (DCNN). In various embodiments, a traditional AI planner is utilized to solve the AI planning problem. For example, the planner determines a sequence of actions based on an AI planning problem generated at 207. In some embodiments, once solved, the solution is saved for potential reuse in the event the same or a similar problem is encountered again. For example, the problem, the solution, and the context related to the two are saved in a knowledge store such as a memory graph data structure. In some embodiments, the step of 209 is performed as part of 107 of FIG. 1.

In some embodiments, a case based reasoning (CBR) module is used in addition to an AI planner. For example, a CBR module is utilized to increase the performance of AI problem solving by relying on previously solved AI problems and their solutions. Previous solutions are stored as case data using the CBR module. In some embodiments, the data for a case includes at least the problem and an associated sequence of actions determined to solve the problem. In response to a new AI planning problem that matches a previous case, the previously solved solution is utilized instead of re-solving the same problem. In various embodiments, utilizing the CBR module reduces the response time for solving an AI problem.

In some embodiments, case data are stored in a knowledge store such as a memory graph data structure. For example, case data stored may include sender, receiver, time, planner, problem, and solution information. In various embodiments, the sender information identifies the speaker, the receiver information identifies the listener, the time information is the time associated with the conversation, the planner information includes the type of planner used for generating the solution, and the solution information is the action plan of the selected planner.

At 211, the solved artificial intelligence (AI) problem solution is executed. In some embodiments, an executor module executes the solution plan to the AI problem. In various embodiments, the executor module uses one or more different sub-modules to execute the solution based on the input event. For an input event requiring a voice response, the executor module utilizes a natural language generation sub-module and processing continues to 213 where a voice response is generated. In some embodiments, the step of 211 is performed as part of 109 of FIG. 1

At 213, natural language generation (NLG) is performed. In various embodiments, a NLG module performs NLG processing to generate a voice response based on the AI solution solved at 209. In some embodiments, the NLG module performs reconstruction, fixes grammatical errors, and corrects person discrepancies detected in the AI solution to create a more accurate natural language response before converting the solved solution to a voice response. In some embodiments, the step of 213 is performed as part of 109 of FIG. 1.

In some embodiments, the natural language generation (NLG) processing includes parsing string of triples and making a graph of the solution solved at 209. A parsed tree is created using the graph to determine the ordering of the sentence and the subject, predicate, and object(s) of the sentence. In some embodiments, the data is coreferenced. For example, names may be replaced with personal pronouns. In some embodiments, the NLG module utilizes the entire (i.e. whole) sentence without omission of words or changes in grammatical structure to generate a natural language response.

Figure 3:
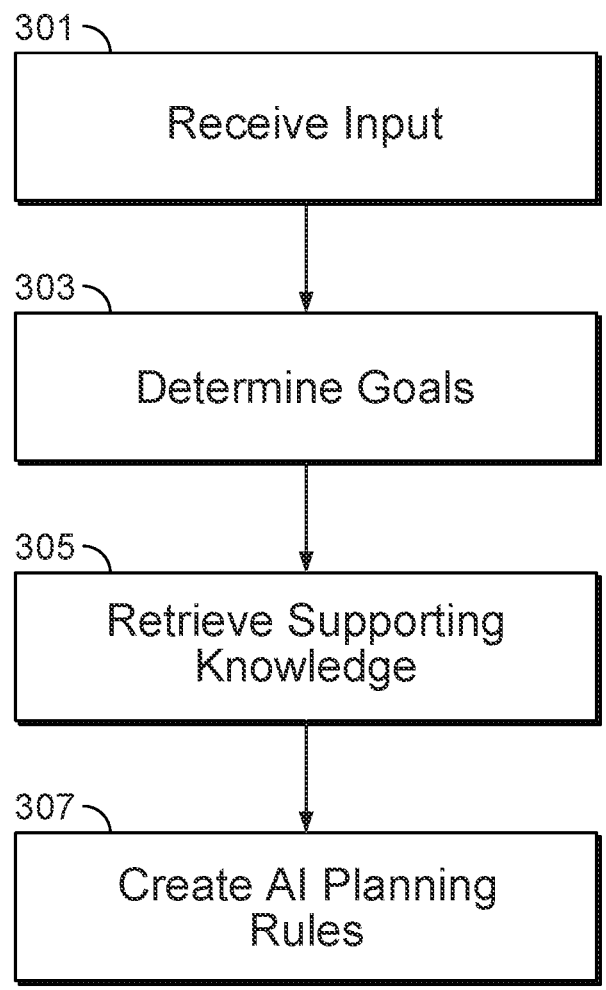
FIG. 3 is a flow diagram illustrating an embodiment of a process for performing reasoning by an adaptive, interactive, and cognitive reasoner.

FIG. 3 is a flow diagram illustrating an embodiment of a process for performing reasoning by an adaptive, interactive, and cognitive reasoner. In various embodiments, the process of FIG. 3 identifies and retrieves supporting knowledge and goals and creates artificial intelligence (AI) planning rules based on the determined information. In some embodiments, AI planning rules are utilized to create an AI planning problem. In some embodiments, the process of FIG. 3 is performed at 105 of FIG. 1 and/or 205 of FIG. 2.

At 301, input is received. For example, a reasoner module receives input such as the input sentence. In some embodiments, an input sentence and a talk mode is received. Examples of talk mode include a query mode and a quiz mode. In some embodiments, a query mode is used for retrieving information from a robotic system. In some embodiments, a query talk mode is also referred to as a conversation and/or normal talk mode. In some embodiments, a quiz mode is used for testing the user on a particular subject, such as a language, using the robotic system. For example, in quiz mode, the robotic system may quiz the user on a subject matter that the user is learning. In some embodiments, the input is received by a reasoner module and the reasoner module invokes one or more sub-functions to retrieve information that is appended to the processed input. In some embodiments, a data structure such as an IntentInformation object is used to encapsulate the retrieved information.

At 303, one or more goals are determined. In some embodiments, each goal represents a goal of the speaker and the reasoner module will attempt to achieve one or more of the determined goals. For example, a basic and common goal may be to make the speaker happy. In some embodiments, a goal predicate is determined based on the one or more goals. In various embodiments, the determined goal is based on the needs of the speaker and determined using the input sentence and goal hierarchy. For example, a goal hierarchy may be represented as a goal hierarchy tree where nodes in the tree correspond to the speaker's needs. The goals may be ranked. For example, each goal within the sub-tree may be assigned a score based on how urgent the goal needs to be satisfied. Using the goal rankings, one or more goals may be selected and the selected goals may be prioritized.

At 305, supporting knowledge is retrieved. In various embodiments, the supporting knowledge retrieved is based on the talk mode of the input received at 301. For example, a query and/or conversation talk mode retrieves supporting knowledge based at least on previous conversations. In various embodiments, the retrieved supporting knowledge is provided to a subsequent module, such as a planner module for artificial intelligence (AI) planning to generate a response appropriate for the received input. In various embodiments, the retrieved supporting knowledge is ranked. For example, the ranking is used to prioritize the knowledge.

In some embodiments, the supporting knowledge retrieved is based on a quiz talk mode. For example, in a quiz talk mode, supporting knowledge is retrieved based on the quiz subject. In some embodiments, the supporting knowledge retrieved is information for administering an IQ quiz session. In some embodiments, the retrieved information is based on the current IQ quiz state.

At 307, artificial intelligence (AI) planning rules are created. For example, based on the supporting knowledge retrieved at 305, planning rules are created that may be utilized for AI planning problem creation. In some embodiments, the created rules are based on the priority assigned to each set of data of the retrieved supporting knowledge. For example, in some embodiments, each set of data retrieved is assigned a rank. The supporting knowledge is then prioritized using AI planning rules. In some embodiments, the rules created are used to map retrieved supporting data to an event, such as a user's voice query. In some embodiments, the rules are based on the characteristics of the event. In various embodiments, the resulting rules are provided to an AI planning problem generator step such as step 207 of FIG. 2.

Figure 4:
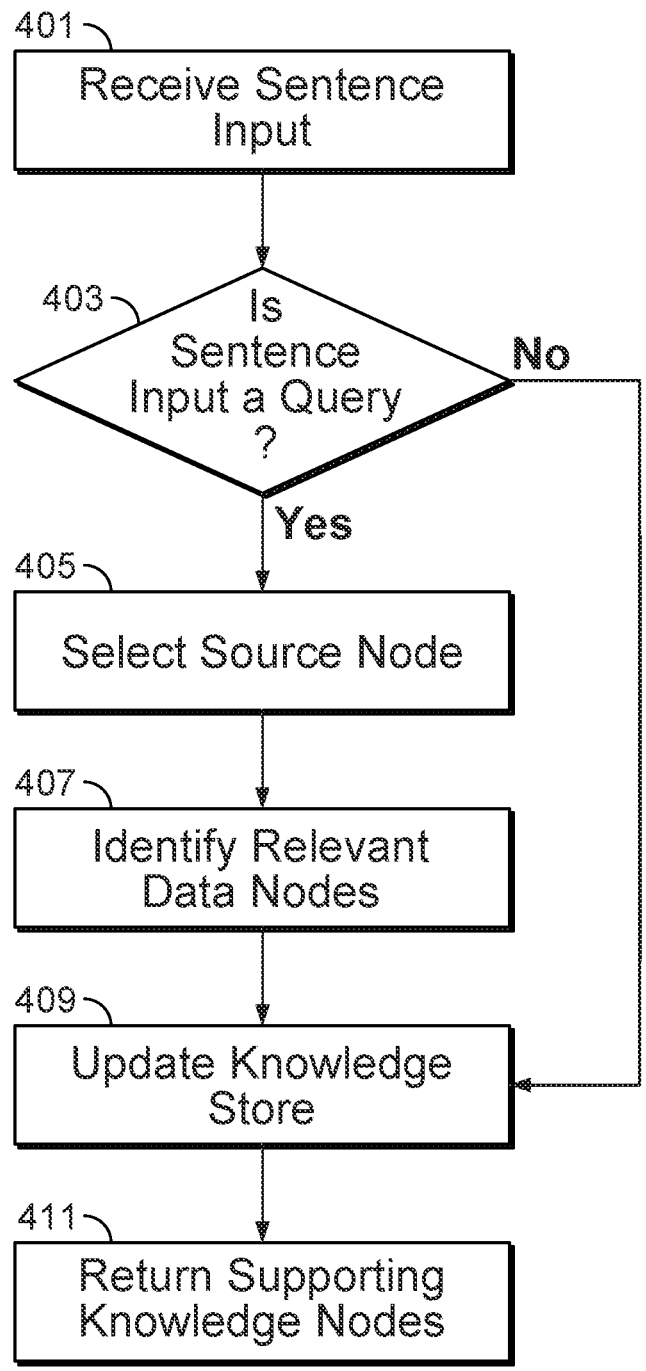
FIG. 4 is a flow diagram illustrating an embodiment of a process for identifying supporting knowledge.

FIG. 4 is a flow diagram illustrating an embodiment of a process for identifying supporting knowledge. In various embodiments, the process of FIG. 4 is performed by an adaptive, interactive, and cognitive reasoner to identify supporting knowledge from a memory graph data structure. For example, an adaptive, interactive, and cognitive reasoner performs the process of FIG. 4 using a knowledge store to help generate a voice response to a voice input event. In some embodiments, the process of FIG. 4 is performed at 305 of FIG. 3.

At 401, a sentence input is received. In some embodiments, the sentence input is a sentenced processed using a natural language understanding module. In various embodiments, the received sentence input includes component information such as identified parts of speech, lemmas (e.g., subject, predicate, and/or object lemma), coreference relationships, and performative classification, among others.

At 403, a determination is made whether the sentence input is a query. For example, the input sentence received at 401 is evaluated to determine whether the input is a query such as a question to the autonomous robotic system. In some embodiments, the determination utilizes the performative classification of the input sentence. For example, a sentence input includes a performative classification that identifies the sentence as a type of query performative (e.g., query-if, query-ref, etc.) or as an inform performative. In some embodiments, the performative classification utilizes the Foundation for Intelligent Physical Agents-Agent Communication Language (FIPA-ACL) for performative classification. In response to a sentence input that is a query, processing continues to 405. In response to a sentence that is not a query, such as an informative sentence, processing continues to 409.

At 405, a source node is selected from a knowledge store. In various embodiments, a source node is selected from a knowledge store such as a memory graph data structure based on the identified speaker. For example, a speaker related to the sentence input is identified and the source node corresponding to the speaker is selected. In various embodiments, a knowledge store is partitioned by speakers such that knowledge data can be accessed by speaker identity. For example, for an autonomous robotic system that has interacted with two different users, Alice and Bob, at 405, the source node for Alice is selected in response to a query initiated by Alice and the source node for Bob is selected in response to a query initiated by Bob. In various embodiments, a source node is selected since an autonomous robotic system partitions stored knowledge data by user and/or agent. For example, the knowledge data associated with each user includes user information related to that user's conversation history with the autonomous robotic system. In some embodiments, agents include the autonomous robotic system itself and may include other robotic agents acting autonomously.

In various embodiments, the knowledge store stores a history of conversations that the system has engaged in. In some embodiments, the knowledge store includes information captured by sensors such as location, time, weather, etc. In some embodiments, a declarative memory holds the system's knowledge about the world and itself. In various embodiments, the knowledge store is implemented using a memory graph data structure.

At 407, relevant data nodes are identified. For example, data nodes of a knowledge store, such as a memory graph data structure, are identified and made candidates for retrieval. In various embodiments, the nodes are either (1) filtered and removed because they are not relevant or (2) selected as relevant to the sentence input. In some embodiments, the selected data nodes are ranked to determine a priority.

In some embodiments, the identification of the data nodes includes several filtering and data retention steps. In some embodiments, the nodes of a memory graph data structure are traversed to identify relevant data nodes. Relevant nodes are retained and irrelevant nodes are filtered from consideration. In various embodiments, the identified nodes are collected and utilized as supporting knowledge.

In various embodiments, the knowledge store is implemented using a memory graph data structure. In some embodiments, each user's sentences are saved in the memory graph under a user identifier. In some embodiments, a root node exists for each user identifier. For example, Alice's sentences are saved under a node tree identified by Alice's user identifier and Bob's sentences are saved under a separate node tree identified by Bob's user identifier. In some embodiments, nodes corresponding to word components of sentences may reference one another. For example, two sentences containing the word "Charles" may reference the same word node. In various embodiments, sentences are saved using a triple format. For example, a triple format may identity a subject, object, and predicate.

In some embodiments, data stating negative facts are removed as candidates for supporting knowledge. For example, a recorded sentence "I am not Tom" is removed as a candidate and is not supporting knowledge. As another example, "He is not hungry" is removed as a candidate and is not supporting knowledge because it states a negative fact. In some embodiments, negatives are preserved for later use. For example, in some embodiments, the negative fact is converted into a positive fact. The positive fact is then utilized as a candidate for matching.

In some embodiments, certain special cases are identified and the associated knowledge node is retained as a candidate for supporting knowledge. In some embodiments, these nodes contain data that cannot be initially dismissed as not supporting knowledge and that is not an immediate match (e.g., a subject-verb-object and/or part of speech match). By preemptively retaining these nodes, their relationship to the sentence input can be determined after additional filtering is performed. For example, in some embodiments, informative statements and/or fact statements are preemptively retained.

In some embodiments, data that is negated by a negative fact is removed from consideration as relevant knowledge data. For example, a user makes the statement "My hobby is programming" followed by the statement "My hobby is not programming." The later negative fact statement negates the first statement and the first statement is removed. In various embodiments, in response to a more recent statement that negates an initial statement, the initial statement is removed as possible relevant knowledge.

In some embodiments, subject-verb-object (SVO) matching is performed to identify relevant supporting knowledge nodes. For example, subjects, verbs, and objects of sentences that match the sentence input are identified and retained as candidate supporting knowledge nodes. Conversely, subjects, verbs, and objects of sentences that do not match the sentence input are discarded from consideration as supporting knowledge nodes. For example, the input sentence "I like fruit" contains the SVO triple "I, like, fruit" and an exemplary sentence "I like skiing" stored in a node of an exemplary knowledge store contains the SVO triple "I, like, skiing." In the example, the subjects and verbs match since both use the subject "I" and the verb "like." However, the candidate node is discarded as supporting knowledge because the objects do not match (i.e., "fruit" and "skiing" are different objects). In various embodiments, Subject-predicate-object (SPO) matching is performed on the lemmas of the words. In some embodiments, parts of speech (POS) matching is utilized. For example, the same parts of speech are analyzed to determine whether a match exists.

In some embodiments, after two sentences are compared, for example, using subject-verb-object (SVO) matching, any non-matching pairs are analyzed for co-reference relationships. Co-reference analysis is performed on the non-matching pair(s) to determine whether they have a particular semantic relationship. For example, in the event that the subjects of two sentences do not initially match, the subject components are candidates for co-reference analysis. In various embodiments, a lexical database, including a remote database, is used to determine whether a co-reference relationship exists. For example, in some scenarios, a synonym relationship exists between two words. As another example, the sentence input word is a hypernym of a word referenced by a knowledge node. In some embodiments, the lexical database is WordNet.

In some embodiments, the sentence input is analyzed and matches are made using synonym relationships. For example, using a lexical database such as WordNet, words that are synonyms, such as "right" and "correct," are matched. As another example, the words "nice" and "good" are matched. By identifying synonyms, synonyms are matched using the techniques described herein such as subject-verb-object (SVO) and parts of speech (POS) matching to select candidate relevant knowledge nodes.

In various embodiments, the sentence input is analyzed and matches are made using a hypernym relation. For example, using a lexical database such as WordNet, a word with a broader meaning (e.g., fruit) is related to one or more words that are more specific (e.g., apples, oranges, and pineapples, etc.). In some embodiments, a hypernym is a word that is a generic term that is used to designate a whole class of specific instances. In various embodiments, hypernyms are identified based on a lexical database and used to identify relevant supporting knowledge nodes. For example, a node with the object "fruit" matches a stored knowledge node with the object "apples" (as long as the subject and verb parts also match) because the input sentence object "fruit" is a hypernym of "apples." As another example, the word "animal" is a hypernym of the word "mammal" and may be used to identify matches for a particular subject or object.

In some embodiments, hypernyms are utilized to derive hypernym relationships. In some embodiments, a derived hypernym relationship is identified by determining whether a word has the same or equivalent meaning of the hypernym of a word. For example, an analysis for a derived hypernym determines that the hypernym of the word "red" has the same meaning as the word "color." Nodes using the word "red" are candidates for matching "color." In an example scenario, a knowledge store includes a node corresponding to the sentence "My hair is red." The sentence input "What color is your hair?" returns supporting knowledge that the correct answer for the color is "red." The analysis for a derived hypernym determines that the hypernym of the word "red" has the same meaning as the word "color."

In some embodiments, the lexical database utilized is the WordNet or similar database. For example, synonyms relationships may be based on synset relationships defined using WordNet. In some embodiments, a synonym matches only if the synonym is within a configured synset range. Words outside the synset range are not considered matches. For example, a synonym relationship is determined in the event a word is within a configured synset range (e.g., a range of 5). Words outside the range are considered obscure forms and are not match material for determining supporting knowledge. In various embodiments, synonyms match only if the parts of speech match as well. In various embodiments, an additional check may be made to require that a fact adjective is derivationally contained in the query noun.

In various embodiments, relevant knowledge nodes can be constructed from information retrieved from a remote lexical database. For example, the answers to questions based on what, where, who, and is queries utilize information from a lexical database such as WordNet. In various embodiments, a query modifier (e.g., what, where, who, and is) is identified and a query structure is compared to determine the query type. For example, in some embodiments, a question initiated with a "What" query modifier is checked to determine that it is composed of "what," "is," and an object (e.g., "What is a lion?"). The definition from a lexical database is retrieved and used as supporting knowledge. In some embodiments, a question initiated with a "Where" query modifier is checked to determine that it is composed of "where," "is," and an object (e.g., "Where is Seoul?"). The part holonym (e.g., South Korea) of the object is determined from a lexical database and used as supporting knowledge. In some embodiments, a question initiated with a "Who" query modifier is checked to determine that it is composed of "who," "is," and an object (e.g., "Who is Obama?"). The definition of the object is determined from a lexical database and analyzed to determine if the definition is about a person. In the event the response is about a person, the definition is used as supporting knowledge. In some embodiments, a question initiated with an "Is" query modifier is checked to determine that it is composed of "is," a subject, and an object (e.g., "Is a lion an animal?"). A lexical database is used to determine whether the object is a hypernym of the subject and the result is used as supporting knowledge.

In some embodiments, the candidate relevant supporting knowledge nodes are prioritized based on a rank. For example, a first sentence contains the words "I like red" and a second sentence contains the words "I like blue." Both sentences are relevant to the query sentence "What is my favorite color?" and their respective knowledge nodes are relevant supporting knowledge. In various embodiments, the relevant nodes are ranked. In some embodiments, the nodes are ranked based on date. For example, in one configuration, earlier nodes are ranked lower than later nodes. In another configuration, earlier nodes are ranked higher than later nodes. As an example, by configuring later nodes to have higher priority, a response to the query sentence "What is my favorite color?" prioritizes the knowledge node with the color blue since that node has a higher priority due to its more recent date. In various embodiments, only the most recent data node (i.e. the most fresh) is retained as a candidate relevant knowledge. In various embodiments, the priority assigned to the nodes may be configurable and/or trained based on expected results.

In various embodiments, additional filtering and/or selecting technique may be implemented to improve the accuracy and/or performance of retrieving supporting knowledge nodes. In some embodiments, one or more of the above techniques may be implemented together in the sequence described or in another appropriate sequence.

At 409, the knowledge store is updated. In various embodiments, the knowledge store is updated based on the retrieved relevant data. For example, one or more additional nodes are added and/or linked based on the input sentence. In some embodiments, the input sentence is inserted into the knowledge store. For example, nodes corresponding to the input sentence are inserted into a memory graph. In various embodiments, related nodes are associated and/or shared. For example, a node corresponding to a person's name from an input sentence is linked to a node associated with a second sentence that utilizes a pronoun (e.g., "I") in place of the same person's name.

At 411, supporting knowledge nodes are returned as output. In various embodiments, the supporting knowledge nodes are references to nodes in a memory graph and include relevance ranking information. In some embodiments, a reference to the nodes of a memory graph is returned. For example, a reference to the data nodes corresponding to supporting knowledge are returned and no copies of the nodes are made. In some embodiments, the relevant knowledge nodes are selected by a unique identifier of the data node. In various embodiments, data nodes of a knowledge store, such as a memory graph, are accessible using the unique identifiers. For example, an artificial intelligence planner can access the relevant knowledge nodes using the set of unique identifiers for the relevant nodes. In some embodiments, a relevant sentence is identified using a node number of the node containing the relevant sentence.

Figure 5A:
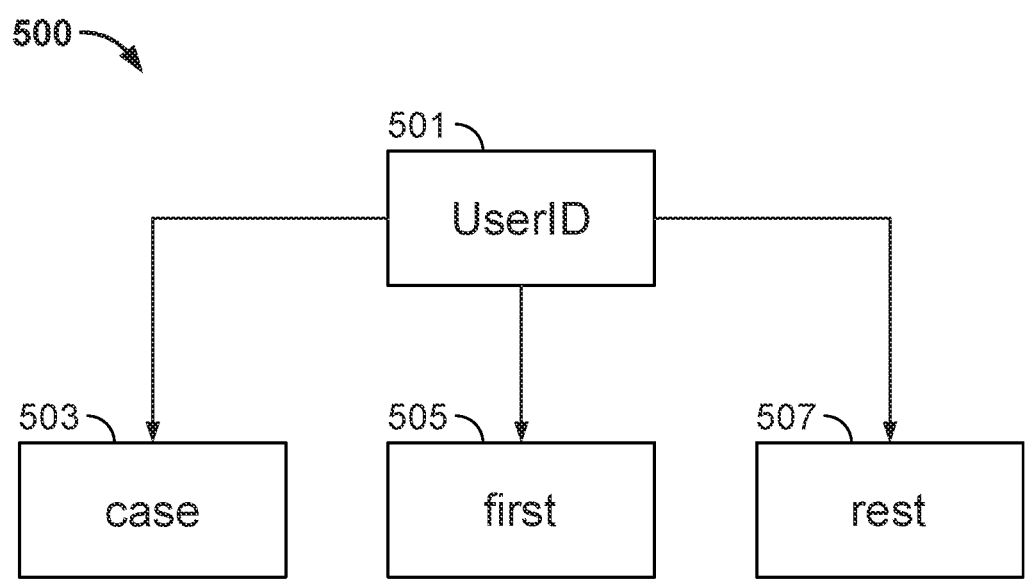
FIG. 5A is a diagram illustrating an example of a memory graph data structure.

FIG. 5A is a diagram illustrating an example of a memory graph data structure. In the example shown, memory graph data structure 500 is an empty memory graph. For example, memory graph data structure 500 represents an initialized memory graph of an autonomous robotic system. In some embodiments, a memory graph data structure includes UserID node 501, case node 503, first node 505, and rest node 507. In various embodiments, UserID node 501 is the root node for a particular user. In some embodiments, UserID node 501 includes a unique user identifier for the referenced user and supporting knowledge associated with the user is stored under UserID node 501. In the example shown, case node 503 is a node associated with cases for previously saved problems and their respective solutions along with additional context. In the example show, there are no solved cases saved in memory graph data structure 500. First node 505 and rest node 507 are nodes for storing new input sentences when they are received. In some embodiments, data associated with first node 505 corresponds to a single input sentence.

In some embodiments, a rest node such as rest node 507 is used to reference additional nodes. For example, a first sentence is recorded under a free first node such as first node 505 and subsequent sentences are recorded under its corresponding rest node such as rest node 507. In various embodiments when no free first node is available, a new sentence is inserted into a memory graph data structure by creating a new first node and a new rest node under an empty rest node. The new sentence is then inserted using the newly created first node. Subsequent new sentences utilize a similar process using the newly created rest node.

In some embodiments, a different root node for each user that interfaces with the autonomous robotic system exists in the memory graph structure. In some embodiments, the autonomous robotic system has its own root node for storing supporting knowledge including output responses by the system. In various embodiments, the root nodes are identified using a unique user identifier. In some embodiments, the sub-trees of each root node can share and/or reference the same nodes. For example, different sub-trees can reference the same supporting knowledge node.

Figure 5B:
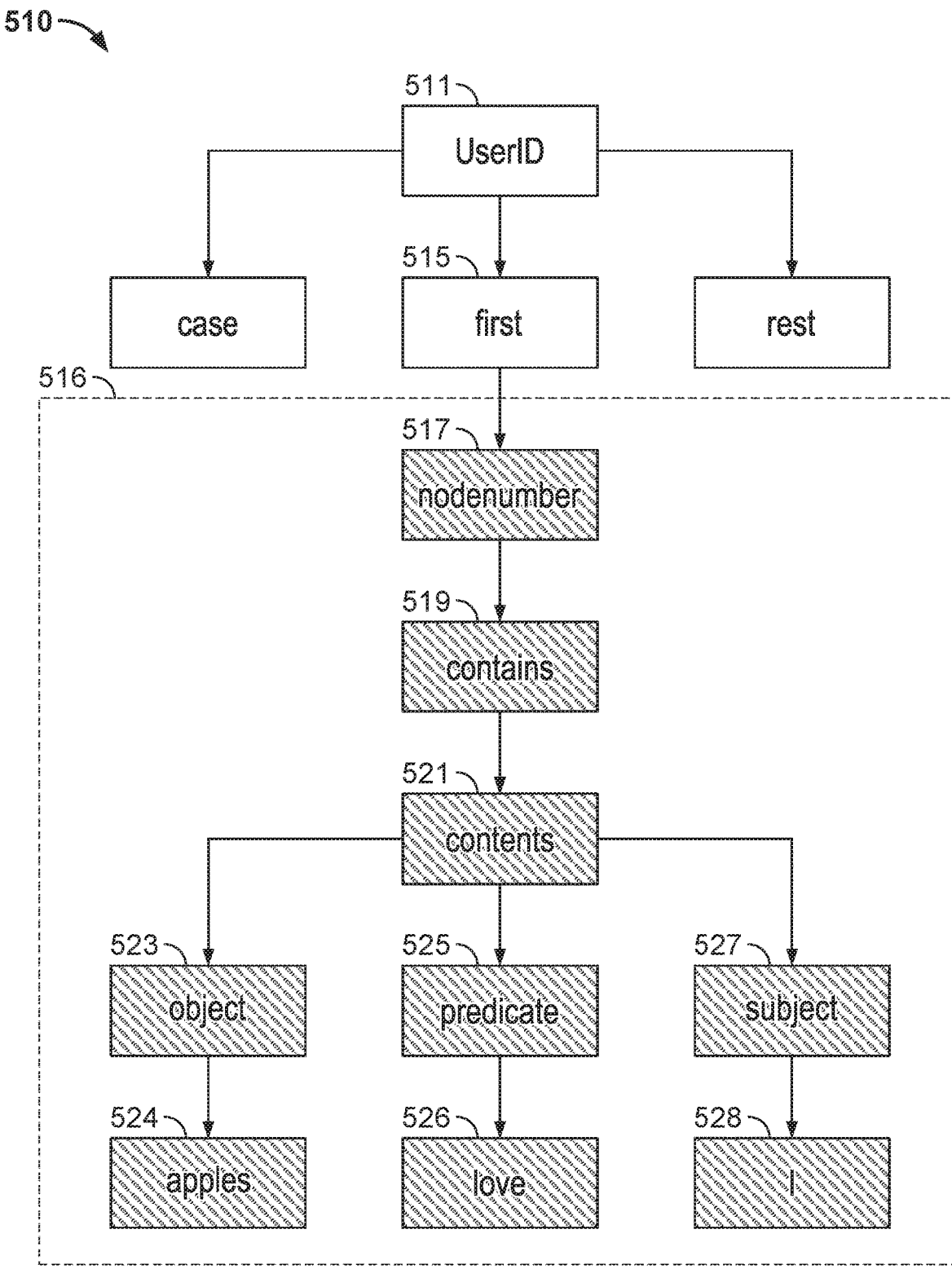
FIG. 5B is a diagram illustrating an example of a memory graph data structure.

FIG. 5B is a diagram illustrating an example of a memory graph data structure. In the example shown, memory graph data structure 510 is memory graph data structure 500 of FIG. 5A after the sentence "I love apples" is spoken by a user and processed by a reasoner. In the example, the input sentence is an informative sentence and not a query. Memory graph data structure 510 includes at least the nodes UserID node 511, first node 515, node-number node 517, contains node 519, contents nodes 521, object node 523, "apples" node 524, predicate node 525, "love" node 526, subject node 527, and "I" node 528. The sentence "I love apples" is converted to a triple using the processes described herein and represented by input sentence tree 516. Input sentence tree 516 includes the nodes shown within the dotted boundary lines. Input sentence tree 516 includes the nodes node-number node 517, contains node 519, contents nodes 521, object node 523, "apples" node 524, predicate node 525, "love" node 526, subject node 527, and "I" node 528. In some embodiments, UserID node 511 is UserID Node 501 of FIG. 5A.

In various embodiments, a new input sentence tree is inserted into a memory graph data structure at a first node. In the example shown, input sentence tree 516 is inserted into memory graph data structure 510 using first node 515. In various embodiments, a new sentence tree is inserted into a memory graph data structure at the first available first node. In some embodiments, a first node is nested under a rest node. In some embodiments, a first node is created under a free rest node.

In the example shown, node-number node 517 includes a node number that uniquely identifies the input sentence represented by input sentence tree 516. Contains node 519 is a container node that encapsulates the contents associated with input sentence tree 516. Contents node 521 is a contents nodes that may be used to reference the contents associated with the sentence. For example, a reference (such as a pointer) to contents node 521 may be used to retrieve the contents of the sentence. Under contents node 521, subject, object, and predicate nodes point to classified components of the input sentence. Contents node 521 references object node 523, predicate node 525, and subject node 527. Object node 523 references the object of the sentence, the word "apples," by referencing "apples" node 524. Predicate node 525 references the predicate of the sentence, the word "love," by referencing "love" node 526. Subject node 527 references the subject of the sentence, the word "I," by referencing "I" node 528. In various embodiments, each sentence tree inserted into a memory graph data structure utilize a structure similar to the one described above with respect to input sentence tree 516.

Figure 5C:
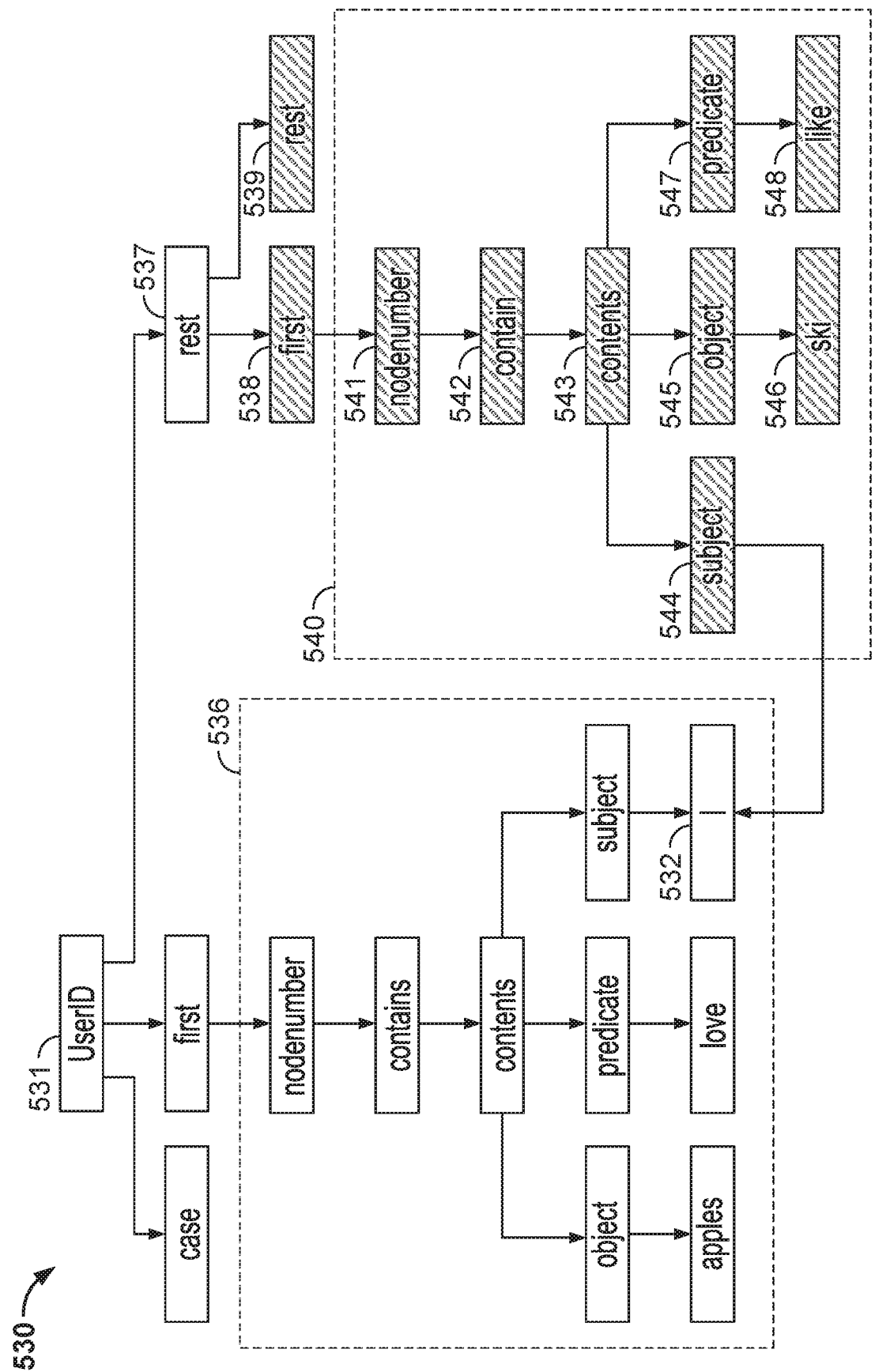
FIG. 5C is a diagram illustrating an example of a memory graph data structure.

FIG. 5C is a diagram illustrating an example of a memory graph data structure. In the example shown, memory graph data structure 530 is memory graph data structure 510 of FIG. 5B after the sentence "I like skiing" is spoken by the user and processed by a reasoner. In the example, the input sentence is an informative sentence and not a query. Memory graph data structure 530 includes previously inserted input sentence tree 536 corresponding to the sentence "I love apples" and newly inserted input sentence tree 540 corresponding to the sentence "I like skiing." Input sentence tree 540 is identified by a unique node number that is associated with node-number node 541. First node 538 and rest node 539 are new nodes appended to rest node 537 as a location for inserting additional sentences. Input sentence tree 540 is inserted at first node 538 and a future input sentence can be inserted at rest node 539. In various embodiments, at each rest node a new first node and rest node are added for saving new input sentences.

In the example shown, inserted sentence tree 540 includes node-number node 541, contains node 542, contents nodes 543, subject node 544, "I" node 532, object node 545, "ski" node 546, predicate node 547, and "like" node 548. The sentence "I like skiing" is converted to a triple using the processes described herein and represented by input sentence tree 540. Subject node 544 references the subject of the sentence, the word "I," by referencing "I" node 532. Object node 545 references the object of the sentence, the word "skiing," by referencing "ski" node 546. In various embodiments, the lemma of a word is used. For example, "ski" node 546 contains the lemma of the word "skiing." Predicate node 547 references the predicate of the sentence, the word "like," by referencing "like" node 548.

In the example shown, input sentence trees 536 and 540 both contain a reference to "I" node 532. Input sentence tree 536 includes the nodes shown within its dotted boundary lines. Input sentence tree 540 includes the nodes shown within its dotted boundary lines and in addition includes "I" node 532. In some embodiments, the "I" from input sentence tree 536 (for the sentence "I love apples") and the "I" from input sentence tree 540 (for the sentence "I like skiing") are matches and a reference to the same node is used instead of duplicating nodes. In some embodiments, this matching is performed by a reasoning module.

In some embodiments, UserID node 531 is 501 of FIG. 5A and 511 of FIG. 5B. In some embodiments, first input sentence tree 536 is input sentence tree 516 of FIG. 5B. In some embodiments, "I" node 532 is "I" node 528 of FIG. 5B.

Figure 5D:
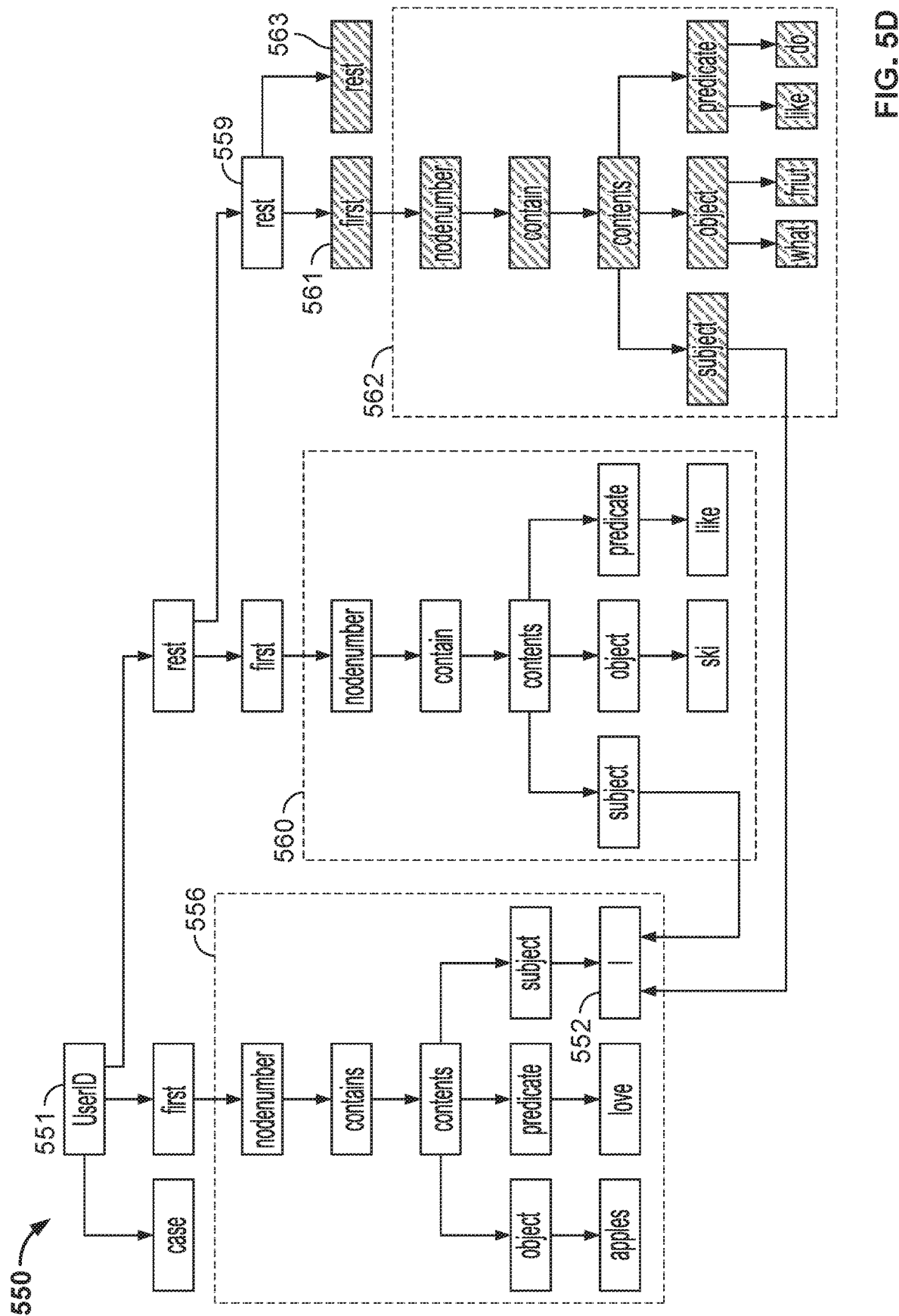
FIG. 5D is a diagram illustrating an example of a memory graph data structure.

FIG. 5D is a diagram illustrating an example of a memory graph data structure. In the example shown, memory graph data structure 550 is memory graph data structure 530 of FIG. 5C after the sentence "What fruit do I like?" is asked as a query by the user and processed by a reasoner. In some embodiments, the input sentence is associated with a query-ref performative. Memory graph data structure 550 includes previously inserted input sentence tree 556 corresponding to the sentence "I love apples," previously inserted input sentence tree 560 corresponding to the sentence "I like skiing," and newly inserted input sentence tree 562 corresponding to the query sentence "What fruit do I like?." First node 561 and rest node 563 are new nodes added to rest node 559 as a location for saving additional sentences. Input sentence tree 562 is inserted at first node 561 and a future input sentence can be inserted under newly created rest node 563. In various embodiments, at each rest node a new first node and rest node are added for saving new input sentences.

Using the processes described herein, the query sentence "What fruit do I like?" is converted to a triple and represented by the input sentence tree 562. Input sentence trees 556, 560, and 562 each include the nodes shown within their respective dotted boundary lines and in addition each includes "I" node 552. In some embodiments, UserID node 551 is 501 of FIG. 5A, 511 of FIG. 5B, and 531 of FIG. 5C. In some embodiments, input sentence tree 556 is input sentence tree 516 of FIG. 5B and 536 of FIG. 5C. In some embodiments, input sentence tree 560 is input sentence tree 540 of FIG. 5C. In some embodiments, "I" node 552 is "I" node 528 of FIG. 5B and 532 of FIG. 5C.

Figure 5E:
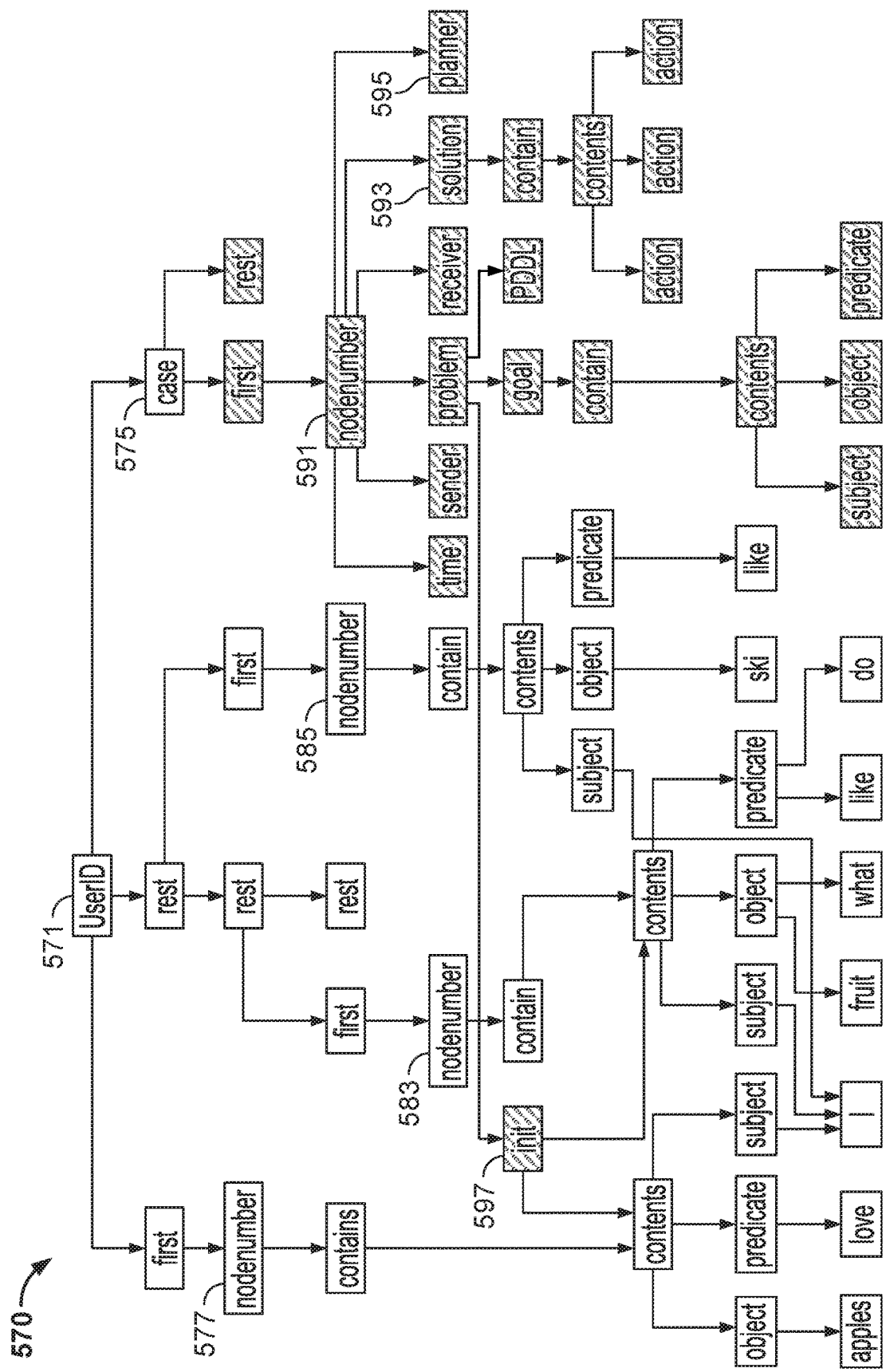
FIG. 5E is a diagram illustrating an example of a memory graph data structure.

FIG. 5E is a diagram illustrating an example of a memory graph data structure. In the example shown, memory graph data structure 570 is memory graph data structure 550 of FIG. 5D after the solution to the query sentence "What fruit do I like?" is solved and stored as a case in memory graph data structure 570. Memory graph data structure 570 includes a previously inserted input sentence tree corresponding to the sentence "I love apples" with root node-number node 577, a previously inserted input sentence tree corresponding to the sentence "I like skiing" with root node-number node 583, a previously inserted query input sentence tree corresponding to the query sentence "What fruit do I like?" with root node-number node 585, and case node 591 that corresponds to the solution of the query input sentence.

In various embodiments, user problems that are solved are saved in a memory graph data structure as cases. In various embodiments, the cases are reused when similar and/or identical problems are encountered. In the example, node-number node 591 is inserted into memory graph data structure 570 at case node 575. Node-number node 591 references a particular case that corresponds to a problem, solution, and context. In various embodiments, cases are inserted using a node-number node under the case node of the relevant user. Node-number node 591 includes multiple nodes. The nodes include at least solution node 593, planner node 595, and init node 597, among others. In some embodiments, solution node 593 is a solution sub-tree that includes a sequence of actions for solving the artificial intelligence (AI) planning problem associated with the case. In some embodiments, planner node 595 is associated with the planner used to solve the AI planning problem. In the example shown, init node 597 is linked to a parent node (not numbered) labeled as "problem" that represents the AI planning problem. Init node 597 contains links to supporting knowledge nodes that include the contents corresponding to the sentences "I love apples" and "What fruit do I like?" Init node 597 does not contain a link to the sentence "I like skiing" because it is not relevant to the problem. The lemma object "ski" and "fruit" do not match and are not determined to be related.

In some embodiments, a case includes at least the problem and the sequence of actions that was used to solve the problem. In some embodiments, the case includes time, sender, problem, receiver, solution, and planner information. In some embodiments, the problem includes a goal expressed using a subject, object, and predicate. In some embodiments, the problem includes supporting knowledge nodes. In some embodiments, the problem is described using an artificial intelligence (AI) planning language. In some embodiments, the solution includes a sequence of actions to solve the AI planning problem. In some embodiments, a case based reasoning (CBR) module is utilized to identify the appropriate case saved in memory graph data structure 570. In some embodiments, the identification of the case is performed at 107 of FIG. 1.

In various embodiments, more or fewer nodes may be used to represent the described data structures of FIGS. 5A-E. For example, in some embodiments (not shown), a contents node may contain a field that stores an object reference that points to a node that stores the object instead of using an intermediary object node.

Figure 6:
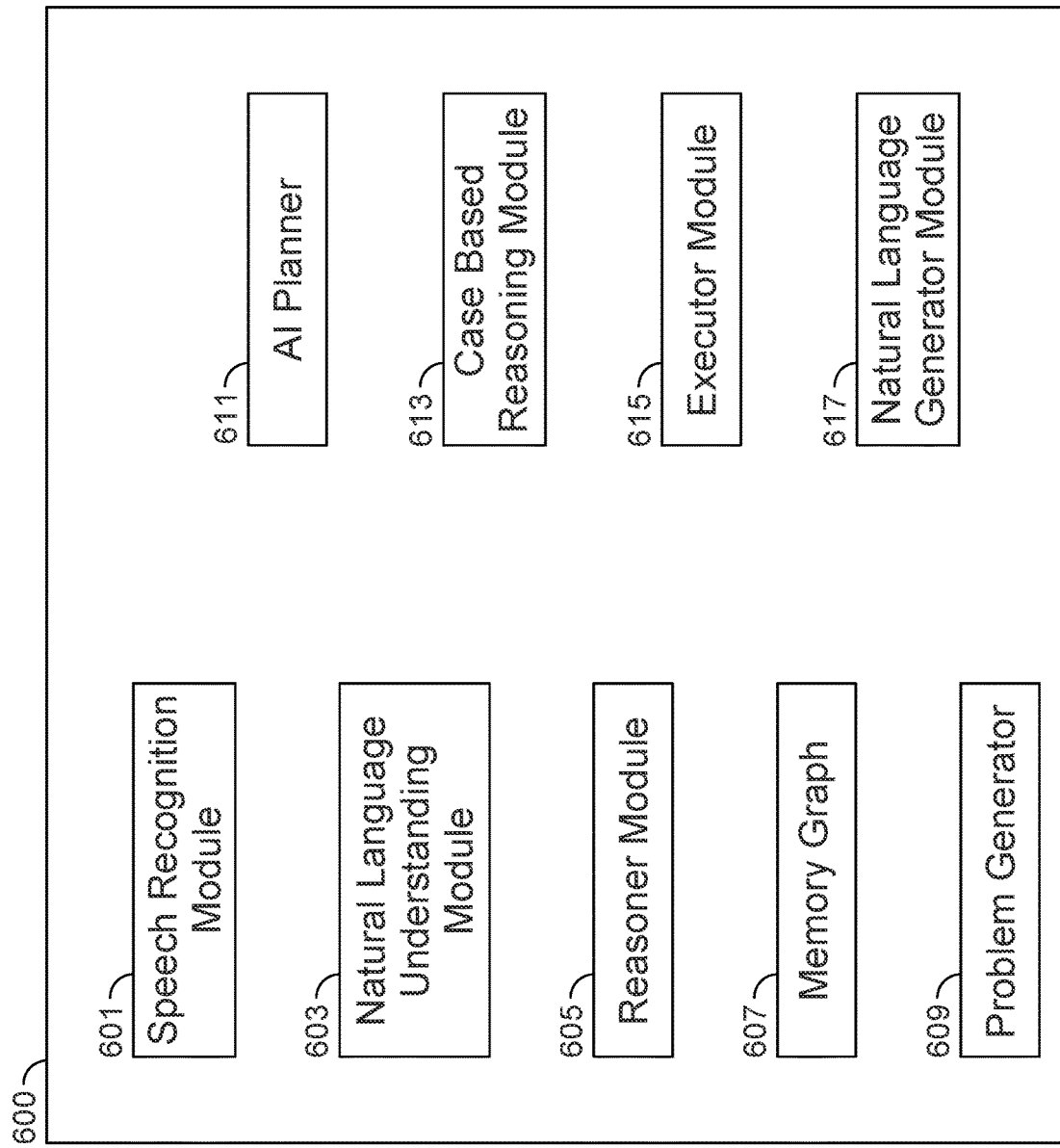
FIG. 6 is a functional block diagram illustrating an embodiment of an autonomous robotic system for responding to voice input using an adaptive, interactive, and cognitive reasoner.

FIG. 6 is a functional block diagram illustrating an embodiment of an autonomous robotic system for responding to voice input using an adaptive, interactive, and cognitive reasoner. In the example shown, autonomous robotic system 600 includes speech recognition (SR) module 601, natural language understanding (NLG) module 603, reasoner module 605, memory graph 607, problem generator 609, artificial intelligence (AI) planner 611, case based reasoning (CBR) module 613, executor module 615, and natural language generator (NLG) module 617. In various embodiments, the functional components shown may be used to implement the processes of FIGS. 1-4. Additional functionality, such as connectivity between functional components is not shown. In some embodiments, the functional components may be implemented using one or more programmed computer systems. For example, the processes of FIGS. 1-4 may be performed using one or more computer processors of one or more programming computer systems. In some embodiments, various modules and/or subsystems may be implemented on different programming computer systems. For example, modules and/or subsystems associated with reasoning module 605 and memory graph 607 may be implemented on a server and/or using a server-side implementation and speech recognition module 601 may be implemented on the local autonomous robotic system using a client-side implementation. In some embodiments, one or more subsystems and/or modules may exist on both the client and server side implementations.

In some embodiments, speech recognition (SR) module 601 is used at 101 and/or 103 of FIG. 1 and/or 201 of FIG. 2. In some embodiments, natural language understanding (NLU) module 603 is used at 103 of FIG. 1 and/or 203 of FIG. 2. In some embodiments, reasoner module 605 is used at 105 of FIG. 1 and/or 205 of FIG. 2. In some embodiments, reasoner module 605 is used to perform the processes of FIGS. 3 and 4. In some embodiments, memory graph 607 is utilized by the processes of FIGS. 1-4 including at 105 of FIG. 1; 205 of FIG. 2; 305 and/or 307 of FIG. 3; and/or 405, 407, 409 and/or 411 of FIG. 4. In some embodiments, FIGS. 5A-E are examples illustrating the contents of different states of memory graph 607. In some embodiments, problem generator 609 is used at 107 of FIG. 1 and/or 207 of FIG. 2. In some embodiments, artificial intelligence (AI) planner 611 and/or case based reasoning (CBR) module 613 are used at 107 of FIG. 1 and/or 209 of FIG. 2. In some embodiments, executor module 615 is used at 109 of FIG. 1 and/or 211 of FIG. 2. In some embodiments, natural language generator (NLG) module 617 is used at 109 of FIG. 1 and/or 213 of FIG. 2.

The functional block diagram of an autonomous robotic system shown in FIG. 6 is but an example of a system suitable for use with the various embodiments disclosed herein. Other autonomous robotic systems suitable for such use can include additional or fewer subsystems. For example, motion detection, vision input processing modules, inter-agent communication modules, etc. are not displayed in FIG. 6 but may be included in the disclosed autonomous robotic systems. As another example, motor control subsystems are not shown in FIG. 6 but may be utilized by the disclosed invention. Other systems having different functional configurations of subsystems can also be utilized.

Figure 7:
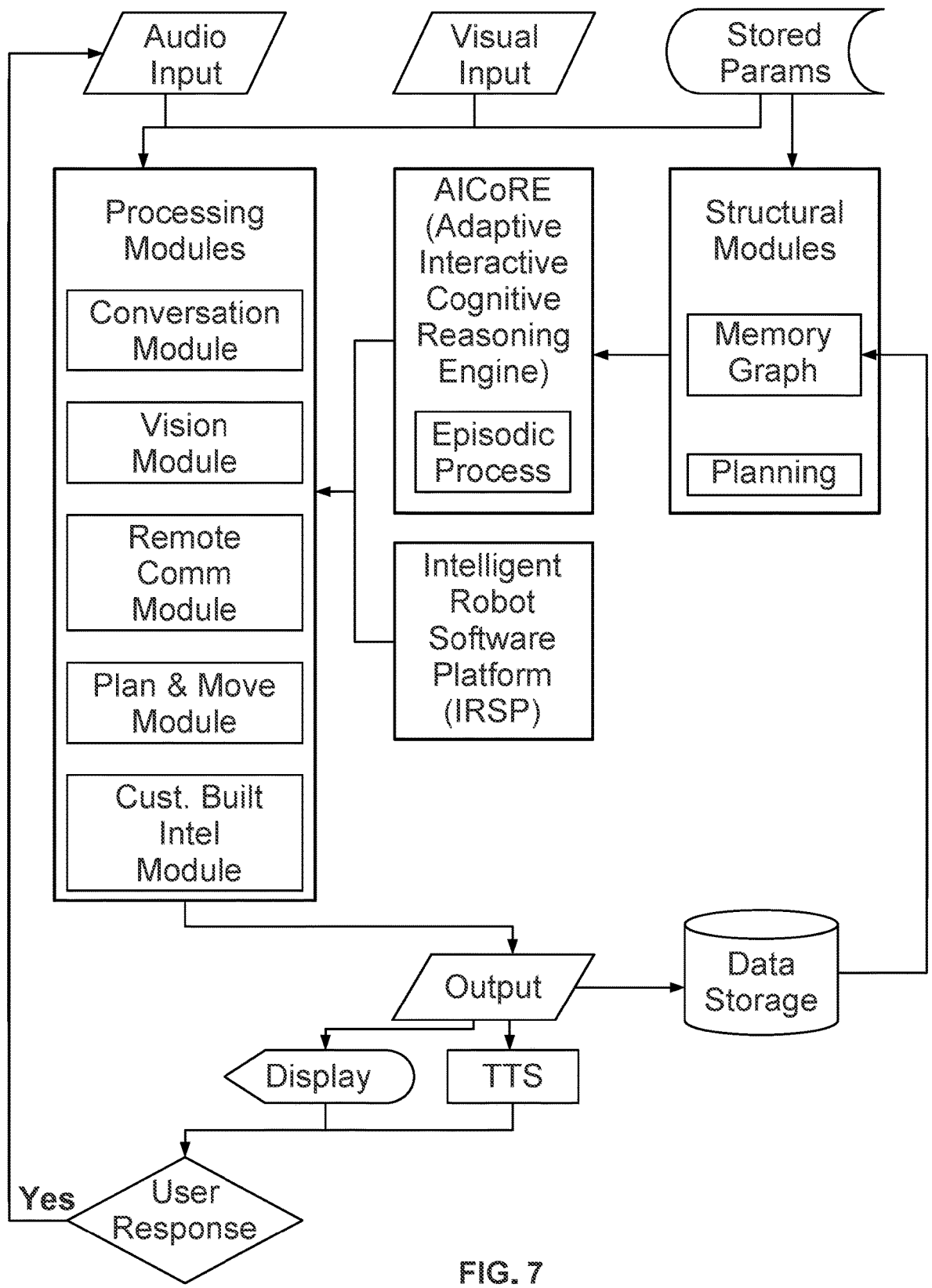
FIG. 7 is a block diagram of an embodiment of an artificial intelligence (AI) robotic system.

FIG. 7 is a block diagram of an embodiment of an artificial intelligence (AI) robotic system. FIG. 7 shows an embodiment of processing modules and components included in an artificial intelligence (AI) robotic system. In some embodiments, the AI robotic system of FIG. 7 performs the processes of FIGS. 1-4. In some embodiments, the components of FIG. 7, in particular the conversation module, the Adaptive Interactive Cognitive Reasoning Engine (AICoRE), and structural modules (memory graph and planning) correspond to functional components of FIG. 6.

Building and operating an intelligent smartphone robot based on domain-independent reactive planning with deep convolutional neural networks is disclosed. The artificial intelligence (AI) robot that talks, listens, thinks and reasons to plan and solve tasks. The system brings educational and entertaining experience to the users by creating an atmosphere that promotes learning, socializing, and playing to enhance imagination and creativity of users. In an embodiment, a plurality of Android applications are executed.

In some embodiments, the system allows users to innovate and add capabilities via custom built intelligence. Modules of the system may include but are not limited to:
- Conversation Module
- Vision Module
- Remote Communication Module
- Plan & Move Module
- Custom Built Intelligence Module The benefits include:
- Human-like intelligence (vision and conversation):
- sees (processes visual data using computer vision technologies)
- listens (processes audio data using speech recognition technology for human voice recognition and natural language understanding)
- thinks (analyzes the given data in data structures based on artificial intelligence technologies)
- responds (visualizes graphical objects on a mobile phone based on computer graphics, generates speech segments, and mechanically operates the artificially-manufactured physical arms and electric motors)
- remembers (stores the relevant episodic data in a database) physical objects and user interactions, while imitating the sensory and cognitive processes of human beings.
- provides an intelligent social companionship to the users through these artificially designed sensory and cognitive processes
- Educational: Through visual and verbal programming, users can build new skills. Intelligent Robot Software Platform (hereinafter iRSP) allows users to be engaged in an advanced level of programming
- Fun: identify and follow certain physical objects like ball, and markers. The system can move around predefined paths using plan and move algorithms.
- Remote communication: communicate with other mobile device such as a mobile phone, and the mobile device can be utilized to remotely control the system.

Additional benefits include:
- Interaction steps with the users, in which the users can be helped to enhance their cognitive skills based on repetitive verbal training.
- Follow ball, read marker capabilities
- Customizable avatar
- Conversational AI
- Cognitive Vision BLE
Collision avoidance system
Computer vision In some embodiments, an artificial intelligence (AI) robot is designed to provide intelligent way of enhancing IQ, an intelligent way of learning English, and a guide to easy robot programming. An exemplary embodiment may include a robot body in a form of a car and a mobile phone as the brain/engine that drives the robot. The communication between the robot body and the AI applications can be performed via a Bluetooth communication. AI Applications are available for Android and iOS systems, developed from highly sophisticated artificial intelligence techniques including natural language processing, machine learning, and computer vision.

AI Applications

The following exemplary artificial intelligence (AI) applications may be utilized to provide additional functionality.

Conversation module: This is an exemplary application that enables the user to communicate with the system in a natural way using the natural human language. This app uses a core technology, called the adaptive interactive cognitive reasoner (AICoRE). This core engine runs on the cloud and the client side of it connects through an API. In various embodiments, this module uses a speech recognition module that allows the user to communicate with the system in natural language.

Memory graph (MG): In some embodiments, a memory graph module is an additional technique to the AICoRE that enables a user to mark and retrieve past events and conversations. For example, conversations in English can be carried out with an intelligent companion using a MG module trained using the beginner level of the Cambridge English Text Book.

Vision apps module: This exemplary app uses a phone camera and processor to implement a number of vision tasks including face detection, face recognition, face tracking, marker/ball detection, and tracking. The view of a face, ball, or marker, while the system is processing functions in one of these vision modes, may be used to trigger an action or movement of the robotic body.

Custom built intelligence module: This exemplary module is also known as a build your own intelligence (BYOI) app. This exemplary app enables users to customize and control robotic actions in an easy way. Visual and verbal programming is also possible through BYOI app. In some embodiments, the BYOI uses an intelligent robot software platform (iRSP). The iRSP can be used to expand the components and functionality of the system.

Plan & Move module: This exemplary module enables the system to navigate a path that is sketched by the user that avoids collisions and obstacles. In some embodiments, this module includes a second mode of Go & Back that can move the robotic system to a destination and back to the origin with a snap taken at the destination.

Remote communication module: This exemplary a module can be used to control the robot body to navigate around.

Hardware and Firmware

In some embodiments, the system includes firmware. Future upgrades may come as updates whenever such are available. Both hardware and firmware are utilized in data communication between the robot body and the smart phone device. Notable components include one or more motors RPM/PWM, accessories (LED and ultrasonic sensor), and general mechanical parts assembly. The included motors allow movements for left, right, backward, and forward direction (e.g., precise movement performed by detecting the encoder data). The motors should operate with minimum noise.

Testing Operation Using Android App

In some embodiments, an app such as an Android app, can be used to independently test the operations of the system. The test is performed over various functions of components including an ultrasonic sensor, encoder board, motor, and LED. The exemplary testing steps for the app can be designed as follows:

1. Install the BluetoothTest apk file on the smart phone
2. Turn on the system
3. Execute "BluetoothTest" app on the smart phone
4. Follow the rest of the steps instructed in the app
5. If the connection is successful, a textview can be indicated as "Connected".
6. The last step is to control the system by touching the buttons to move and switch on/off the LED.
7. The status of the system can be seen on the top-right marked in red showing
    a. H: Headlight (LED) status whether it is ON or OFF
    b. B: Battery charge status in percentage
    c. D: Ultrasonic Sensor distance to the detected obstacle in cm.

AI Application Test Apps

In some embodiments, the system differentiates, recognizes, and remembers humans. The system processes a user's interaction in order to respond to the human's conversational dialog. One major goal of parents is to help children develop their intellectual capabilities whether they are at home or not. In some embodiments, the system may be utilized as an artificial intelligence companion for children to aid them in spending their time is the most fun and yet productive manner with respect to social and psychological aspects. An AI robot exhibits human-like cognitive intelligence such as understanding and reasoning, planning and problem solving, learning and remembering, and has the ability to take simple actions.

AI apps may be available from a publicly shared software repository, such as Google Play and Apple Store. In some embodiments, the system supports Android OS and iOS. In some embodiments, a Wi-Fi connection is necessary to perform some of its functions. In some embodiments, the system may communicate with the smart device via Bluetooth. Examples of AI apps may include:

AI 1. Dialog system—Talk to the system. It will understand and respond to you.
AI 2. Video analytics—Visually recognizes, differentiates, and remembers different people.
AI 3. Plan and move module—Navigate along the drafted path.
AI 4. Remote access module—Communicate with the system remotely
AI 5. Build your own intelligence module—Personalize and customize the system Remote Communication Application In some embodiments, the system is able to connect to a mobile device via a communication service such as the Bluetooth service. In some embodiments, the system can also connect to two mobile devices: one as a controller and the other can be docked on the robot body. The movements of the system can be tested after the connection. For example, the system can move forward, backward, right, and left. The speed can be adjusted by using the buttons on the controls.

Adaptive Interactive Cognitive Reasoning Engine (AICoRE)

In various embodiments, one source of the power of our practical AI agent comes from two central components: a reasoning engine called the AICoRE and a human-like memory called the memory graph (MG). In some embodiments, the adaptive interactive cognitive reasoner (AICoRE) is a cognitive reasoning engine that unifies problem solving and learning. In various embodiments, AICoRe fully automates the reasoning process from end to end. In some embodiments, the AICoRE is incremental holistic human-like reasoner, covering the full spectrum of reasoning from sensing, reasoning, discovering, planning, learning, remembering until responding and performing.

In some embodiments, a central part of the problem solving mechanism is the planner. In various embodiments, the planner is an advanced multi-agent cognitive planner capable of addressing real-world problems among multiple agents.

Unlike most classical planners, which deal with physical actions only, the disclosed cognitive multi-agent planner (CMAP) is capable of dealing with both physical and cognitive (speech) actions. In various embodiments, it may be implemented in a major planning languages called planning domain definition language (PDDL).

In some embodiments, the CMAP is highly practical dealing with real world problems while interacting with multiple agents and humans. In addition, various embodiments also integrate with an incremental case-based reasoner over time. The AICoRE receives and provides data using natural language format with user but changes data structure (triple or PDDL) when processing the data.

Figure 8:
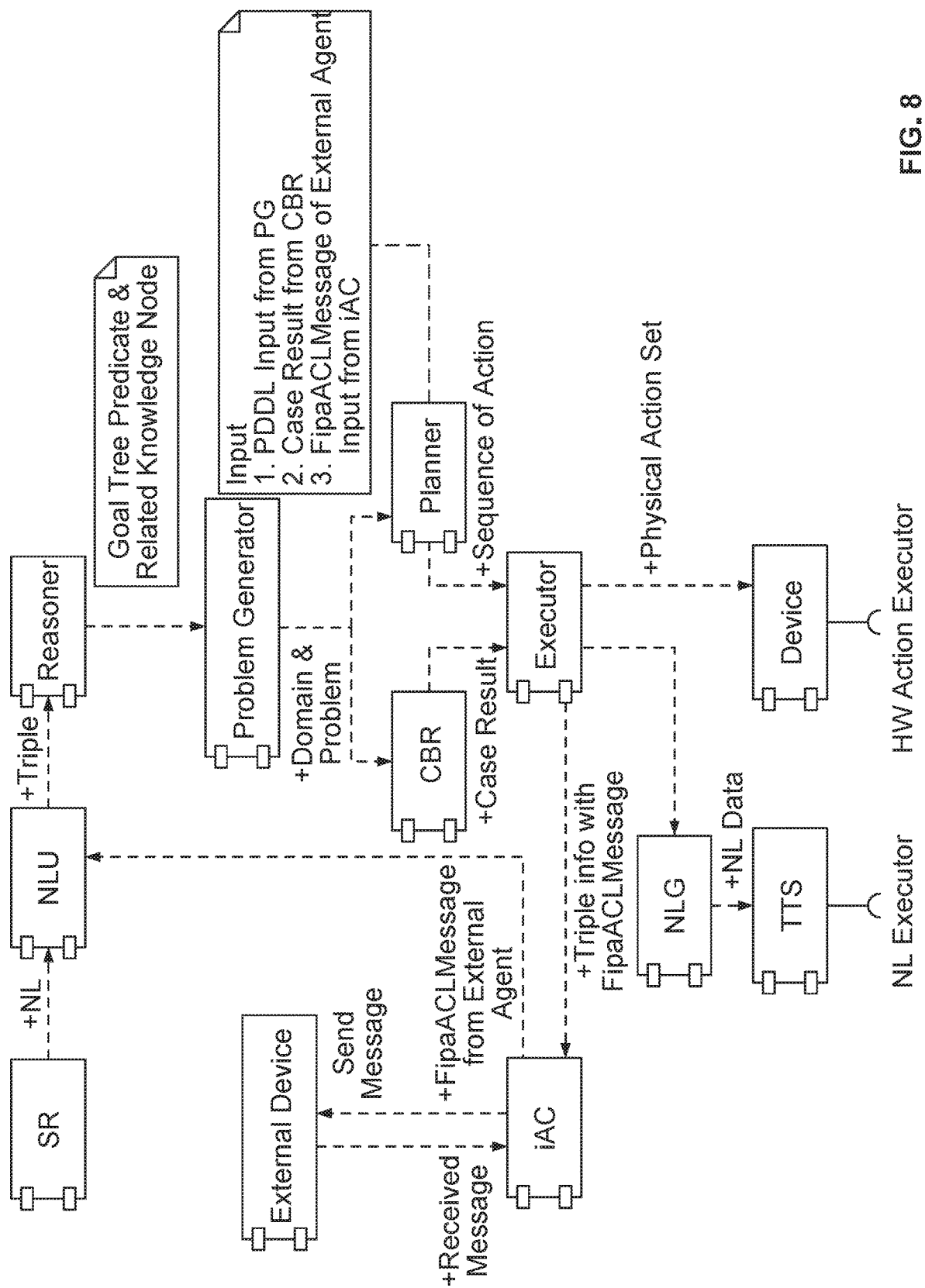
FIG. 8 is a block diagram illustrating an adaptive, interactive, and cognitive reasoner.

FIG. 8 is a block diagram illustrating an adaptive, interactive, and cognitive reasoner. FIG. 8 shows an example of the whole architecture of the AICoRE that includes speech recognition (SR) module or devices. In the example shown in FIG. 8, many modules constitute the AICoRE and are closely related on each other. In various embodiments, the modules and/or devices of FIG. 8 perform the processes of FIGS. 1-4. In some embodiments, one or more modules of FIG. 8 are functional components of FIG. 6.

(1) Natural Language Understating (NLU)

Natural language understating (NLU) is about language processing by computers, and is related to the field of human-computer interaction. NLU enables computers to derive meaning from human or natural language input.

In some embodiments, our natural language understanding module attempts to find triples from a sentence. First, the system uses a natural language processing tool to parse a sentence. Using a parsed sentence, the module extracts triples. The system uses labeled-link, so that it is easier to find an appropriate modifier from an element. The system also uses reification to further annotate about the sentence.

Figure 9:
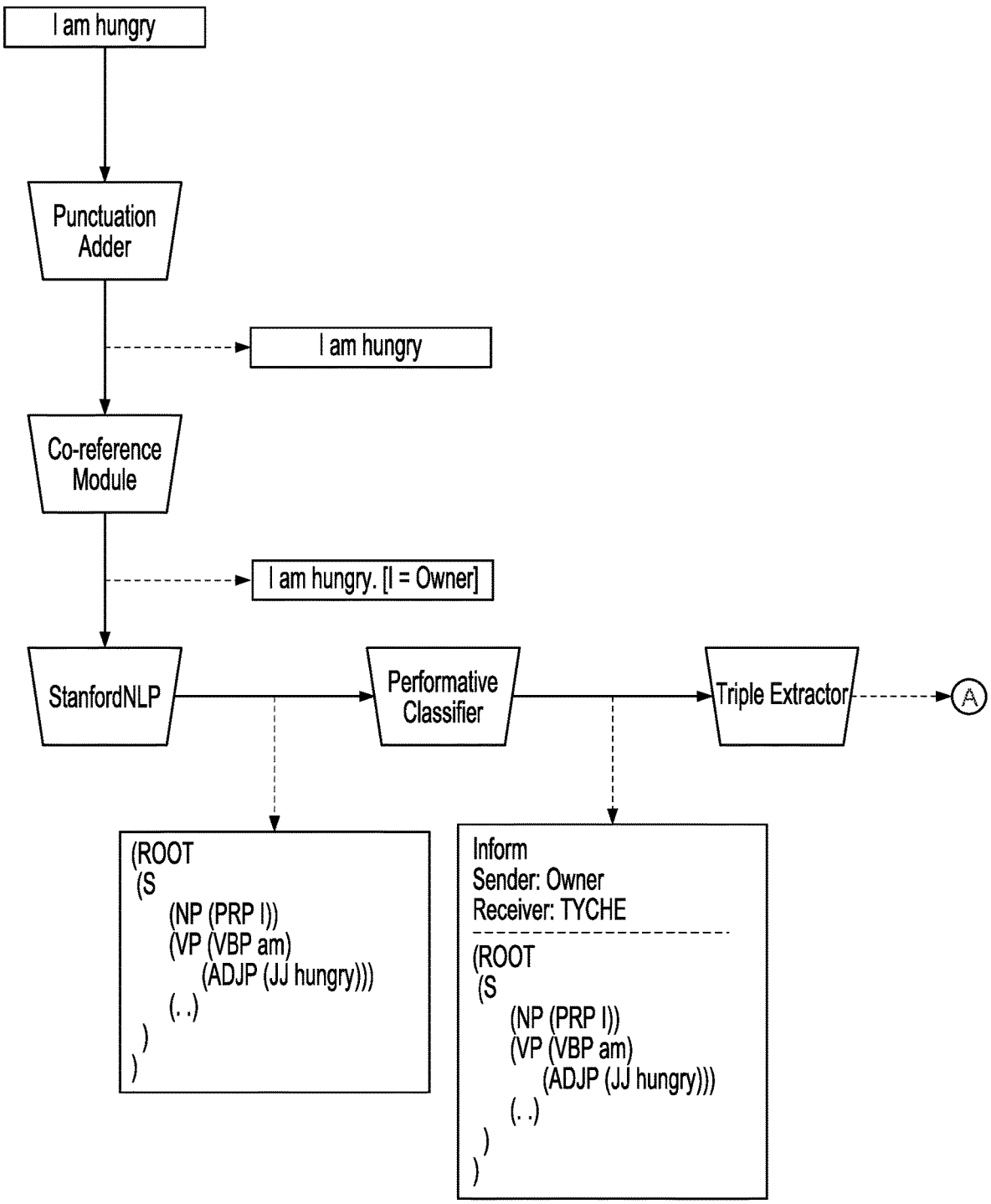
FIG. 9 is a diagram illustrating an embodiment of a process for natural language understanding (NLU).
Figure 9:
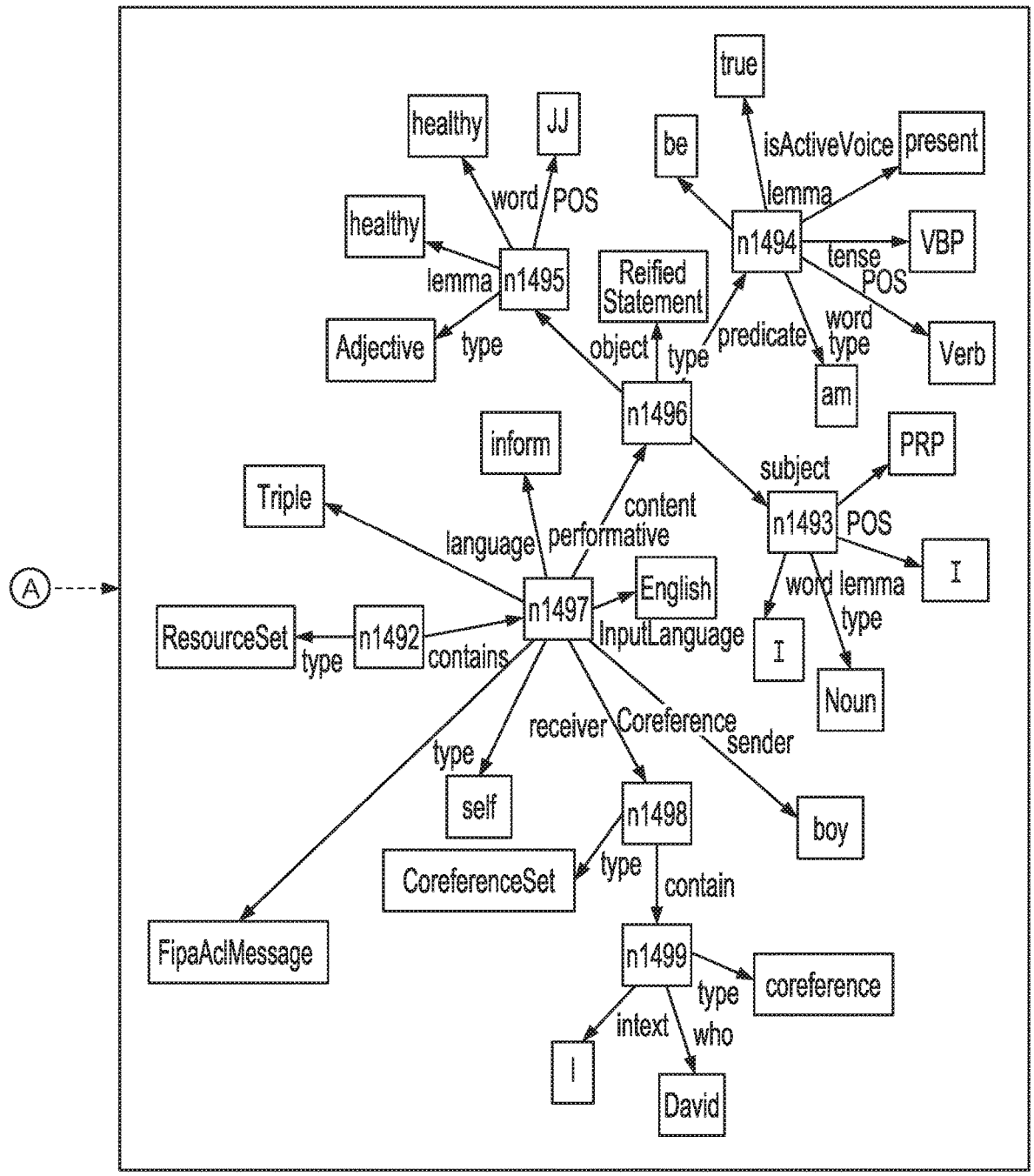

FIG. 9 is a diagram illustrating an embodiment of a process for natural language understanding (NLU). FIG. 9 shows exemplary architecture and processes of natural language understanding (NLU) including input and output of each part. In some embodiments, the process of FIG. 9 is performed at 103 of FIG. 1 and/or 203 of FIG. 2. In some embodiments, natural language understanding module 603 of FIG. 6 performs the process of FIG. 9.

In some embodiment, the first step of the NLU process is to add a missing punctuation. This may be done by analyzing the first few words of the sentence and their POS tags. This first step can improve the result of the syntactic parser. The second step is co-referencing. Co-referencing finds referents of certain words. The next step is to make a parse tree using a natural language processing tool. If there is a wrong parse tree made by the natural language processing tool, the NLU corrects it with a set of pre-defined rules. The next step is to classify the performative of the sentence. The NLU represents the sentence with additional information in a format that is similar to a FIPA ACL message, that is a language for agent communications, and the performative defines a type of the sentence, and it is used to determine what action to take by the planner. The last step is to extract triples using the parse tree. The parse tree itself is consisted of triples, but the triple extractor extracts one reified triple from a sentence and adds more triples to it including the parse tree itself The NLU module is different from other parsers, because it adds more information than any other parsers do. Usually parsers are divided into two categories: one is dependency-based parser and the other is constituency-based parser. The NLU module parses based on constituency first, and then adds more information like what is a subject, verb, and object, which is similar to a dependency parser. The NLU module not only finds grammatical structure of the sentence, but also analyzes which performative and language the sentence is. Performative denotes the type of the communicative act, and the system uses performatives defined in FIPA-ACL.

In various embodiments, the coreference module in NLU can handle conversational data that is a list of speakers and sentences. All sentences in conversation can have different speakers and receivers. Thus, the coreference module checks not only objects in sentences, but also relationships between the speakers and the objects. The coreference module can extract direct co-reference information by using its database.

(2) Reasoner

Figure 10:
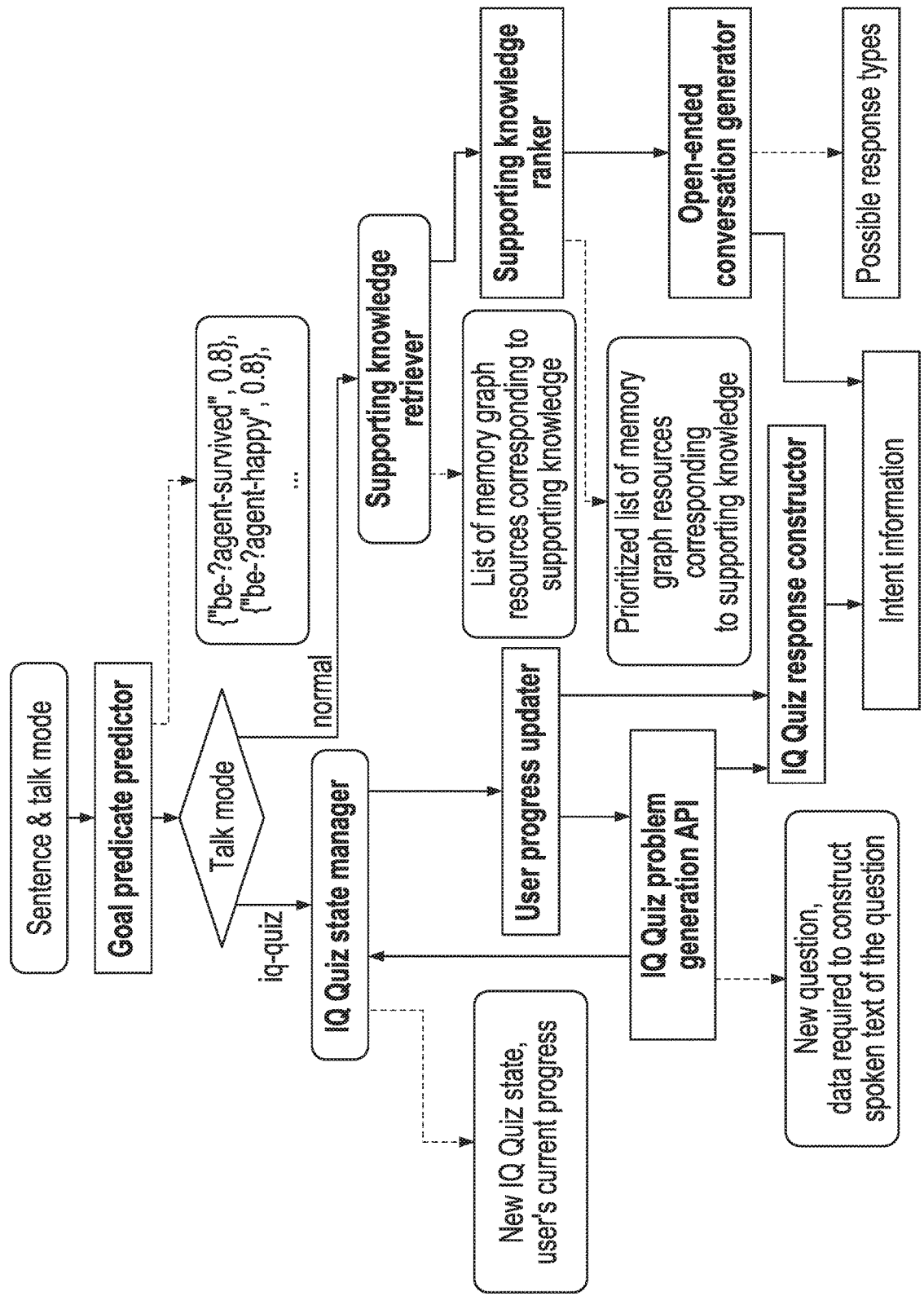
FIG. 10 is a flow diagram illustrating an embodiment of a process for performing reasoning.

FIG. 10 is a flow diagram illustrating an embodiment of a process for performing reasoning. FIG. 10 shows the overall exemplary processes of the reasoner module. Given an input sentence and talk mode, the reasoner module invokes several sub-functions in order to append various information to an 'IntentInformation' class object as its output. In some embodiments, the process of FIG. 10 is performed at 105 of FIG. 1 and/or 205 of FIG. 2. In some embodiments, the process of FIG. 10 describes in further detail the processes of FIGS. 3 and 4. In some embodiments, component of FIG. 6, including reasoner module 605 and memory graph 607, are used to perform the process of FIG. 10.

The first information the reasoner module outputs is goal predicate information, representing which 'goals' of the speaker the module will aim to satisfy. With the basic goal of 'making the speaker happy', the module predicts the needs of the speaker based on the input sentence and outputs a sub-tree of the goal hierarchy that corresponds to the needs. Each goal within the sub-tree is also assigned a score based on how urgent the goal needs to be satisfied.

From here, the reasoner module operates differently depending on the given talk mode, [normal] and [iq-quiz]. The [normal] and [iq-quiz] are predefined in AICoRE as static variable. The talk mode [normal] corresponds to general conversation, while [iq-quiz] stands for the speaker having an IQ quiz session.

If the given talk mode is [normal], the reasoner module will retrieve information that will help the next module (the planner) generate a response fit for general conversation. First, it calls the supporting knowledge retriever sub-function in order to gather a list of memory graph resources corresponding to knowledge (previously uttered speech) that are related to the given input. The reasoner module then ranks these resources in order of importance. Finally, the module calls the open-ended conversation generator submodule in order to get possible response types (greetings, ask-where, etc.) that will serve as templates for generating more natural responses.

If the given talk mode is [iq-quiz], the reasoner module will retrieve information fit for administering an IQ quiz session. First, the IQ quiz state manager sub-function determines what the speaker's input means depending on the current IQ quiz state. Depending on the output state, the reasoner module can also update the current speaker's IQ quiz progress and generate a new problem for the speaker.

Figure 11:
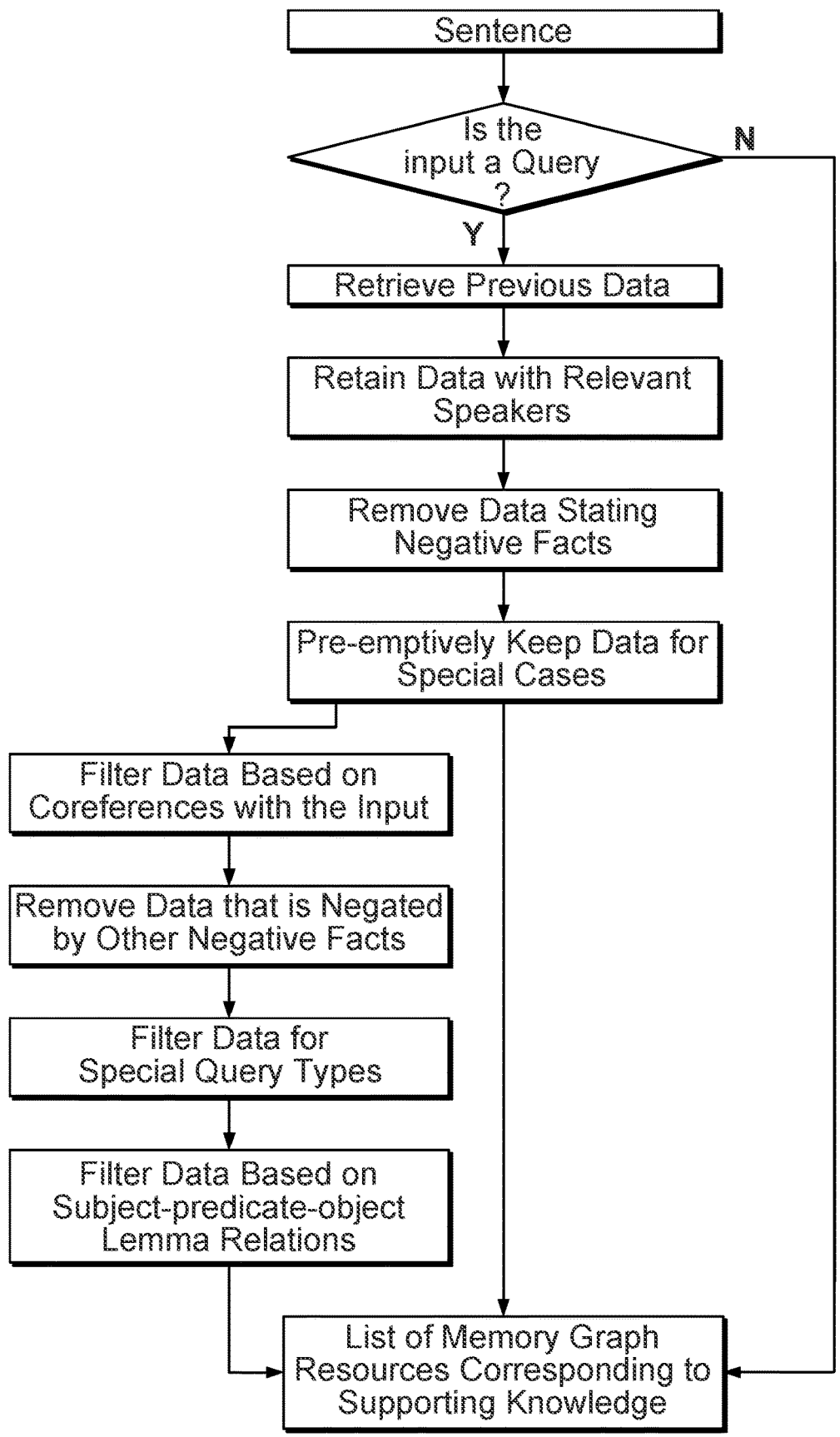
FIG. 11 is a flow diagram illustrating an embodiment of a process for identifying supporting knowledge.

FIG. 11 is a flow diagram illustrating an embodiment of a process for identifying supporting knowledge. FIG. 11 shows the process of the supporting knowledge retriever sub-function of the reasoner module. The sub-function first checks the input's performative in order to determine whether it is a query. If the input is a query, the sub-function determines which previous data (previously spoken data sentences) are related to the given input. This is accomplished via a series of filters that filter the whole set of previous data based on various criteria. In some embodiments, the process of FIG. 11 is performed at 105 of FIG. 1, 205 of FIG. 2, 305 of FIG. 3, and FIG. 4. In some embodiments, components of FIG. 6, including reasoner module 605 and memory graph 607, implement the process of FIG. 11.

(3) Problem Generator and Planner

Planning is a key ability for intelligent systems, increasing their autonomy and flexibility through the construction of sequences of actions to achieve their goals. Planning technique has been applied in a variety of tasks including robotics, process planning, web-based information gathering, autonomous agents and spacecraft mission control.

In various embodiments, the planner of the AICoRE support functions of an artificial intelligence planning language such as Planning Domain Definition Language (PDDL) specification 3.1 and multi-agent PDDL. The 'PDDL domain and problem' are necessary to solve the 'problem'. The AICoRE uses predefined 'PDDL domain', and there are many actions in the 'PDDL domain'. Each action is defined based on FIPA-ACL performative such as inform, query-ref, query-if, and request. In various embodiments, the performative denotes the type of the communicative act. The planner also decides a sequence of actions through comparing communicative act with performative, structure, meaning and intent of recent sentence or data.

In FIG. 8, the problem generator receives data from reasoner, changes the data from triple to PDDL, and generates 'PDDL problem in PDDL format so that the planner solves the problem. Originally, the problem has to include current status and a goal, so that there are user's recent sentence and data related on recent one in 'init' part of 'PDDL problem' to represent the current state.

The AICoRE has the 'GoalTree' that also predefines human's goals from upper step to lower in derived actions of domain to generate goal part in problem. Problem generator can select a goal for the solution in 'GoalTree' and uses the goal when it generates 'PDDL problem.' In addition, the 'PDDL domain and problem' are used by the Case Based Reasoning (CBR) to find same solution.

(4) Case Based Reasoning (CBR)

The CBR is the process of solving new problems based on the solutions of similar past problems. It is not only a powerful method for computer reasoning, but also models a behavior in human problem solving. Much of reasoning is based on past cases personally experienced. In some embodiments, the CBR module checks every conversation and saves all reasoning and action information.

In some embodiments, when a user generates a previously unknown conversation, the CBR module makes a case using a 'PDDL problem' generated by a reasoner and an action plan created by a planner. If the user generates a conversation that is similar to a previous conversation, the CBR module searches for this conversation in the case database. If the CBR module finds a similar case, then the CBR module makes an output by action plan of case. The AICoRE can reduce the response time and processing time by using this CBR module. When the CBR module gets a new problem, the CBR module checks the reasoning information with the new problem compared to saved cases. If there is a matching case, then the CBR module uses its action plans. By reusing solved cases, the CBR module reduces AICoRE's duplication of existing plans.

Figure 12:
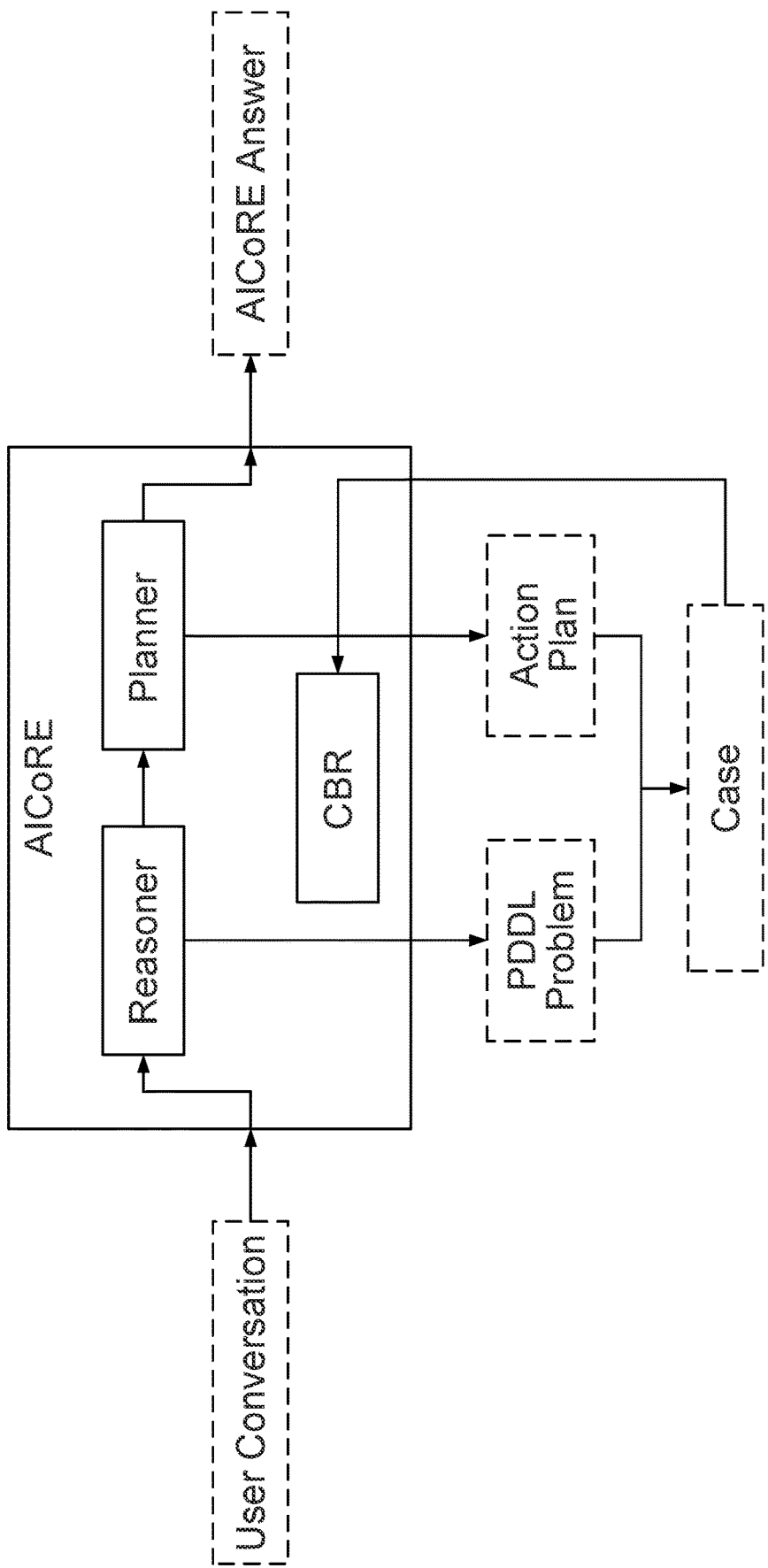
FIG. 12 is a functional block diagram illustrating an embodiment of a retrieve process for processing a case for a new artificial intelligence problem.

FIG. 12 is a functional block diagram illustrating an embodiment of a retrieve process for processing a case for a new artificial intelligence problem. FIG. 12 shows the process of retrieving case. In some embodiments, the process of FIG. 12 is performed at 107 and/or 109 of FIG. 1 as well as 209 and/or 211 of FIG. 2. In some embodiments, the process of FIG. 12 is performed using case based reasoning module 613 of FIG. 6. When a user talks with the AICoRE and user's conversation is translated to previously unknown 'PDDL problem' in Reasoner, and then the AICoRE runs retrieve process. First, the AICoRE makes a CBR case and puts this problem in a case. After the AICoRE makes action plan and executes this plan, CBR modules save this plan to the CBR case. The AICoRE saves this created CBR case as triple set in a triplestore.

Figure 13:
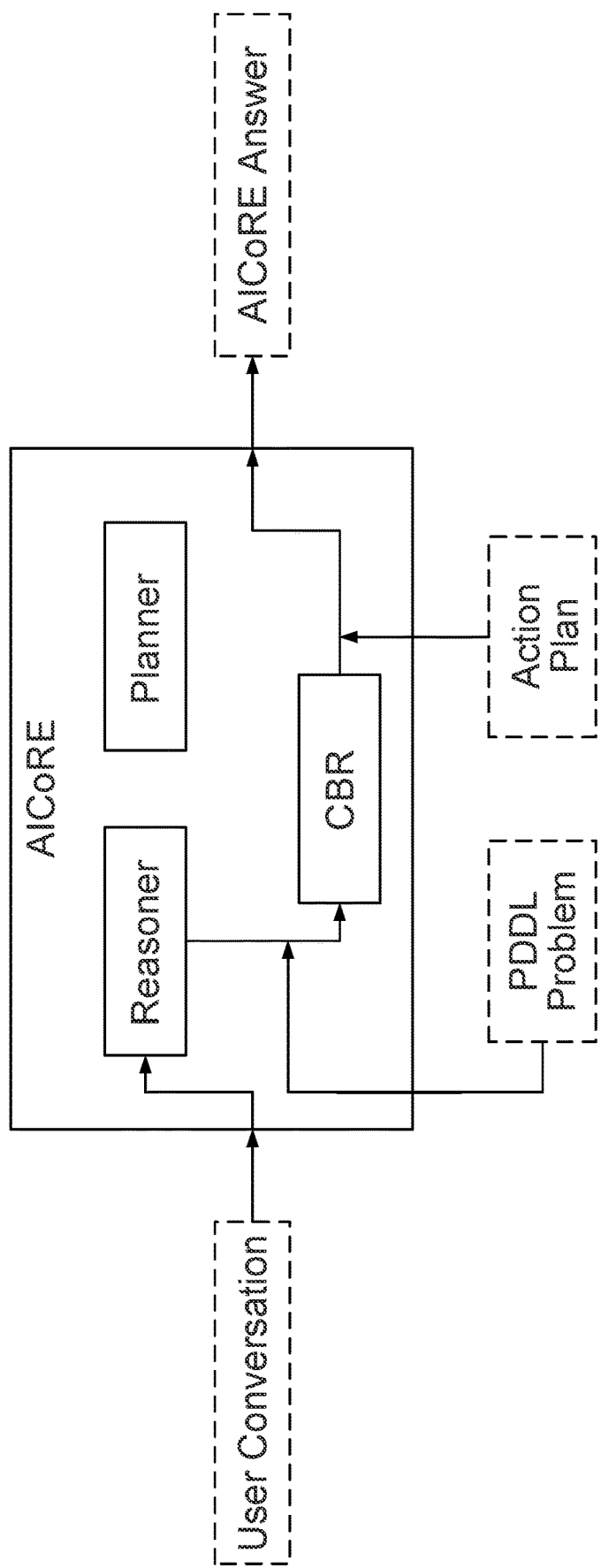
FIG. 13 is a functional block diagram illustrating an embodiment of a process for identifying and reusing a saved case.

FIG. 13 is a functional block diagram illustrating an embodiment of a process for identifying and reusing a saved case. FIG. 13 shows the process of reusing case. In some embodiments, the process of FIG. 13 is performed at 107 and/or 109 of FIG. 1 as well as 209 and/or 211 of FIG. 2. In some embodiments, the process of FIG. 13 is performed using case based reasoning module 613 of FIG. 6. After the AICoRE generates a 'PDDL problem' from conversation, the CBR module finds similar cases with the input case. The CBR module gets all cases in database and checks whether its problem situation is same with input case. In this step, the CBR module gets the case's 'PDDL problem' and checks information of 'PDDL problem'. If the CBR module finds similarity between the input problem and a saved case, then the CBR module will pick the saved case and use its action plan without using the planner module.

(5) Natural Language Generation (NLG)

Natural language generation (NLG) is the task of generating natural language from a machine representation system such as a knowledge base or a logical form. The NLG task may be viewed as the opposite of natural language understanding. In the AICoRE, the planner and reasoner determine what to say, what to change, and so on, so that the NLG does reconstructing, grammar fixing, and person correction.

Figure 14:
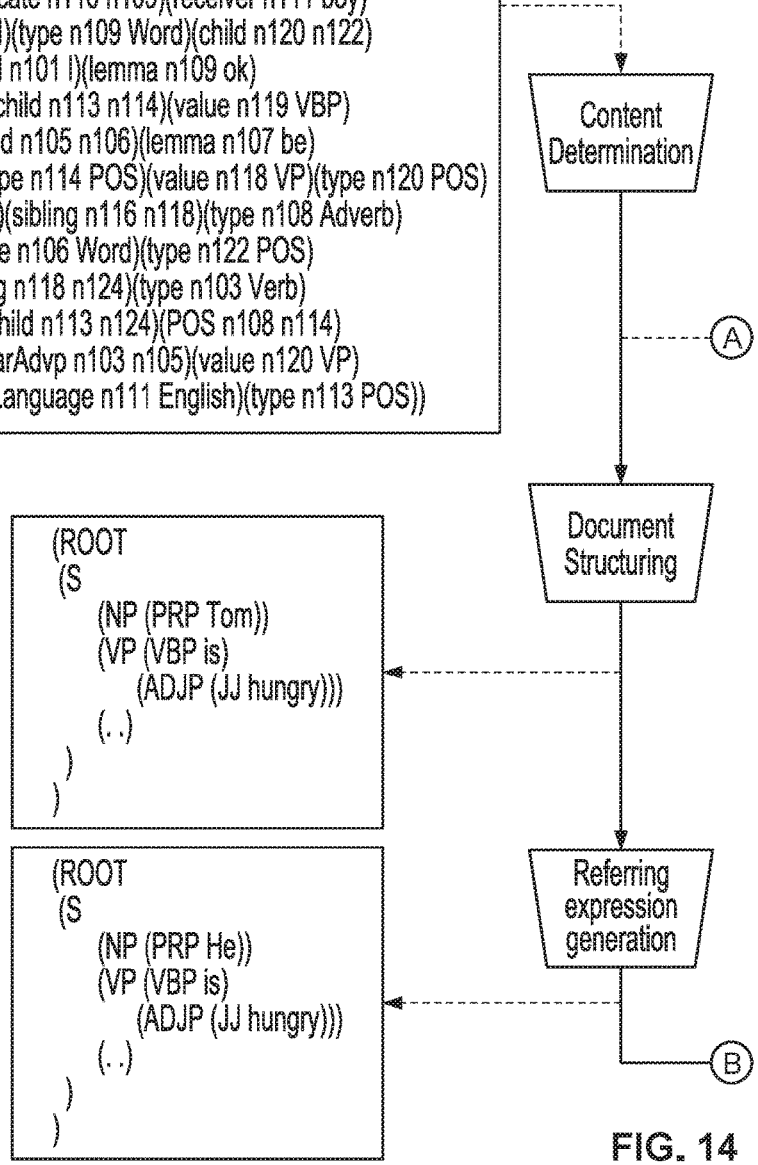
FIG. 14 is a diagram illustrating an embodiment of a process for natural language generation (NLG).
Figure 14:
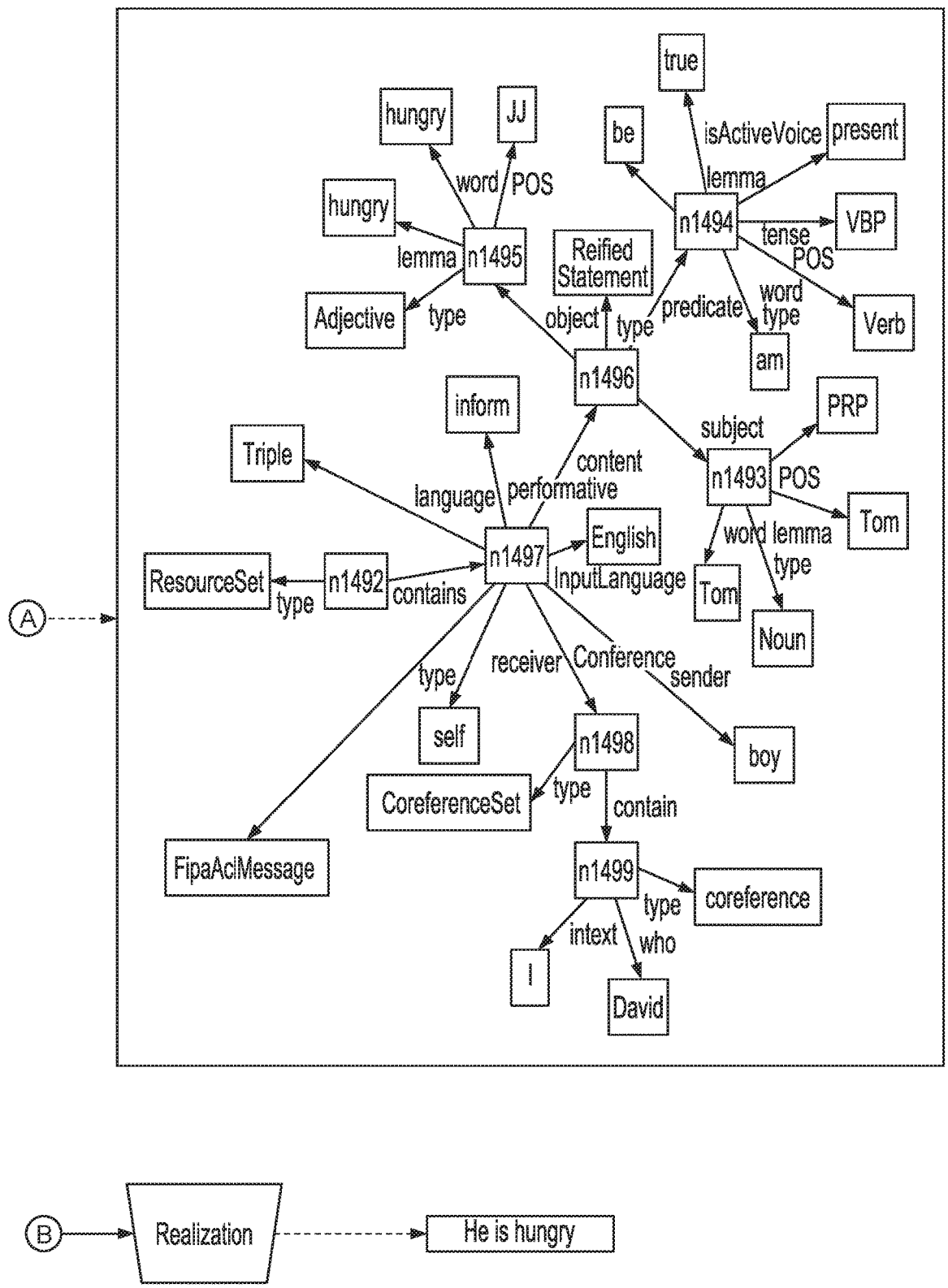

FIG. 14 is a diagram illustrating an embodiment of a process for natural language generation (NLG). FIG. 14 shows an exemplary natural language generation (NLG) architecture including input and output of each part. The first step of the NLG module is parsing strings of triples and making simple graphs for depth first search (DFS) using the result of a planner. Because the result from a planner is in PDDL format, the NLG module converts the format to a graph. Then, it makes a parsed tree by using a DFS search with the stored NLG triple and visited log at document structuring part. Through this process, it can determine the ordering and SPO structure of a sentence. Next, the referring expression generation part replaces names with personal pronouns using coreference data of the triple. Lastly, a realization module performs a process of realizing a sentence by an element of a parse tree or sentence, and NLG uses a natural language generation tool to realize it. In some embodiments, the process of FIG. 14 is performed at 109 of FIG. 1 and 213 of FIG. 2. In some embodiments, the process of FIG. 14 is performed using natural language generator module 617 of FIG. 6.

In some embodiments, the NLG module does not use concise data but instead uses a whole sentence without any omission of words or changes in grammar structure to generate natural language. Thus, there is no information loss in AICoRE.

(6) Memory

In some embodiments, the 'memory' module stores a history of conversations that the agents were engaged in, plus any other information captured by its sensors about the environment such as location, time, weather, etc. The declarative memory holds the agent's knowledge about the world and itself. The knowledge available to the agent in the declarative memory can be in at least two forms: 1) given to the agent in the form of an ontology (e.g., WordNet) or factual knowledge; or 2) inferred by the agent based on the content of its episodic memory.

Figure 15:
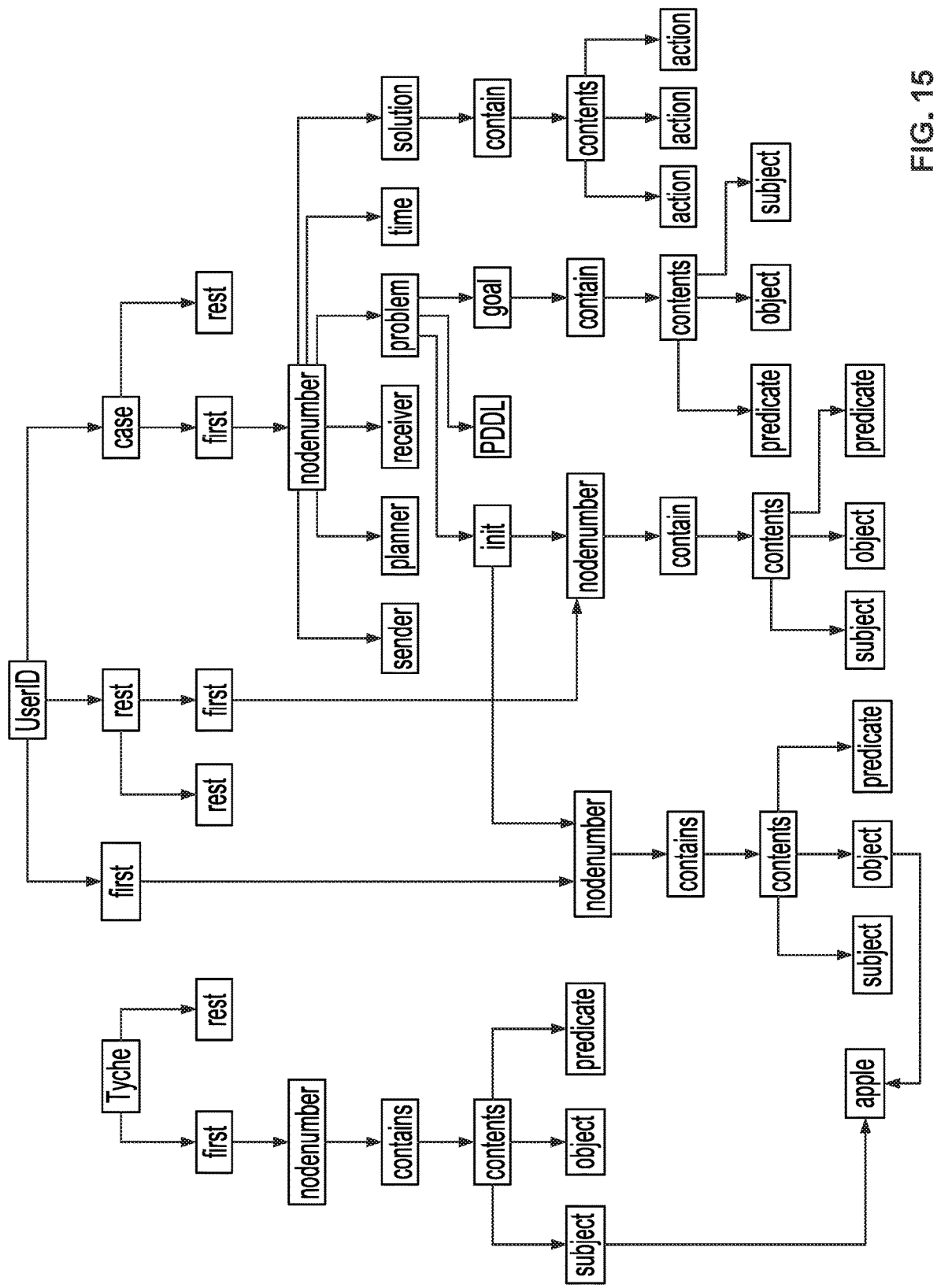
FIG. 15 is a diagram illustrating an example of a memory graph data structure.

FIG. 15 is a diagram illustrating an example of a memory graph data structure. FIG. 15 shows an exemplary memory graph in the AICoRE system. In FIG. 15, the 'memory module' consists of two parts, a user part and a robotic system part. The 'memory module' saves user's information of conversation history in the user part and data of robotic system in the robotic system part. In some embodiments, the memory graph of FIG. 15 is memory graph 607 of FIG. 6. In some embodiments, the memory graph of FIG. 15 is used at 105, 107, and 109 of FIGS. 1; 205, 207, 209, and 211 of FIGS. 3; 305 and 307 of FIG. 3; and FIG. 4.

(1) In some embodiments, the user part is classified into two sections. One section has data about the user that is generated from the user's conversation. The AICoRE saves the data under UserID sequentially. For example, the AICoRE generates a new resource that includes NLU output when a user says something about oneself and the resource connects it to the UserID using the 'first' relation.

Then, if the user says again, the AICoRE also generates a new relation 'rest' relation and connects the new node resource again. In addition, the node that is connected to the 'rest' has another 'first' and 'rest' relations. The AICoRE repeats this whenever the user says something.

(2) In some embodiments, the robotic system part uses the same architecture as that of the user part. However, under a robotic systemID, the system only saves a robotic system's data even if the user says the data and no one but the owner can change the robotic system's data.

Figure 16:
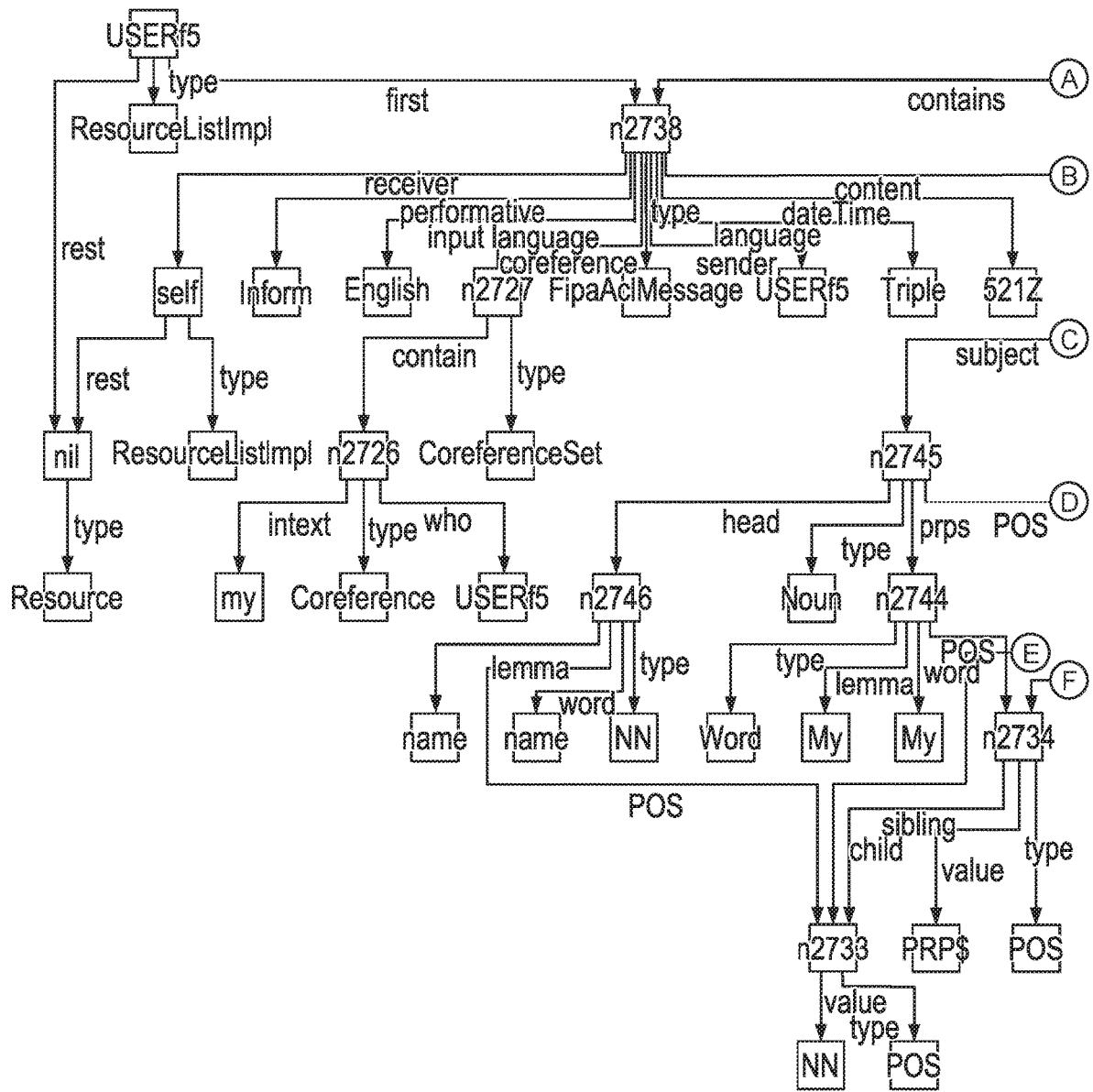
FIG. 16 is a diagram illustrating an example of a memory graph data structure.
Figure 16:
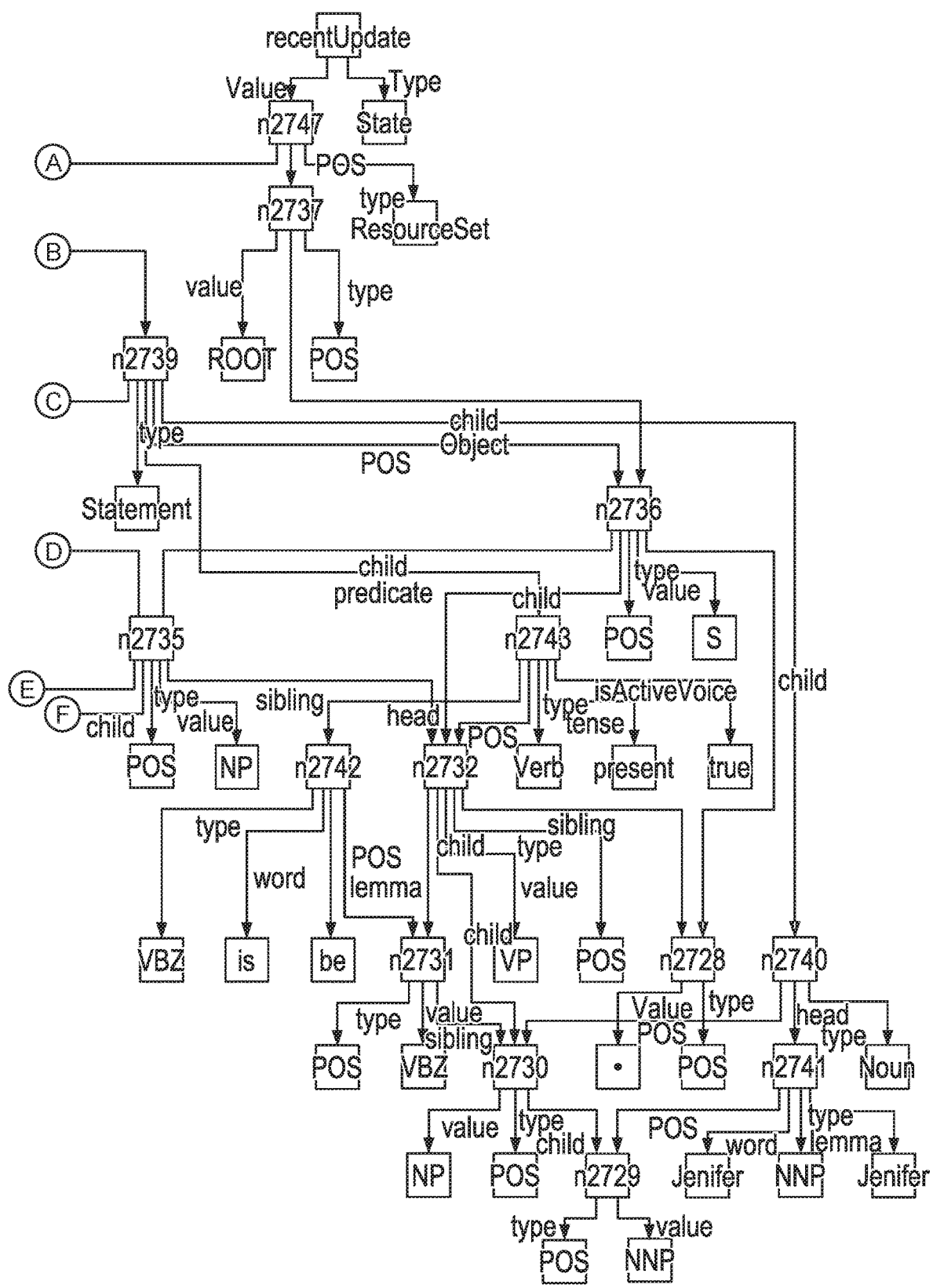

FIG. 16 is a diagram illustrating an example of a memory graph data structure. FIG. 16 shows an exemplary sentence in the memory graph. It is just one sentence processed in the user memory. The data includes many relations and nodes that are the result from NLU. The top level node of the sentence has a lot of information about the sentence, such as language, date, and time, and there is a sentence element under 'content' relation. In some embodiments, the memory graph of FIG. 16 is memory graph 607 of FIG. 6. In some embodiments, the memory graph of FIG. 16 is used at 105, 107, and 109 of FIGS. 1; 205, 207, 209, and 211 of FIGS. 3; 305 and 307 of FIG. 3; and FIG. 4.

In addition, in some embodiments, the CBR module makes the CBR case and saves it under a case node in the 'memory module'. A CBR case is made with sender, receiver, time, 'PDDL problem' and solution information. The sender and receiver information represent who or what the speaker is and the listener of the conversation that is generating a 'PDDL problem'. The time information records the date of conversation. The planner represents what kind of planner the AICoRE uses to solve this conversation problem. The 'problem' is constructed using a 'PDDL problem' and the goaltree's goal. The solution is an action plan of the selected planner. The AICoRE database saves the CBR case under a user node and makes the CBR case list. When the AICoRE makes a new CBR case, the AICoRE database adds this CBR case to the last of the CBR case list. When the CBR module wants to find a similar case, the CBR searches in the CBR's case list. In various embodiments, every user memory structure has its own CBR case list in a database. Thus, the CBR module can reduce the time to search for a similar case in a list.

(7) Inter-Agent Communication (iAC)

The iAC stands for inter-agent communication. It is a communication module for agents that uses, in some embodiments, the JADE and FIPA-ACL message structure. The iAC is may be composed of two projects: iACManager and iACServer.

In some embodiments, the iACManager is a client side management module of iAC. In some embodiments, the iACManager generates ACLMessages that is based on the FIPA-ACL structure and sends messages via the JADE Platform. In some embodiments, the iACServer runs a JADE Platform so that clients can send and receive ACLMessages. It manages whether messages should be sent by checking whether a receiver exists.

Figure 17:
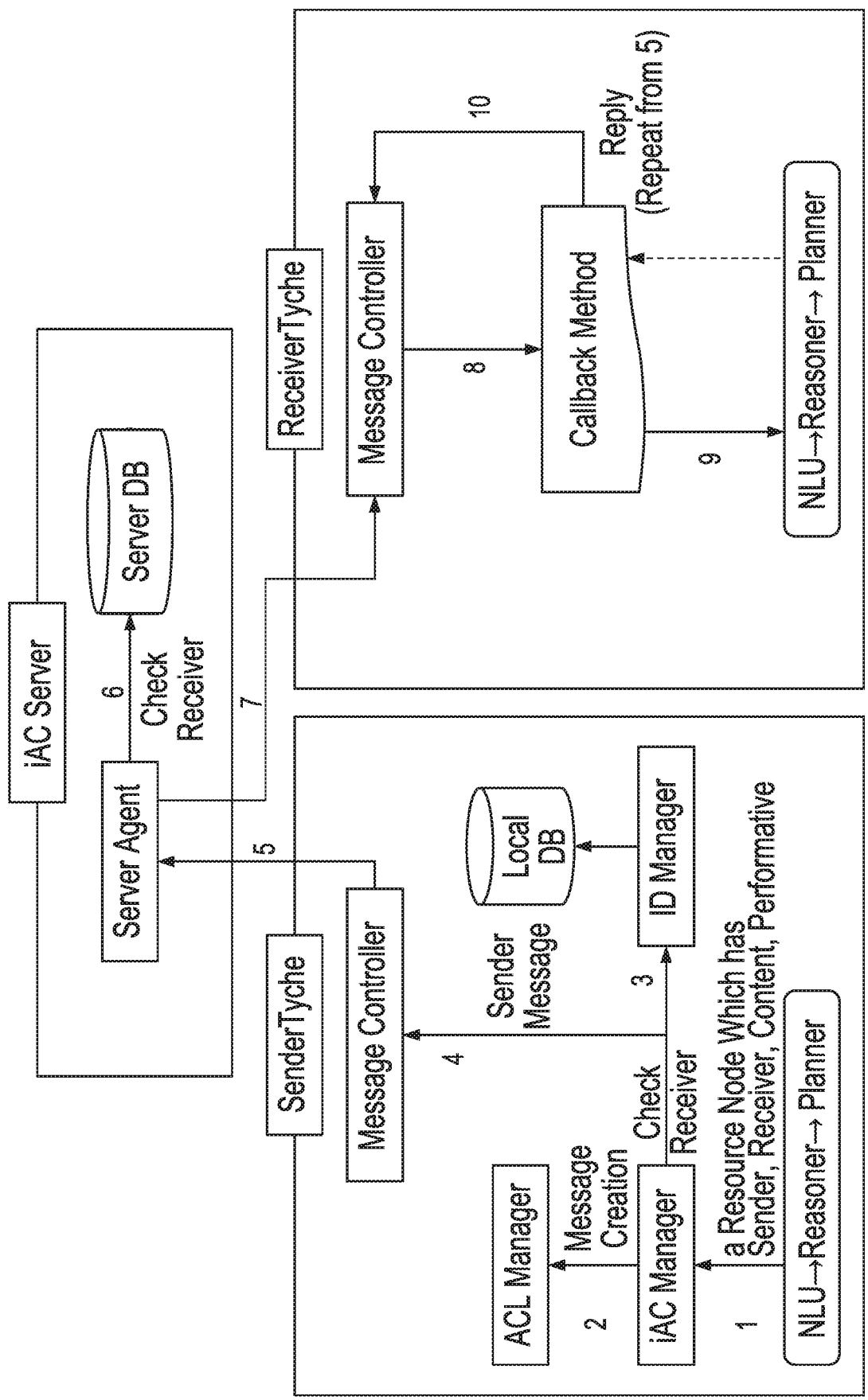
FIG. 17 is a functional block diagram illustrating an embodiment of a process for inter-agent communication.

FIG. 17 is a functional block diagram illustrating an embodiment of a process for inter-agent communication. FIG. 17 shows exemplary processes of the iAC module. In some embodiments, the planner or dialogue manager determines a sender, receiver, content, and performative of a message. The iAC manager receives this message and generates an ACL message using an ACL Manager. When the ACL Manager makes an ACL message, the receiver information is changed into an internal ID using an ID Manager. The ACL message is passed to message controller, and it sends the message to an iAC Server. The server agent in the iAC Server receives the message and checks whether the receiver exists. If the receiver exists, then it sends the message to the receiver module of a robotic system. The planner and dialogue manager can register callback methods to the message controller. The message controller uses the callback methods when it receives messages.

In some embodiments, there are two possible types of ACL messages that can be processed. One is a request. When an iAC manager receives a request, it passes it to a NLU, so that the NLU can start to process the message through the AICoRE. For the other type of the message, the iAC manager outputs the message to the target user.

Communication between agents allows the agents to share information and to command each other. For example, a user can ask an agent about someone's hobby. If there is no information about it, the agent may ask someone else's agent and provide the answer to the user. In various embodiments, personal information can be protected and an agent can decide whether it sends requested information or not to an asking agent.

The iAC module can be used in many ways. For example, agents can share the owner's schedule to come up with a meeting time. The iAC module can also be used to share the price of the used goods of the owner and to suggest fine goods to the user.

In some embodiments, the process of FIG. 17 is performed in part at 101 and/or 109 of FIG. 1 to receive and send inter-agent communication. In some embodiments, the process of FIG. 17 is performed at 105 and/or 107 of FIG. 1 to retrieve supporting knowledge and/or to identify and/or solve an artificial intelligence problem.

The AICoRE Processes

FIG. 18 is a pseudo-code description illustrating an embodiment of a process for solving an artificial intelligence problem using adaptive, interactive, and cognitive reasoning. An example of a process and execution of the system are shown in FIG. 18, i.e. an exemplary pseudo code of the AICoRE process. FIG. 18 shows the BDI aspect by retrieving the beliefs from the agent's personal memory, executing the plan from reasoning out, and finally arriving at the set goals. In FIG. 18, the execution architecture is represented in five sequences: initialization, getting new events, setting new plans, executing plans, and processing the rest of the job. The executing sequence, depicted in FIG. 18, resembles an embodiment of an architecture of a BDI agent. In some embodiments, the pseudo-code description of FIG. 18 describes the processes of FIGS. 1 and 2. In some embodiments, the system described by the functional block diagram of FIG. 6 performs the process described in FIG. 18.

In some embodiments, a BDI agent stands for an agent based on the three main concepts: Belief, Desire and Intention. The Belief is the knowledge of what the agent has, including environmental information and data from other agents that is saved in an agent's belief-base. The Desire is what the agent wants to accomplish. The desire that the agent wants to accomplish may also be called the goal of the agent. Specifically, an agent executes and determines an active goal that is more profitable for the current input data or changes. The Intention represents the methods to achieve the goal. The intention may also be called the plan of the agent. The plan is composed of actions that perform a single job. Additionally, the inducer of the processes of an agent is called an event.

When an event occurs to a BDI agent, a belief is updated in the belief-base, and the BDI agent interoperates the belief with goals and plans to invoke them. When the available goal and plans are activated within the BDI agent, the reasoner within the BDI agent executes the proper actions to accomplish this goal, and the result is executed within the BDI agent in the form of actions. This sequence of actions updates the belief-base of the BDI agent. If there are no more goals to be accomplished for the belief, the BDI agent finishes the job.

This process may be used by some embodiments of an AICoRE. After an AICoRE is initialized, an AICoRE receives new external events in the form of triples as input. These events are triggered whenever a user says a verbal utterance. Normally an AICoRE may process these events sequentially using a time-priority queue storing verbal utterances. However, if a high-priority event such as fire emergencies happens, then the event's priority within the queue of an AICoRE is changed to accommodate the high-priority event.

A brief example of a process of the AICoRE is as follows: The chosen event, represented in natural language format, gets transferred into the natural language understanding module of the AICoRE, and it gets appended with various optional parameters from the option-generator from the event queue of the AICoRE. Next, the planner module of the AICoRE uses a set of internal rules to set the most proper goal and plan to get the best solution for the given event. This phase is analogous with the 'update-intention' process of a BDI agent. However, in the AICoRE, there are not only rules of the planner module, but also rules from other modules within the system, so an iterative sequence may be used within the main repeat sequence in order to account for all the various rules. Examples of rules not from the planner module include rules from the reasoner module that are used to map data to the event, based on various characteristics of the event. Whenever a plan is set for executing a solution for a given event, the AICoRE executes the plan with the executor module. Finally, using the steps generated by the execution of the plan, the AICoRE can generate responses in the form of natural language that satisfies the actions required to accomplish the goal set by the inputted event.

The Intelligent Robot Software Platform (iRSP)

Figure 19:
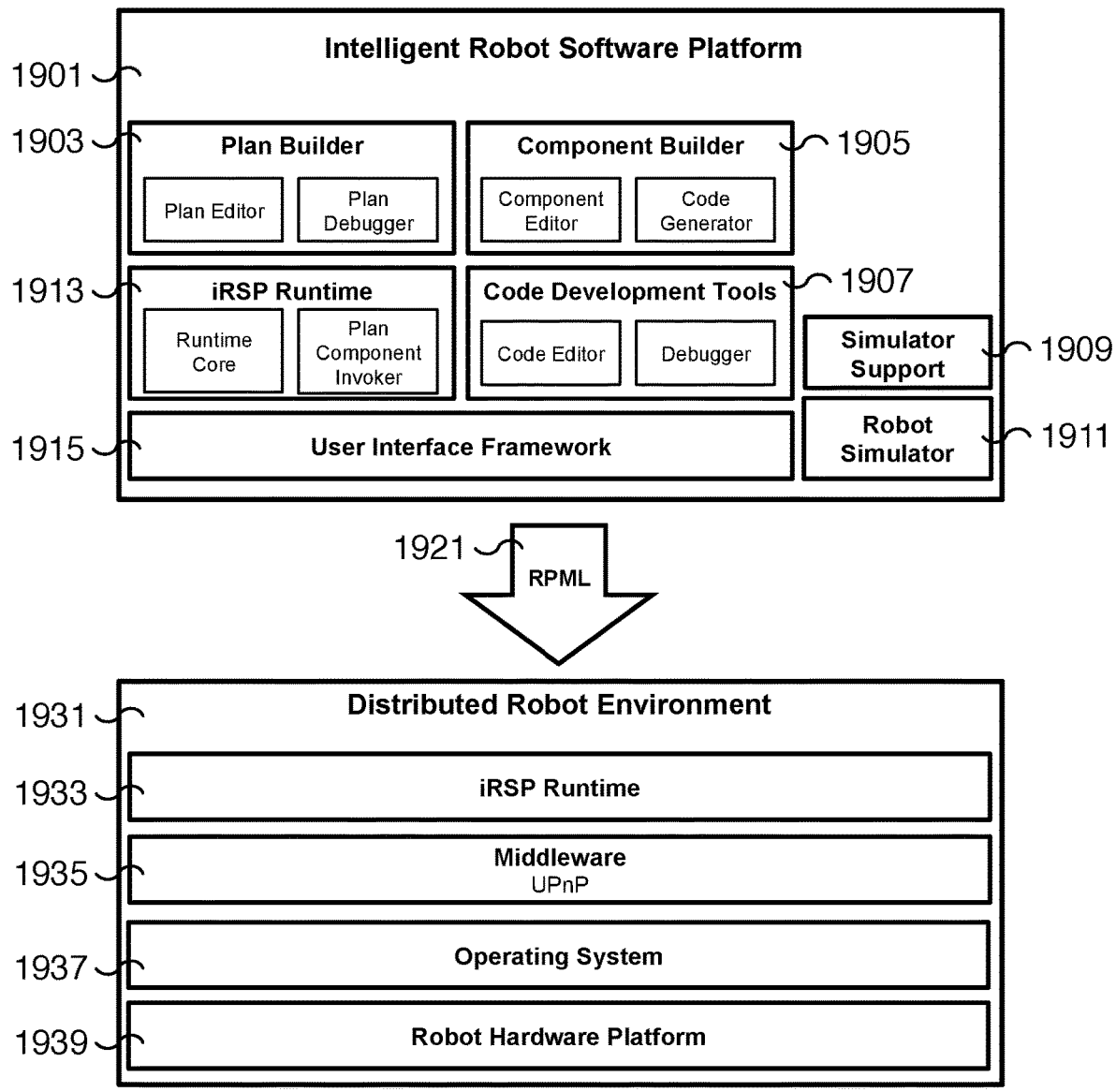
FIG. 19 is a block diagram of an embodiment of an intelligent robot software platform and a distributed robot environment.

FIG. 19 is a block diagram of an embodiment of an intelligent robot software platform and a distributed robot environment. In the example shown, intelligent robot software platform (iRSP) 1901 is an open architecture-based robot software for building robots with artificial intelligence (AI). The output of iRSP 1901 is in the format of a robot plan markup language (RPML) file depicted as RPML files 1921. In some embodiments, the output of iRSP 1901 is a single or multiple RPML files. In the example shown, the outputted RPML files 1921 are one or more files in the RPML format distributed to distributed robot environment 1931 for running on a robot. As shown in FIG. 19, iRSP 1901 includes plan builder 1903, component builder 1905, code development tools 1907, simulator support 1909, robot simulator 1911, iRSP runtime 1913, and user interface framework 1915. Since intelligent robot software platform iRSP 1901 is an open architecture, additional or fewer components may be included in iRSP 1901. Distributed robot environment 1931 includes iRSP runtime 1933, middleware 1935, operating system 1937, and robot hardware platform 1939. In some embodiments, as shown in the example, plan builder 1903 includes a plan editor and a plan debugger; component builder 1905 includes a component editor and a code generator; code development tools 1907 includes a code editor and a debugger; and iRSP runtime 1913 includes a runtime core and a plan component invoker. In various embodiments, iRSP runtimes 1913 and 1933 are each instances of an iRSP runtime and may both include a runtime core and plan component invoker (not shown in iRSP runtime 1933).

The platform and open architecture of iRSP 1901 is designed to be software and hardware independent. In some embodiments, multiple different programming languages including Java and scripting language(s); multiple operating systems including Linux, Microsoft Windows, and/or Mac OS; and multiple robot platforms including Tyche, Engkey, and/or Sil-bot are supported. In various embodiments, iRSP 1901 supports the development of intelligent robotic systems and addresses multiple stages of development including design, component integration, simulations, and execution. In some embodiments, iRSP 1901 and distributed robot environment 1931 may be distributed across different computers and may utilize a drag-and-drop method for connecting program modules. Moreover, tasks created using iRSP 1901 may be reused for new tasks. The created tasks can be run in a simulator as well as on real robots. In various embodiments, iRSP 1901 may be used to create the software for an intelligent robot capable of solving artificial intelligence problems using adaptive, interactive, and cognitive reasoning. In some embodiments, iRSP 1901 may be used to help create and develop an artificial intelligence (AI) robotic system such as the systems described with respect to FIGS. 1-18. In various embodiments, distributed robot environment 1931 is an AI robotic system such as the system described with respect to FIGS. 1-18.

In some embodiments, the intelligent robot software platform of FIG. 19 includes support for high-level robot programming and/or support for a visual programming language. In some embodiments, iRSP 1901 incorporates component-based functionality and/or is an open platform that can easily integrate new components. In the example shown, iRSP 1901 includes the components: plan builder 1903, component builder 1905, simulator support 1909, robot simulator 1911, iRSP runtime 1913, code development tools 1907, and user interface framework 1915. Additional or fewer components may be integrated into iRSP 1901 using the component-based open architecture.

In some embodiments, plan builder 1903 is a tool for creating and editing a robot plan. In some embodiments, plan builder 1903 is a program developed to integrate with a software development platform. In some embodiments, plan builder 1903 is a program created using an open tools platform with reusable components. In various embodiments, plan builder 1903 is implemented as a plug-in for a GUI development environment. Plan builder 1903 allows a user to create a plan using a visual programming language (VPL). In some embodiments, plan builder 1903 is able to interface and utilize universal plug and play (UPnP) components to directly integrate with robot components. In the example shown, plan builder 1903 includes a plan editor and a plan debugger for editing and debugging a robot plan.

In some embodiments, component builder 1905 is a development tool for creating universal plug and play (UPnP) components for use in the intelligent robot software platform. Component builder 1905 may be implemented as a plug-in such as an Eclipse plug-in. In some embodiments, component builder 1905 automatically generates a code template when a user types in the specifications of a component. Using component builder 1905, a user can build PC and Android components, among others. In the example shown, component builder 1905 includes a component editor for editing a component and a code generator for automatic code generation.

In some embodiments, simulator support 1909 integrates robot simulator 1911 to support robot simulation functionality. For example, simulator support 1909 may be used to integrate robot simulator 1911. Robot simulator 1911 may be a robot simulation software such as Marilou Robot Simulation of anyKode or another robot simulation software. In various embodiments, iRSP 1901 can simulate a robot's movement and its various sensors. With the supported simulation integration, general users can execute a robotics program without actual robot hardware. In various embodiments, no setting and software changes are necessary to run the same software on actual robot hardware. For example, the robot plan markup language (RPML) files such as RPML files 1921 generated by iRSP 1901 run on a hardware robot such as a robot with a motorized base without any modifications to the settings or software. In various embodiments, the robot runtime environment confirms that the necessary components utilized by the RPML files, such as the components providing the appropriate Universal Plug and Play (UPnP) interfaces, are available.

In some embodiments, iRSP 1901 interfaces with a distributed middleware layer 1935 that is based on an object-oriented framework. Middleware 1935 enables the support for heterogeneous distributed processes. The framework services based on Service Oriented Architecture (SOA) are loosely coupled services between each service module. System integration is provided via the robot markup language, such as robot plan markup language (RPML), for defining an application service. The application services can be combined as an independent module that defines the respective control layer.

In some embodiments, iRSP 1901 supports middleware 1935 that is a Universal Plug and Play (UPnP) middleware. The UPnP support allows devices such as PCs, peripherals, intelligent appliances, and wireless devices, among others, that are plugged into a network to be automatically aware of each other. With UPnP, when a device is plugged into the network, the device will announce its presence on the network to other devices. For example, even though iRSP 1901 is not pre-configured with the address of a new device, iRSP 1901 can access the new device without any further steps as long as the new device is on the same network as iRSP 1901.

In some embodiments, plan builder 1903 allows general users to create task scenarios using a markup language such as robot plan markup language (RPML). Once an RPML file such as RPML files 1921 is deployed to distributed robot environment 1931, iRSP runtime 1933 will process the deployed files. In various embodiments, iRSP runtime 1933 parses an RPML file and executes the task scenarios according to the task scenario described by the RPML file. In some scenarios, the task scenarios include communicating with UPnP components. In some embodiments, iRSP runtime 1933 is implemented using an intelligent Robot Control System (iRCS) runtime module.

In some embodiments, user interface framework 1915 is a framework for the creation of a user interface for an artificial intelligence (AI) robot. User interface framework 1915 may be incorporated using drag-and-drop methods.

In various embodiments, distributed robot environment 1931 runs an operating system 1937 on top of a robot hardware platform 1939. An example of a robot hardware platform may be a motorized robot base combined with processing power and sensors of a smartphone device. In some embodiments, a robot base is a motorized base device that includes wheels, legs, treads, and/or arms, sensors, etc. for providing movement or other input/output functionality for the robot. A smartphone device may be mounted onto the motorized base device to provide control and robot logic. In some embodiments, the robot logic can access remote network devices using the network of the smartphone device. For example, using the cellular or WiFi connection of the smartphone device, the robot logic can control other devices, including sensors, motors, electronics, etc. In various embodiments, the remote network devices are accessible via universal plug and play (UPnP) components of the network device.

Figure 20:
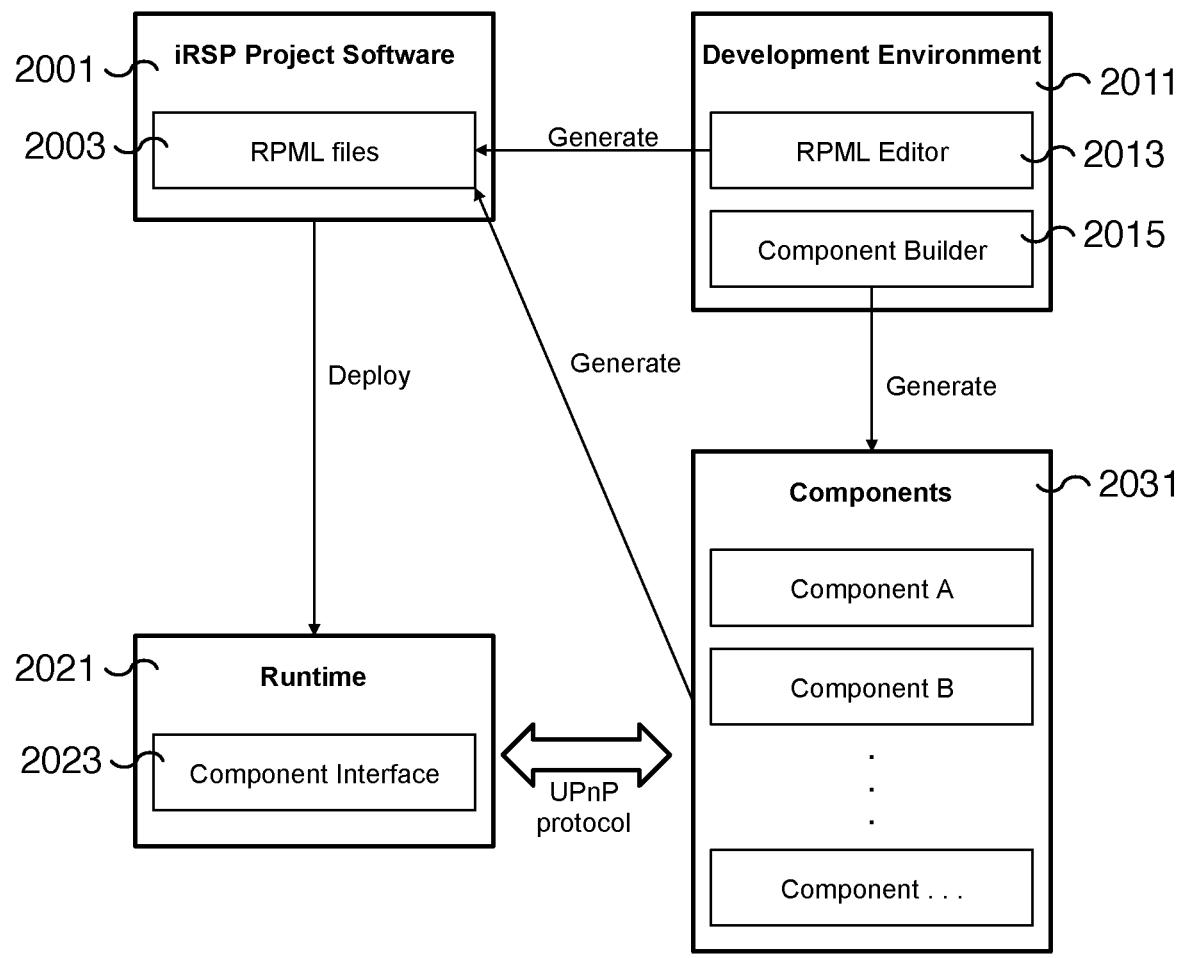
FIG. 20 is a block diagram illustrating an embodiment of a process for generating robot software using an intelligent robot software platform.

FIG. 20 is a block diagram illustrating an embodiment of a process for generating robot software using an intelligent robot software platform. In the example shown, intelligent robot software platform (iRSP) project software 2001 is created and used to deploy a robot software described using RPML files 2003. RPML files 2003 are deployed to runtime 2021. The robot software of iRSP project software 2001 utilizes RPML components 2031 generated using development environment 2011. Development environment 2011 includes RPML editor 2013 for creating RPML files 2003 and component builder 2015 to integrate component functionality. A component developer can use component builder 2015 of development environment 2011 to generate interfaces for robot components that correspond to one or more components of components 2031. Components 2031 includes one or more components (e.g., component A, component B, etc.) that may be utilized by robot software. The runtime executing the robot software can invoke the individual components of components 2031 using a protocol such as universal plug and play (UPnP) via component interface 2023 of runtime 2021. In various embodiments, development environment 2011 is part of iRSP 1901 of FIG. 19, iRSP project software 2001 is created using iRSP 1901 of FIG. 19, RPML editor 2013 is part of plan builder 1903 of FIG. 19, component builder 2015 is component builder 1905 of FIG. 19, and runtime 2021 is iRSP runtime 1913 and/or 1933 of FIG. 19.

In some embodiments, each logic node of the robot software of intelligent robot software platform (iRSP) project software 2001 is run in a separate thread or process, such as a Java thread. Each logic block (e.g., of a logic node) can be stopped or suspended, for example, by the request of a user. In various embodiments, the flow of the logic is expressed using a markup language such as robot plan markup language (RPML).

In some embodiments, runtime 2021 controls the flow of logic by parsing robot plan markup language (RPML) files, such as RPML files 2003. In some embodiments, runtime 2021 is implemented using a control system such as an intelligent Robot Control System (iRCS) runtime module. In some embodiments, runtime 2021 can execute the robot software using a markup language such as RPML. Functions and events that control the robot may be implemented in a component such as one of the components of components 2031. In various embodiments, runtime 2021 is responsible for receiving notifications from a component that an event has occurred and issuing a command to execute the component's functions. In the example shown, runtime 2021 uses a universal plug and play (UPnP) protocol to receive notifications from components or to issue commands to components.

In some embodiments, components are created using development environment 2011. Components can be created using a programming language, such as the Java programming language. Additional or alternative languages may be used for creating a component using the universal plug and play (UPnP) protocol. Users can create robot plan markup language (RPML) files using plan editor 2013. In various embodiments, plan editor 2013 is a tool that allows the drag-and-drop combination of UPnP action and state variables represented by nodes. Plan editor 2013 allows users to easily create RPML files.

In some embodiments, there are several advantages to using robot plan markup language (RPML) when creating robot software including: the ability to create robot software using higher-level robot programming, the use of a visual programming language, and building robot software that is component-based. The use of higher-level robot programming has several advantages. Users of development environment 2011 can program using higher-level robot programming techniques, which allow for programming robots with increased abstraction from details. Users that need access to the lower-level details can use component builder 2015 to program at a lower abstraction level that includes more detailed hardware control. In some embodiments, the intelligent robot software platform is a grouped node system. The support for grouped nodes allows existing robot plans to be reused. A group node is a node that calls another plan file. A group node has input and output functionality and can be used similar to functions used in other programming languages.

In some embodiments, the intelligent robot software platform uses a visual programming language (VPL) that a user programs by moving and/or connecting the elements of the language. In some embodiments, the intelligent robot software platform supports universal plug and play (UPnP) components as VPL elements. The VPL may utilize a markup language such as robot plan markup language (RPML). In some embodiments, an RPML file is an extensible markup language (XML) structured file defining the contents of a robot plan. In some embodiments, RPML editor 2013 saves a plan as an RPML file, and since created RPML files can be reused in other RPML files, users can program intuitively using an RPML hierarchy. In some embodiments, RPML editor 2013 allows users to add comments about the flow of the programs in plan files. This allows plan files themselves to be used as a description of the flow of the programs. In some embodiments, when an RPML file is executed, for example, using runtime 2021, RPML editor 2013 highlights which element is executing so that a user can monitor and analyze the status of the robot program.

In some embodiments, the intelligent robot software platform has a component-based structure. In various embodiments, the communication middleware of the software platform uses a universal plug and play (UPnP) middleware. A component-based structure has advantages including reusability, maintainability, extensibility, and compatibility. In some embodiments, UPnP support is an extension of plug-and-play support and supports a group of protocols that allow sending and receiving automatic notifications among devices on the same network. By supporting UPnP, the software platform supports the integration and programming of robots and external devices. For example, even in the event the software platform is not pre-configured with the IP address of a remote device, a user of the platform can utilize the device if she or he is on the same network.

Figure 21:
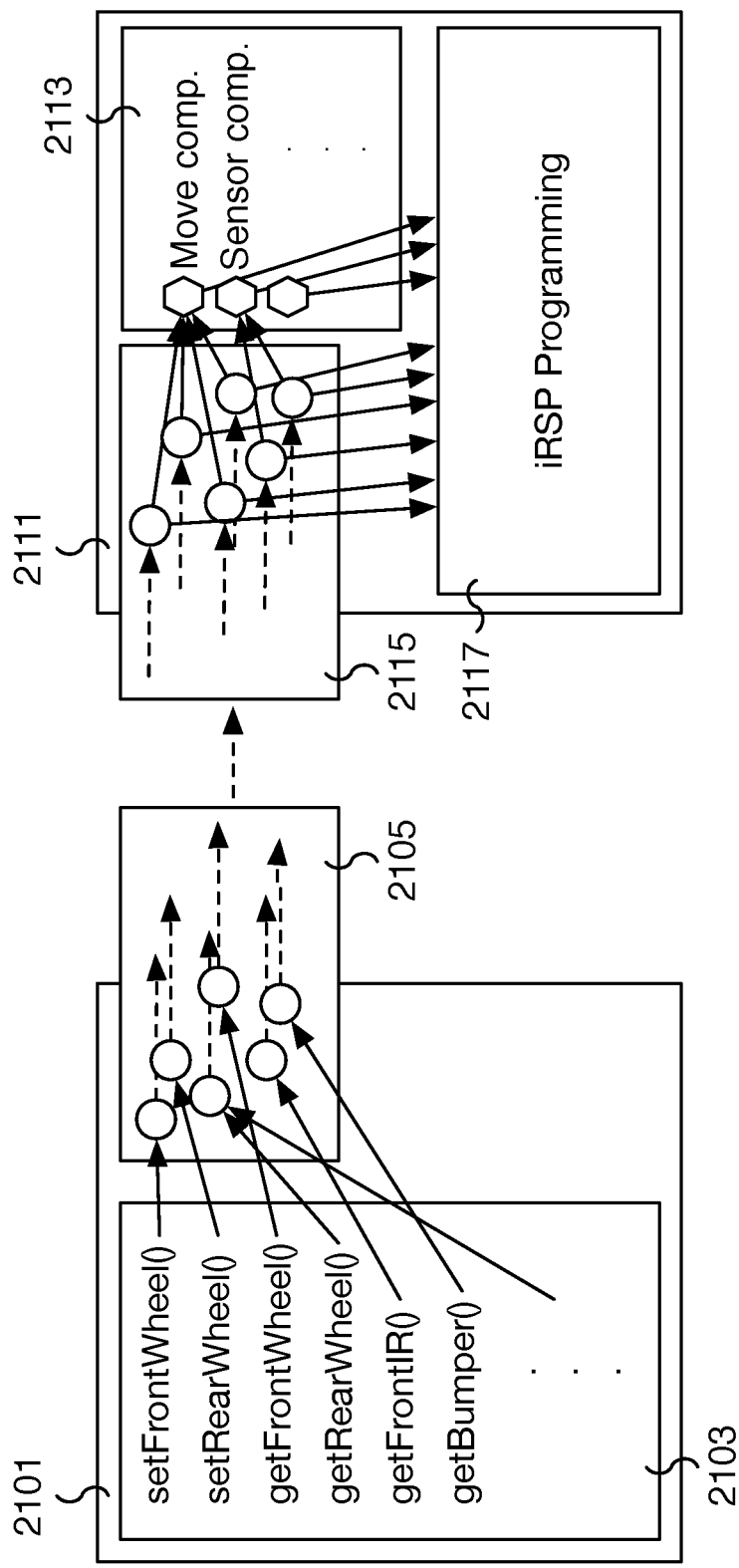
FIG. 21 is a diagram illustrating an example of the relationship between a robotic system and an intelligent robot software platform.

FIG. 21 is a diagram illustrating an example of the relationship between a robotic system and an intelligent robot software platform. The example of FIG. 21 includes a robotic system side 2101 and an intelligent robot software platform (iRSP) side 2111. The development of robotic software for an artificial intelligence (AI) robotic system may be improved by dividing the development of the robotic software between different development roles and by providing abstraction layers between the different types of development. For example, the development roles may include a hardware manufacturer, an advanced user, and a general user. In the example shown, robotic system side 2101 exposes robot functionality to iRSP side 2111 using a low-level hardware control application programming interface (API). Advanced users can create higher-level components that general users can leverage. General users can create iRSP programs such as iRSP programming 2117 using a visual programming language. iRSP programming 2117 references either low-level hardware functionality 2111 or higher-level component functionality 2113, as shown by the arrows from hardware functionality 2111 and component functionality 2113 to iRSP programming 2117. Component functionality 2113 (including, for example, move and sensor components, among others) leverages hardware functionality 2111 as shown by the arrows from hardware functionality 2111 to component functionality 2113. Hardware functionality 2105 and 2115 leverage control API 2103. Control API 2103 exposes a low-level hardware API. In some embodiments, intelligent robot software platform (iRSP) side 2111 is intelligent robot software platform 1901 of FIG. 19 and robotic system side 2101 is distributed robot environment 1931 of FIG. 19.

In some embodiments, a hardware manufacturer provides an application programming interface (API) such as a low-level API for controlling the robot hardware. For example, a hardware manufacturer provides an API for controlling the wheel of a robot or for detecting an obstacle in front of the robot by using an ultrasonic sensor. Control API 2103 includes examples of low-level hardware API calls such as setFrontWheel( ), setRearWheel( ), getFrontWheel( ), etc.

In some embodiments, an advanced user can develop components that are a higher-level interface for controlling the robot hardware by creating components that make calls to the robot hardware application programming interface (API). In some embodiments, a component is a more easily accessible interface than a low-level robot hardware API and may utilize a universal plug and play (UPnP) interface. In some embodiments, advanced users utilize a component builder (not shown) provided by intelligent robot software platform (iRSP) side 2111 to construct components. An advanced user may act as a bridge between robotic system side 2101 and iRSP side 2111. An advanced user may utilize the hardware application programming interface (API) provided by the hardware manufacturer to create a component that is provided for use by general users. In some embodiments, the component builder used to create a component is component builder 1905 of FIG. 19 and component builder 2015 of FIG. 20.

In some embodiments, a general user creates a task scenario in a markup language such as robot plan markup language (RPML) using a graphical user interface (GUI). The GUI may include drag-and-drop functionality for using components created by an advanced user. In some embodiments, the GUI is implemented by a plan builder such as plan builder 1903 of FIG. 19. In some embodiments, the GUI is a plan editor included as part of the plan builder. Task scenarios written in RPML can be reused. In the event an API wrapped in a component is difficult to use, an advanced user can provide a task scenario to a general user.

There are many advantages to allowing different developers to work at different levels of abstraction on a robot system. For example, firmware and software algorithms are created by developers with the specific skills for the particular task. Professional developers are not responsible for developing both robot hardware and software. Each developer can focus on the development of portions of the robot functionality that are based on her or his particular skill set. The result is a robot system developed more quickly, more efficiently, and more safely. Additionally, a general user can focus on creativity. An intelligent robot software platform allows developers to concentrate on the robot's algorithms because it allows users to easily implement functions via drag-and-drop techniques with components created by advanced users with more specialized knowledge.

Figure 22:
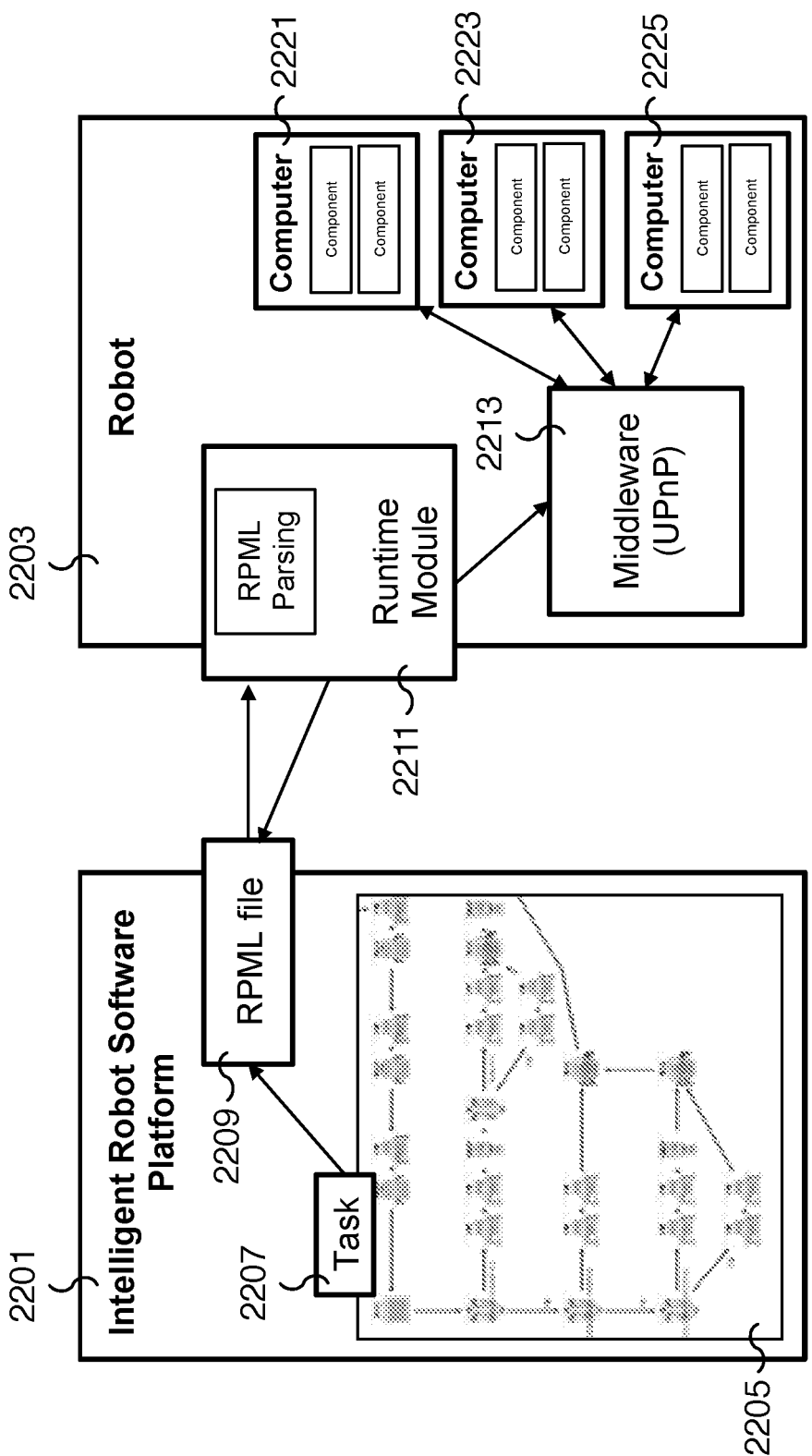
FIG. 22 is a diagram illustrating different modules of an embodiment of an intelligent robot software platform and robot system.

FIG. 22 is a diagram illustrating different modules of an embodiment of an intelligent robot software platform and robot system. The example of FIG. 22 includes intelligent robot software platform (iRSP) 2201 and robot 2203. iRSP 2201 includes robot program 2205, task 2207, and robot plan markup language (RPML) file 2209. Robot program 2205 is a task scenario that includes one or more tasks such as task 2207. RPML file 2209 is a markup language description that includes a description of task 2207 for execution by robot 2203. More generally, RPML file 2209 may include the entire task scenario of robot program 2205. Robot 2203 includes runtime module 2211, middleware module 2213, and computers 2221, 2223, and 2225. In some embodiments, runtime module 2211 includes RPML parsing functionality for parsing RPML file 2209. In some embodiments, middleware module 2213 uses a universal plug and play (UPnP) interface. In the examples shown, computers 2221, 2223, and 2225 include multiple components, which may be UPnP accessible components. In various embodiments, additional or fewer computers are accessible by middleware module 2213, as appropriate. In some embodiments, iRSP 2201 is intelligent robot software platform 1901 of FIG. 19 and/or represented by iRSP side 2111 of FIG. 21. In some embodiments, RPML file 2209 is RPML files 1921 of FIG. 19 and robot program 2205 is iRSP programming 2117 of FIG. 21. In some embodiments, robot 2203 is distributed robot environment 1931 of FIG. 19 and/or represented by robotic system side 2101 of FIG. 21. In some embodiments, runtime module 2211 is iRSP runtime 1933 of FIG. 19 and middleware module 2213 is middleware 1935 of FIG. 19.

In some embodiments, in response to a user deploying a task scenario, for example, a task scenario described using a markup language such as robot plan markup language (RPML) to runtime module 2211, runtime module 2211 parses the task scenario and invokes the referenced component(s) using an execution application programing interface (API). In some embodiments, middleware module 2213 is used to communicate with the components called by runtime module 2211. In some embodiments, middleware module 2213 utilizes a universal plug and play (UPnP) interface. In various embodiments, middleware module 2213 may distribute execution of the task scenario among different heterogeneous computers. By supporting middleware distributed processing, it is possible to control a robot system even if all components are not in the same computer.

In the example of FIG. 22, computers 2221, 2223, and 2225 are heterogeneous computers. In some embodiments, computers 2221, 2223, and 2225 perform distributed processing for the robotic system. For example, computers 2221, 2223, and 2225 provide components that are accessible via a task scenario created using intelligent robot software platform (iRSP) 2201. In some embodiments, 2221, 2223, and/or 2225 are embedded computers, personal computers, mobile devices, smartphones, computing devices, and/or another appropriate computer processing system.

In some embodiments, different components are running on different heterogeneous computers such as computers 2221, 2223, and 2225. For example, computer 2221 may include a component that performs facial recognition, computer 2223 may include a component that opens a door, and computer 2225 may include a component that performs a function to speak. Using intelligent robot software platform (iRSP) 2201, a general user can create task scenarios using the different components on computers 2221, 2223, and 2225. For example, a scenario can be created where the component of computer 2221 recognizes the face of a person, the component of computer 2223 opens a door, and the component of computer 2225 speaks the name of a person standing behind the opened door.

In some embodiments, scenarios written in a markup language such as robot plan markup language (RPML) are deployed, for example, as RPML files such as RPML file 2209, to runtime module 2211. Runtime module 2211 parses the received scenario (e.g., the RPML file(s)). Based on the described task scenario of the robot plan, runtime module 2211 then issues corresponding commands to execute each component using an execution application programming interface (API).

Figure 23:
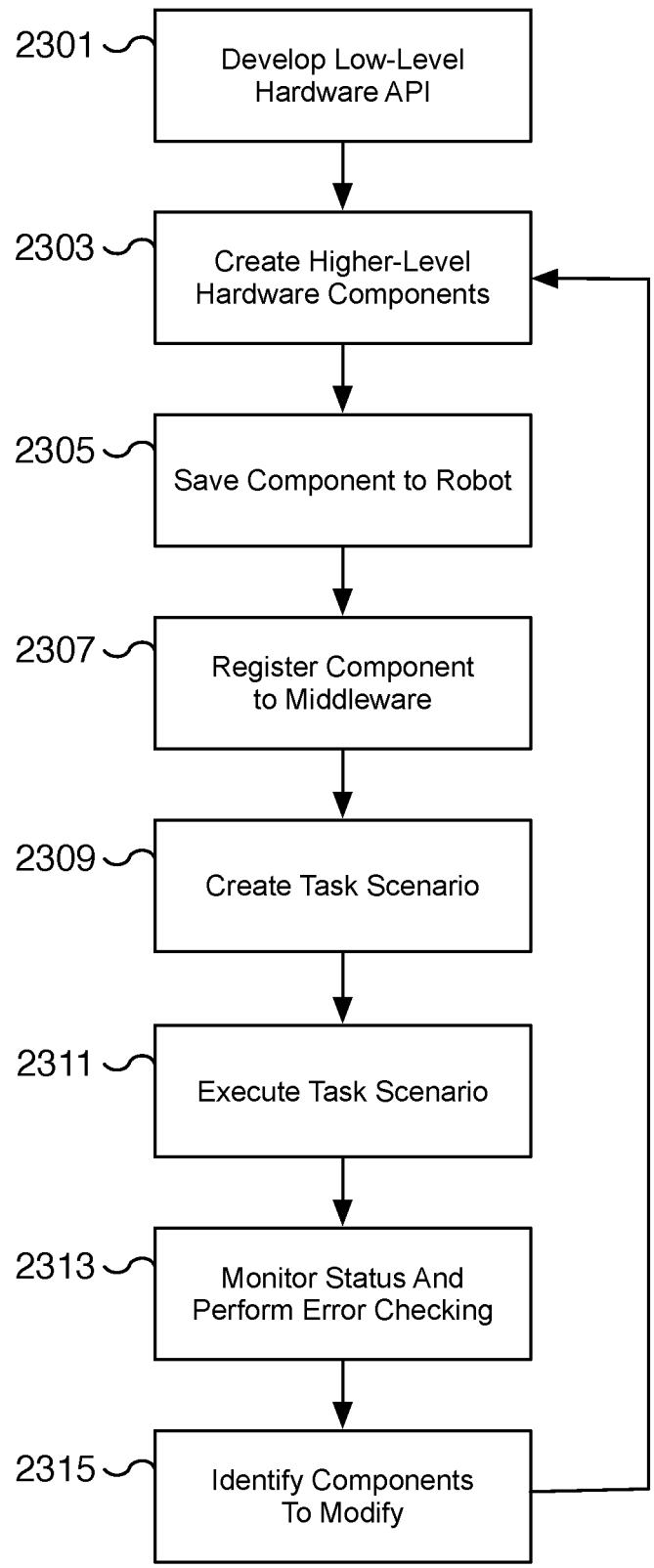
FIG. 23 is a flow diagram illustrating an embodiment of a process for developing robot software using an intelligent robot software platform.

FIG. 23 is a flow diagram illustrating an embodiment of a process for developing robot software using an intelligent robot software platform. In various embodiments, the process of FIG. 23 is performed by one or more developers using an intelligent robot software platform to create an artificial intelligence (AI) robotic system such as the systems described with respect to FIGS. 1-18. In some embodiments, the intelligent robot software platform is intelligent robot software platform 1901 of FIG. 19 and/or intelligent robot software platform 2201 of FIG. 22. In some embodiments, the intelligent robot software platform is represented by intelligent robot software platform side 2111 of FIG. 21. In some embodiments, the process of FIG. 23 utilizes a real robot or a robot simulator. For example, the process may utilize a distributed robot environment such as distributed robot environment 1931 of FIG. 19 and/or robot 2203 of FIG. 22.

At 2301, a hardware control application programming interface (API) is developed. For example, a hardware manufacturer will create a low-level hardware control API to control robot hardware such as sensors and motors.

At 2303, hardware components are created. In some embodiments, higher-level components are created that leverage the low-level hardware control application programming interface (API) developed at 2301. In some embodiments, the components are universal plug and play (UPnP) components and may be created using a software development tool such as a component builder.

At 2305, a component is saved to a robot. For example, a higher-level hardware component created at 2303 is saved to a robot. In some embodiments, the component is saved in a distributed robot environment of the robot. In various embodiments, the component may be executed on the robot.

At 2307, a component is registered to middleware. For example, once the component is executed, the component is registered to a middleware of the robot environment. In some embodiments, the middleware is a middleware module of a distributed robot environment running on the robot system. In some embodiments, the middleware is a universal plug and play (UPnP) middleware. In some embodiments, the registration of a component includes saving the component as an extensible markup language (XML) file with a robot control meta language (RCML) file.

At 2309, a task scenario is created using one or more registered components. In some embodiments, the task scenario is created using a plan editor of the intelligent robot software platform. The task scenario may be developed using a plan builder of the intelligent robot software platform to edit and debug the task scenario. In various embodiments, a component can be used in a task scenario once it has been registered and even if the component is not currently running.

At 2311, a task scenario is executed. For example, the task scenario created at 2309 is executed to run in a robot simulator or on a robot. In various embodiments, the task scenario is executed by an intelligent robot software platform (iRSP) runtime. In some embodiments, the iRSP runtime runs as a simulator in the iRSP. In some embodiments, the iRSP runtime runs on actual robot hardware.

At 2313, the status of the task scenario is monitored and error checking is performed. In some embodiments, the status and error checking can be monitored using the intelligent robot software platform (iRSP). For example, the status of a component of an executing task scenario can be monitored using a plan editor of the iRSP. In various embodiments, a view of the iRSP plan editor allows the status to be monitored and errors to be checked in real time as the task scenario is executing. In various embodiments, the real-time monitoring and error checking are enabled by running the task scenario in an iRSP runtime environment.

At 2315, one or more components are identified for modification. In some embodiments, the component can be optionally modified, for example, to change the behavior of the component. For example, the component can be modified to improve and/or fix errors detected during the monitoring and error checking performed at 2313. In various embodiments, in the event components are identified for modification, the development process loops back to 2303 for the creation of new (or improved) components.

In various embodiments, the development of an artificial intelligence (AI) robotic system is an iterative development process that may require performing the process of FIG. 23 repeatedly until the goals of the robot software are achieved. In some scenarios, new hardware application programming interfaces (APIs) and/or new robot hardware is introduced and the process can be repeated.

Figure 24:
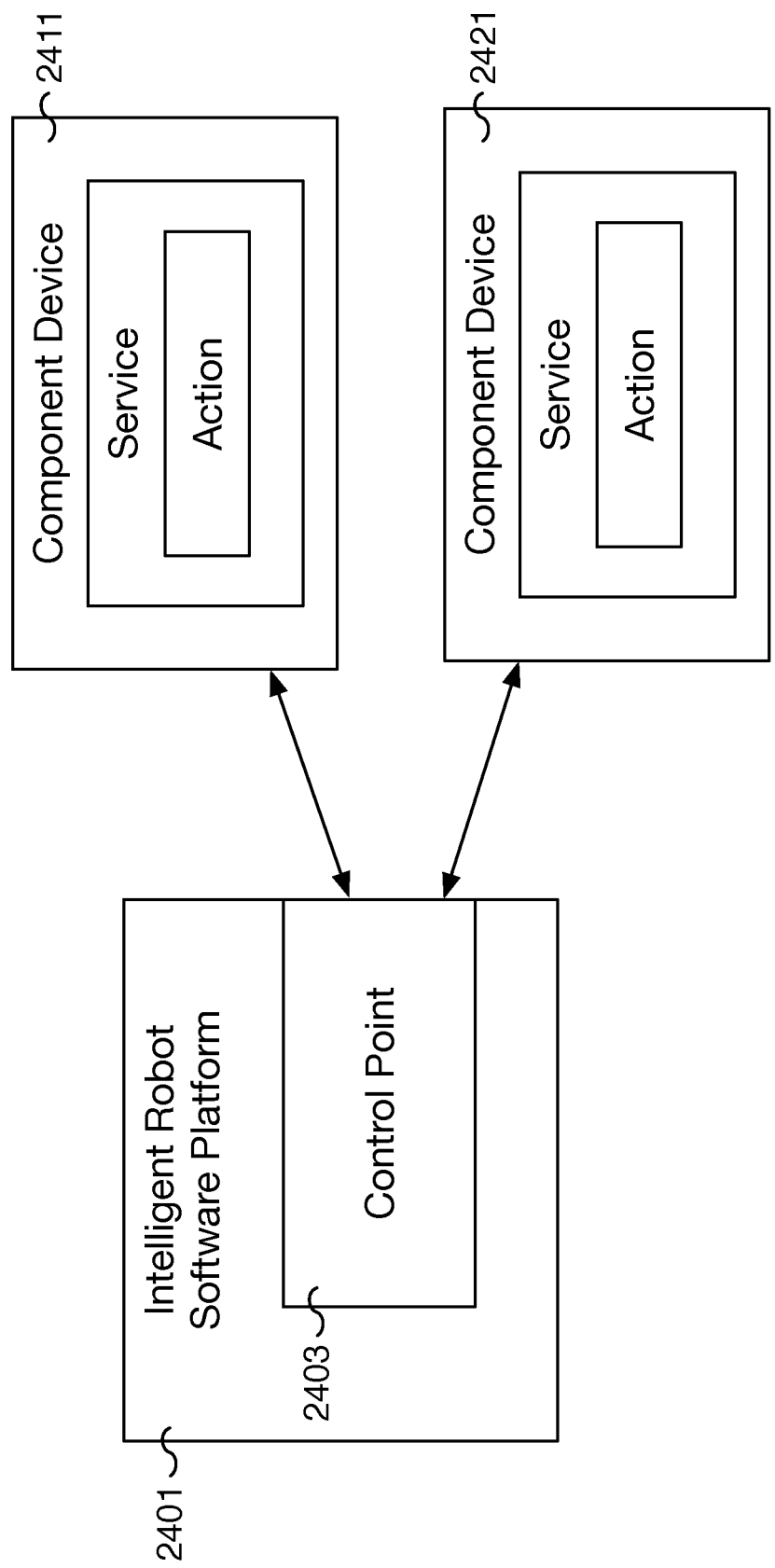
FIG. 24 is a diagram illustrating an example of an intelligent robot software platform (iRSP) component registration.

FIG. 24 is a diagram illustrating an example of an intelligent robot software platform (iRSP) component registration. In the example shown, the registration uses universal plug and play (UPnP), although another appropriate protocol may be used. By using an automated registration process, network devices attached to a network are able to automatically discover one another. For example, computers, peripherals, intelligent appliances, and wireless devices connected to the same network that support the registration process are automatically made aware of each other. In some embodiments, once a device is connected to the network, the device will announce its presence on the network to other devices. For example, an iRSP may not be configured with the address of a network device, however, the iRSP can access the network device without any further configuration steps as long as the network device is on the same network as the iRSP. In various embodiments, network devices include robot components such as the components created using a component builder. In some embodiments, a device includes one or more services, and each service may include one or more actions. Each action may perform one or more functions, such as executing low-level functions of a robot application programming interface (API).

In the example shown, intelligent robot software platform (iRSP) 2401 includes control point 2403. Control point 2403 is a module for interfacing with network accessible components using a network discovery protocol such as universal plug and play (UPnP). Users of iRSP 2401 are able to accesses component devices 2411 and 2421 via control point 2403. Component devices 2411 and 2421 are network devices on the same network as iRSP and are configured to make their presence automatically known to iRSP 2401 when attached to the network using a discovery protocol such as UPnP. In the example shown, component devices 2411 and 2421 each include a service, and each service includes an action. In various embodiments, additional services may be included as part of each component and additional actions may be included as part of each service (not shown). In some embodiments, iRSP 2401 is intelligent robot software platform 1901 of FIG. 19 and/or intelligent robot software platform 2201 of FIG. 22.

Figure 25:
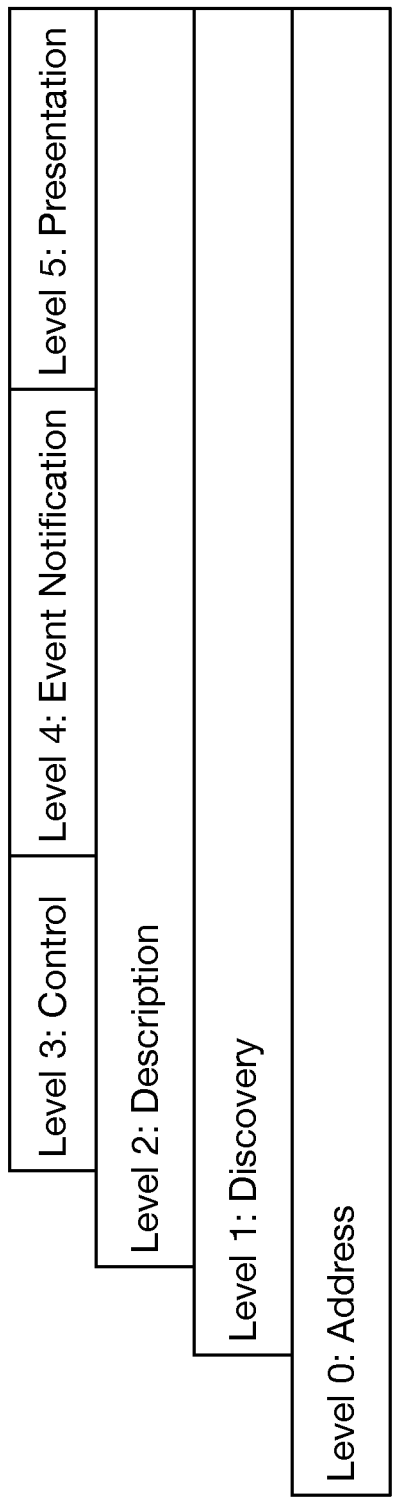
FIG. 25 is a diagram illustrating an embodiment of a universal plug and play (UPnP) hierarchical architecture.

FIG. 25 is a diagram illustrating an embodiment of a universal plug and play (UPnP) hierarchical architecture. In some embodiments, the UPnP protocol is used to enable the automatic discovery of robot components from within an intelligent robot software platform such as intelligent robot software platform 1901 of FIG. 19. In the example shown, the UPnP hierarchical architecture includes levels 0 through 5 with the respective names: address, discovery, description, control, event notification, and presentation. In various embodiments, a control point, such as control point 2403 of FIG. 24, and a component device, such as component devices 2411 and/or 2421 of FIG. 24, interface in accordance to the hierarchical architecture of FIG. 25.

In some embodiments, at the address level (level 0), a control point and device obtain an address to participate in the network. At the discovery level (level 1), a control point finds all devices and devices advertise their availability. At the description level (level 2), a control point learns about the capabilities of devices on the network. At the control level (level 3), a control point invokes actions on a device. At the event notification level (level 4), a control point listens to state changes of a device. At the presentation level (level 5), a control point controls a device and/or views the status of a device.

In various embodiments, different protocols may be utilized by a universal plug and play (UPnP) enabled device. For example, the protocol SSDP may be used for discovery, GENA for event notification, and SOAP for control. Additional protocols such as TCP/IP, HTTP, HTTPU, and HTTPMU may be used as appropriate.

TCP/IP: In some embodiments, the TCP/IP protocol serves as a basis for establishing the universal plug and play (UPnP) protocol. For example, the protocol is used to encapsulate the UPnP protocol and guarantees the order and transmission of the UPnP related communication.

HTTP, HTTPU, HTTPMU: In some embodiments, these protocols are used to support unicast and multicast with HTTP as the more basic protocol. Universal plug and play (UPnP) may be built on top of HTTP and its derivative protocols.

SSDP: In some embodiments, simple service discovery protocol (SSDP) may be used to define the process for discovering network services on the network. SSDP is built on top of HTTPU and HTTPMU and may be used to define how a control point retrieves the desired resources on the network and how it is notified that resources on the network are available. Both a control point and a device use SSDP. The control point utilizes multicast HTTPMU when connecting to the network. In response, devices receive and send via SSDP based on the in-cast HTTPU when a search condition is satisfied. In addition, a device may send information about its availability using general event notification architecture (GENA). In some embodiments, SSDP includes a way to break the device down, and a time stamp exists to determine the available time of the device.

GENA: In some embodiments, general event notification architecture (GENA) provides the functionality to send and receive notifications to and from a device. It is applied based on HTTPMU (UDP/IP) in the step of notifying the connection of the device, and operates based on HTTP (TCP/IP) in the event notification step. GENA is also utilized for notifications. In some embodiments, subscribers and notifiers are implemented using GENA. UPnP uses the GENA format to generate presence announcements, send them through the SSDP protocol, and notify the UPnP event service of a service status change. A control point that wants to receive the event notification subscribes to the event source by sending a request that includes the desired service, the event send location, and the event notification subscription time. A subscription will be updated periodically and subscribers will be notified based on the subscriber's subscription. Subscriptions can also be canceled using GENA.

SOAP: In some embodiments, simple object access protocol (SOAP) is used to define the usage of extensible markup language (XML) and HTTP in order to execute remote procedure calls. SOAP may be used to send control messages to devices and to return the results and error history to a control point. In some embodiments, each universal plug and play (UPnP) control request is a SOAP message that contains the action to be performed and a set of parameters. The response is also a SOAP message and may contain a status, a return value, and all return parameters.

Figure 26:
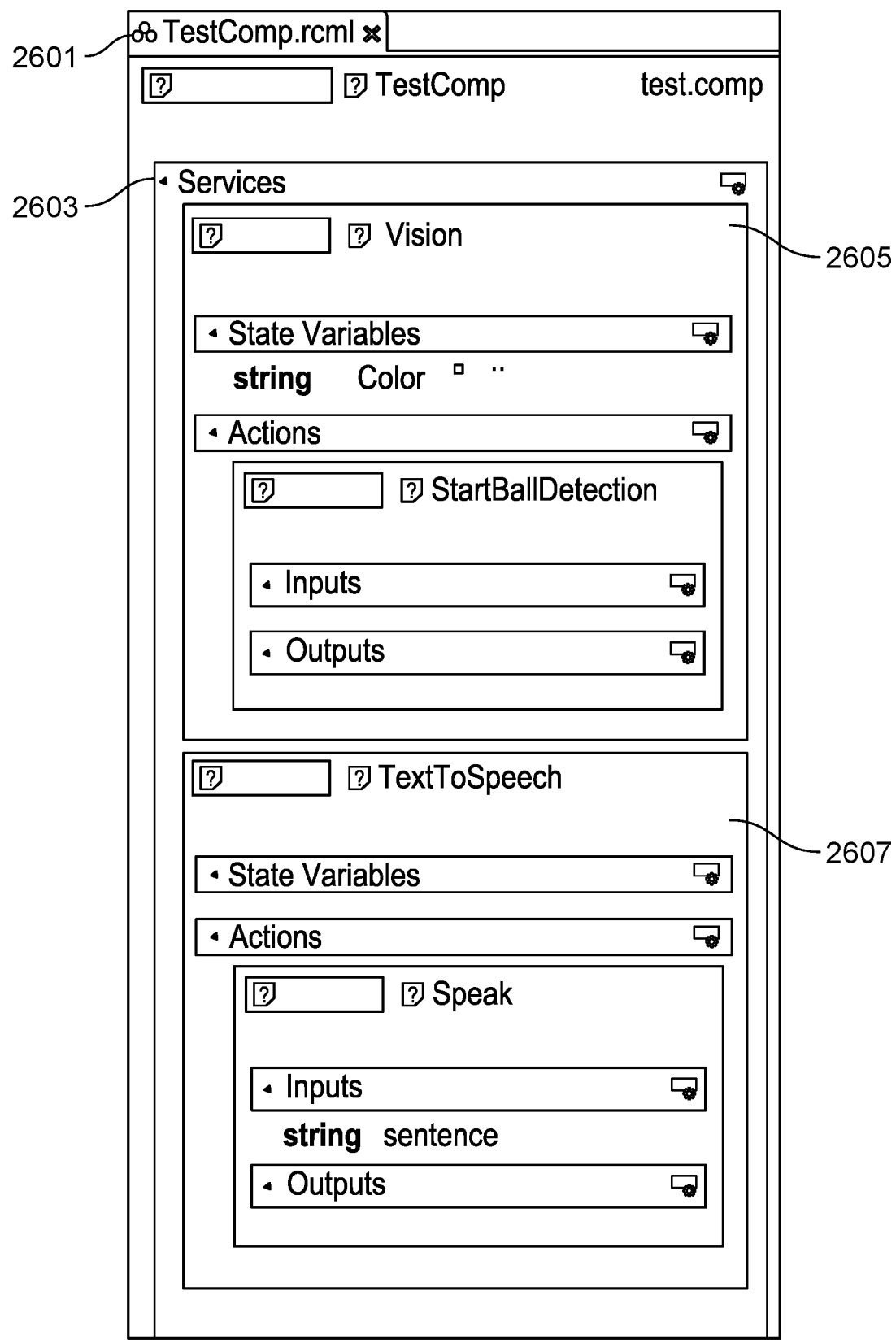
FIG. 26 is a diagram illustrating an example of the universal plug and play (UPnP) component structure.

FIG. 26 is a diagram illustrating an example of the universal plug and play (UPnP) component structure. In some embodiments, an intelligent robot software platform (iRSP) does not provide modules such as navigation and planning. It provides a UPnP component builder. The events and actions provided from a UPnP component can be programmed by iRSP using drag and drop techniques. The programmed logic may be saved using an extensible markup language (XML)-based robot plan markup language (RPML) file format. An RPML file can be reused when a programmer wants to create another RPML file for a different plan.

In the diagram of FIG. 26, a user interface view shows the structure of an exemplary component. In the example shown, a universal plug and play (UPnP) component "TestComp" is shown in component tab 2601. Component tab 2601 includes a services window 2603 displaying the services of the component. Services window 2603 includes the services supported by the component such as vision and text-to-speech functionality. Services window 2603 includes vision service window 2605 and text-to-speech service window 2607. Vision service window 2605 and text-to-speech service window 2607 display additional details of each respective service such as state variables, actions, inputs, outputs, etc. For example, actions of a vision service may include a StartBallDetection action to initiate the visual detection of a ball and a "Color" string state variable to store the color of a detected ball. In some embodiments, each time the state of a monitored variable changes, the component notifies the runtime environment that the state of the variable has changed. As another example, actions of a text-to-speech service may include a Speak action to vocalize a text string that is passed in as a "sentence" string input.

FIG. 27 is an example of a Java language implementation of a universal plug and play (UPnP) component service. In various embodiments, an intelligent robot software platform (iRSP) provides a flexible development environment that allows developers to program components themselves in the event a particular component and/or library does not exist. In the example shown, actions associated with a component service corresponding to a "Speak" action for a text-to-speech service and a "StartBallDetection" action for a vision service are implemented using the Java programming language. In some embodiments, the services may be implemented using Java programming libraries, other appropriate programming libraries, and/or other programming languages. In the example shown, the implementations of the actions are partial implementations that call additional Java methods. In some embodiments, the ServiceTextToSpeechImpl class corresponds to the Speak action of text-to-speech service window 2607 of FIG. 26 and the ServiceVisionImpl class corresponds to the StartBallDetection action of vision service window 2605 of FIG. 26.

Figure 28:
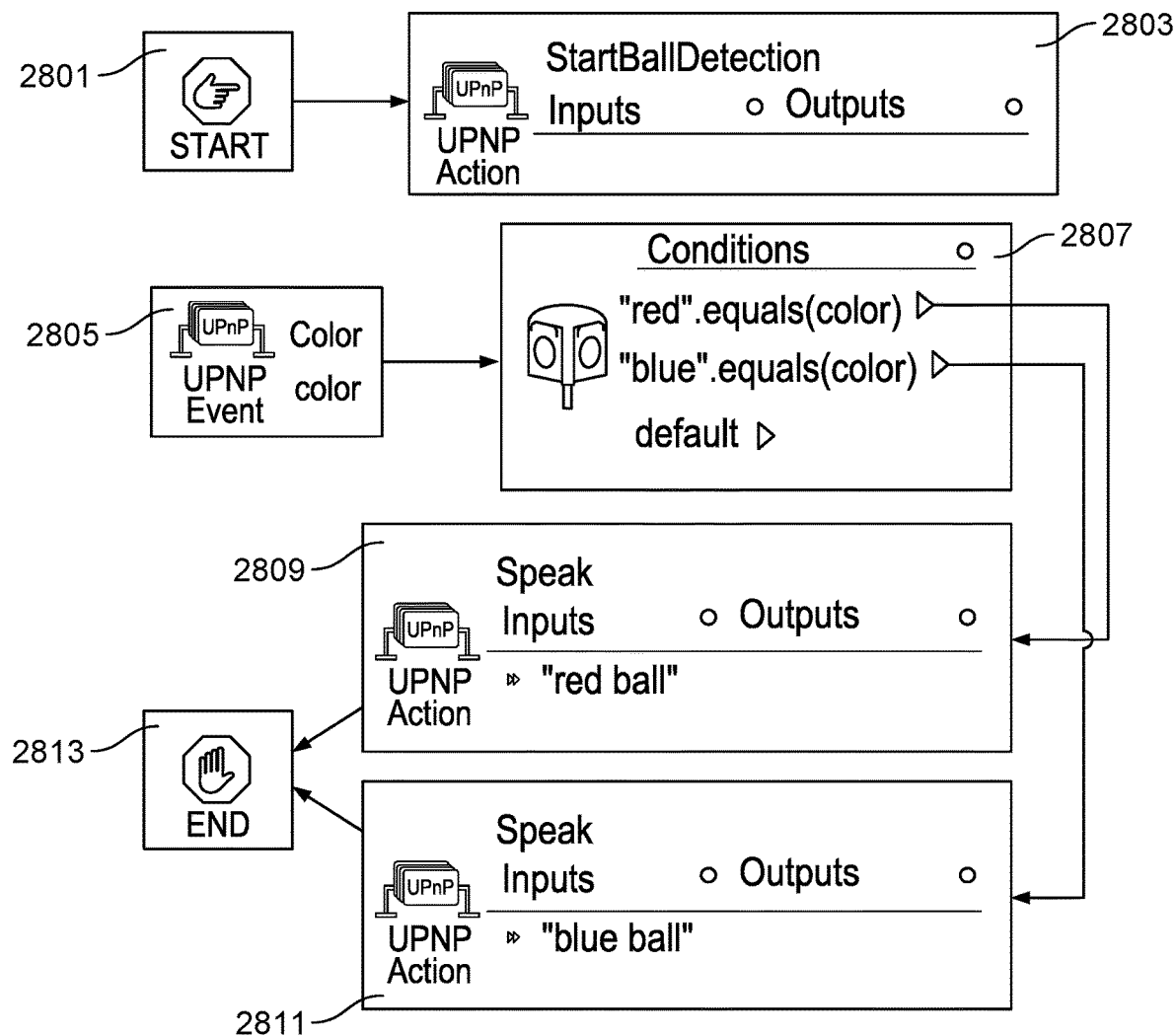
FIG. 28 is a diagram illustrating an example of a robot logic specified using components.

FIG. 28 is a diagram illustrating an example of a robot logic specified using components. The diagram of FIG. 28 depicts an example robot logic where a robot speaks the color of a ball in response to detecting a red or blue ball. In response to detecting a red ball, the robot speaks "red ball."

In response to detecting a blue ball, the robot speaks "blue ball." The nodes used in the example of FIG. 28 include start, end, if, universal plug and play (UPnP) action, and UPnP event nodes. In the example shown, the robot logic includes nodes: start node 2801; end node 2813; if node 2807; UPnP action nodes 2803, 2809, and 2811; and UPnP event node 2805. In some embodiments, the robot logic depicted in FIG. 28 corresponds to a task scenario. In various embodiments, the robot logic is created using a visual programming language (VPL) and/or using a plan builder of an intelligent robot software platform such as intelligent robot software platform 1901 of FIG. 19. In some embodiments, the robot logic is created using drag-and-drop techniques to connect instances of functional components together using specified links. In the example shown, the functional components are the robot logic nodes and the specified links are the arrows connecting the nodes.

The robot logic of FIG. 28 begins at start node 2801. From start node 2801, the logic transitions to UPnP action node 2803. UPnP action node 2803 calls the "StartBallDetection" action of its UPnP component. In some embodiments, the UPnP component of UPnP action node 2803 is shown in FIG. 26. In response to executing the action of UPnP action node 2803, the robot begins to detect for the visual presence of a ball and, if detected, to determine the detected ball's color. In some embodiments, the color of a detected ball is registered as a state variable. In some embodiments, the state variable corresponds to the "Color" state variable of vision service window 2605 of FIG. 26. In response to the component detecting the ball, the value of the "Color" variable changes and a Color event is generated. The robot logic captures the Color event at UPnP event node 2805, which represents a Color detection event. From UPnP event node 2805, the logic transitions to if node 2807. If node 2807 includes if-conditional logic to branch the logic based on the color of the detected ball. In response to a detected red ball, the logic progresses to UPnP action node 2809. In response to a detected blue ball, the logic progresses to UPnP action node 2811. UPnP action nodes 2809 and 2811 both call the "Speak" action of their corresponding UPnP components. In some embodiments, the UPnP component of UPnP action nodes 2809 and 2811 are shown in FIG. 26. Action node 2809 uses the input string "red ball" and action node 2811 uses the input "blue ball" for the "Speak" action to vocalize their respective responses "red ball" and "blue ball" based on the color of the detected ball. In some embodiments, the input strings to the "Speak" action correspond to the "sentence" input string of text-to-speech window 2607 of FIG. 26. After the respective "Speak" action initiated by action nodes 2809 or 2811 is executed, the task scenario completes by reaching end node 2813.

The example of FIG. 28 demonstrates the use of nodes and how different types of nodes are used in the programming of robot logic using an intelligent robot software platform. In some embodiments, the types of nodes supported include: start, end, if, sync, assign, print, pause, script, universal plug and play (UPnP) event, UPnP action, and group nodes. In some embodiments, the nodes have the following functionality and properties:

1) Start: The task scenario is executed starting from the start node. There is only one Start node.
2) End: The task scenario completes when an end node is executed. Multiple end nodes may exist.
3) If: This node is used when it is necessary to branch according to certain conditions.
4) Sync: This node is used when the node needs to be synchronized in the event the node is divided into several branches. When all the control flows into the node, go to the next step.
5) Assign: This node assigns a value to a variable declared in a robot plan markup language (RPML) file.
6) Print: This node prints the input sentence to the console.
7) Pause: This node stops for the inputted amount of time (e.g., an amount of time specified in milliseconds).
8) Script: This node is used to execute a script, such as a BeanShell script.
9) UPnP Event: This node is used to capture a UPnP Event that occurs in a component. The node is not connected to the start node.
10) UPnP Action: This node calls a function defined in the UPnP component through an execution application programing interface (API).
11) Group: If you define input and output of an already created RPML file and use it again, it is called a group node.

FIG. 29 is an example of a robot plan markup language (RPML) file created using the intelligent robot software platform. In some embodiments, RPML is a markup language based on the extensible markup language (XML) standard. In various embodiments, RPML leverages properties of XML. XML is a format for structured data and can be used to convert and store most types of structured data into a text file format. XML is similar to HTML in terms of using tags and attributes. However, XML is quite different from the standpoint that such tags and attributes are not generally defined, but rather interpreted within the context being used. Because of this feature of XML, it is well suited for defining a schema that fits various document types. In some embodiments, the RPML file is generated using an intelligent robot software platform such as intelligent robot software platform 1901 of FIG. 19.

The robot plan markup language (RPML) example of FIG. 29 includes code components corresponding to definition, nodes, transitions, and comments.

1) Definition: In some embodiments, the definition may include a description, inputs, outputs, and/or locals. A description is a description of the RPML file. Inputs define a list of inputs when the RPML file is reused as a group node. Outputs define a list of outputs when the RPML file is reused as a group node. Locals define the type, name, and initial values of the variables used inside the RPML file.
2) Nodes: In some embodiments, the nodes to be used are defined. In some embodiments, the node tags declared in the nodes tag are numbered in order. These numbers are used to define the relationship of nodes in transitions. For example, in the ball detection example shown in FIG. 28, an example numbering of the nodes may be: start node 2801 is node 0, end node 2813 is node 1, UPnP action node 2803 (with action "StartBallDetection") is node 2, universal plug and play (UPnP) event node 2805 (corresponding to a Color event) is node 3, if node 2807 is node 4, UPnP action node 2809 (corresponding to the "Speak" action with the input value of "red ball") is node 5, and UPnP action node 2811 (corresponding to the "Speak" action with the input value of "blue ball") is node 6.
3) Transitions: In some embodiments, the transition tag is used to define the relationship between nodes. Source is the number of the node where the arrow starts and target is the number of the node where the arrow(s) arrive. If a node is aimed at multiple nodes, a colon (:) and a number starting at 0 is added after the source node number. For example, in the ball detection example shown in FIG. 28, start node 2801 (node 0) is aimed at UPnP action node 2803 (node 2 with action "StartBallDetection") and universal plug and play (UPnP) event node 2805 (node 3 corresponding to a Color event) is aimed at if node 2807 (node 4). If node 2807 is aimed at two nodes, UPnP action nodes 2809 (node 5) and 2811 (node 6). To indicate multiple target nodes, the source number is presented as "4:0" and "4:1." After UPnP action node 2809 (node 5) or UPnP action node 2811 (node 6) is executed, the task scenario is terminated when end node (node 1) is reached.

4) Comments: In some embodiments, a comment node does not affect the task scenario and may be used when developers want to leave a comment. Types of comments include rectangle, round rectangle, eclipse, and textbox.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a specification of programmatic instructions, wherein the specification is specified using instances of functional components connected together using specified links and wherein the specification includes the programmatic instructions for controlling a motorized base device, wherein one or more of the instances of the functional components access a remote network device using a component interface, wherein the component interface is a universal plug and play (UPnP) interface, and wherein the specification includes the programmatic instructions for invoking the one or more instance of the functional components using the UPnP interface;
providing a simulation and debugging environment for the specification, comprising:
generating, based on the specification, code templates to create UPnP components;
determining whether a necessary component utilized by the code template is missing; and
in response to a determination that a necessary component utilized by the code template is not missing:
enabling devices plugged into the network to be aware of each other, wherein the devices include a personal computer (PC), a peripheral, an intelligent appliance, a wireless device, or any combination thereof; and
executing a task scenario using a markup language, wherein the task scenario includes communicating with the UPnP components;
generating a distributable version based on the specification; and
providing the distributable version to a remote wireless device, wherein the remote wireless device executes the distributable version of the specification including by providing commands to the motorized base device based on the distributable version of the specification.

2. The method of claim 1, wherein the specification specifies a motorized component of the motorized base device using the instances of the functional components and the distributable version is configured to utilize the corresponding motorized component.

3. The method of claim 1, wherein the remote wireless device is a smartphone device.

4. The method of claim 3, wherein the specification specifies a sensor component of the smartphone device using the instances of the functional components and the distributable version is configured to utilize the corresponding sensor component.

5. The method of claim 1, wherein one or more of the instances of the functional components utilize an adaptive, interactive, and cognitive reasoner.

6. The method of claim 1, wherein one or more of the instances of the functional components store an episodic data in a memory graph database.

7. The method of claim 6, wherein the one or more of the instances of the functional components identify a relationship between a natural language input and one or more supporting knowledge data nodes of the memory graph database.

8. The method of claim 1, wherein the instances of the functional components include one or more functional components configured to receive a natural language input, process the natural language input to classify components of the natural language input, reference an artificial intelligence memory graph data structure to begin a search for one or more supporting knowledge data nodes using a lexical database to identify the one or more supporting knowledge data nodes, and solve an artificial intelligence problem using the one or more identified supporting knowledge data nodes of the artificial intelligence memory graph data structure.

9. The method of claim 8, wherein the lexical database is utilized to identify a relationship between one of the classified components and at least one of the one or more supporting knowledge data nodes.

10. The method of claim 8, further comprising recording an identified artificial intelligence problem and a determined solution in the artificial intelligence memory graph data structure.

11. The method of claim 10, wherein the artificial intelligence problem is solved using a case-based reasoning module or an artificial intelligence planner.

12. The method of claim 11, wherein the case-based reasoning module matches the artificial intelligence problem to a case stored in the artificial intelligence memory graph data structure.

13. The method of claim 1, wherein the specification of the programmatic instructions includes a reusable group node referencing a previously created specification and the reusable group node is saved using a markup language.

14. The method of claim 1, wherein the specified links connect nodes and wherein each of the nodes has a node type.

15. The method of claim 14, wherein the node type is one of the following: start, end, if, sync, assign, print, pause, script, event, action, or group.

16. The method of claim 1, wherein the remote wireless device is configured to execute the distributable version using a runtime environment and one or more of the commands provided to the motorized base device utilize a middleware module of the remote wireless device to interface with a robot hardware component.

17. A system for solving an artificial intelligence problem, comprising:
a processor; and
a memory coupled with the processor, wherein the memory is configured to provide the processor with instructions which when executed cause the processor to:
receive a specification of programmatic instructions, wherein the specification is specified using instances of functional components connected together using specified links and wherein the specification includes the programmatic instructions for controlling a motorized base device, wherein one or more of the instances of the functional components access a remote network device using a component interface, wherein the component interface is a universal plug and play (UPnP) interface, and wherein the specification includes the programmatic instructions for invoking the one or more instance of the functional components using the UPnP interface;

provide a simulation and debugging environment for the specification, comprising to:
- generate, based on the specification, code templates to create UPnP components;
- determine whether a necessary component utilized by the code template is missing; and
- in response to a determination that a necessary component utilized by the code template is not missing:
  - enable devices plugged into the network to be aware of each other, wherein the devices include a personal computer (PC), a peripheral, an intelligent appliance, a wireless device, or any combination thereof; and
  - execute a task scenario using a markup language, wherein the task scenario includes communicating with the UPnP components;

generate a distributable version based on the specification; and provide the distributable version to a remote wireless device, wherein the remote wireless device executes the distributable version of the specification including by providing commands to the motorized base device based on the distributable version of the specification.

18. A computer program product for developing a robot logic, the computer program product being embodied in a non-transitory computer readable storage medium and comprising computer instructions for:

receiving a specification of programmatic instructions, wherein the specification is specified using instances of functional components connected together using specified links and wherein the specification includes the programmatic instructions for controlling a motorized base device, wherein one or more of the instances of the functional components access a remote network device using a component interface, wherein the component interface is a universal plug and play (UPnP) interface, and wherein the specification includes the programmatic instructions for invoking the one or more instance of the functional components using the UPnP interface;

providing a simulation and debugging environment for the specification, comprising:
- generating, based on the specification, code templates to create UPnP components;
- determining whether a necessary component utilized by the code template is missing; and
- in response to a determination that a necessary component utilized by the code template is not missing:
  - enabling devices plugged into the network to be aware of each other, wherein the devices include a personal computer (PC), a peripheral, an intelligent appliance, a wireless device, or any combination thereof; and
  - executing a task scenario using a markup language, wherein the task scenario includes communicating with the UPnP components;

generating a distributable version based on the specification; and providing the distributable version to a remote wireless device, wherein the remote wireless device executes the distributable version of the specification including by providing commands to the motorized base device based on the distributable version of the specification.

* * * * *

UNITED STATES PATENT AND TRADEMARK OFFICE
CERTIFICATE OF CORRECTION

| | | |
|---|---|---|
| PATENT NO. | : 10,929,759 B2 | Page 1 of 1 |
| APPLICATION NO. | : 16/103402 | |
| DATED | : February 23, 2021 | |
| INVENTOR(S) | : Hong Shik Shinn, Yeongju Kim and Sungmin Lee | |

It is certified that error appears in the above-identified patent and that said Letters Patent is hereby corrected as shown below:

On the Title Page

Item (73), assignee, address, insert --Seoul (KR)--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*